United States Patent
Han et al.

(10) Patent No.: US 12,437,175 B2
(45) Date of Patent: Oct. 7, 2025

(54) TWO-DIMENSIONAL CODE GENERATION METHOD AND RELATED DEVICE

(71) Applicant: HUAWEI TECHNOLOGIES CO., LTD., Guangdong (CN)

(72) Inventors: Tingrui Han, Hangzhou (CN); Fuyang Rao, Shenzhen (CN); Huajingling Wu, Hangzhou (CN); Chengqian Deng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 13 days.

(21) Appl. No.: 18/215,378

(22) Filed: Jun. 28, 2023

(65) Prior Publication Data

US 2023/0342579 A1    Oct. 26, 2023

Related U.S. Application Data

(63) Continuation of application No. PCT/CN2021/140891, filed on Dec. 23, 2021.

(30) Foreign Application Priority Data

Dec. 29, 2020 (CN) .......................... 202011607876.4

(51) Int. Cl.
    *G06K 19/06* (2006.01)
(52) U.S. Cl.
    CPC .............................. *G06K 19/06037* (2013.01)
(58) Field of Classification Search
    CPC ....... G06K 19/06037; G06K 19/06046; G06K 2019/06225
    See application file for complete search history.

(56) References Cited

U.S. PATENT DOCUMENTS

| 7,020,327 B2 | 3/2006 | Tack-Don et al. |
| 8,978,989 B2 * | 3/2015 | Friedman ......... G06K 19/06103 235/492 |

(Continued)

FOREIGN PATENT DOCUMENTS

| CN | 101493901 A | 7/2009 |
| CN | 104573781 A | 4/2015 |

(Continued)

OTHER PUBLICATIONS

Mingliang Xu et al, "Stylized Aesthetic QR Code", IEEE Transactions on Multimedia, vol. 21, No. 8, Aug. 2019, total 11 pages.

(Continued)

*Primary Examiner* — Laura A Gudorf
(74) *Attorney, Agent, or Firm* — WOMBLE BOND DICKINSON (US) LLP

(57) ABSTRACT

A two-dimensional code generation method is disclosed, including: obtaining M colors and a characteristic value of each color in a target color path; determining a target mapping relationship based on a magnitude relationship between characteristic values of the M colors in the target color path; obtaining a target link, and generating a bitstream corresponding to the target link; and determining a color corresponding to each piece of element information in the bitstream, and generating a target two-dimensional code based on the color corresponding to each piece of element information in the bitstream. According to the two-dimensional code generation method, a code scanning side can restore, based on a magnitude relationship between characteristic values of colors of elements in the scanned two-dimensional code, a correspondence that is between colors and element information and that is used for generating the two-dimensional code, to accurately identify content in the two-dimensional code.

19 Claims, 25 Drawing Sheets

(56) References Cited

U.S. PATENT DOCUMENTS

| | | |
|---|---|---|
| 9,805,296 B2 | 10/2017 | Loy et al. |
| 10,534,948 B1 * | 1/2020 | Walters .................. G06V 10/50 |
| 2018/0314924 A1 | 11/2018 | Mai et al. |

FOREIGN PATENT DOCUMENTS

| | | |
|---|---|---|
| CN | 106022431 A | 10/2016 |
| CN | 109214490 A | 1/2019 |
| CN | 112070195 A | 12/2020 |
| EP | 1591948 B1 | 8/2007 |
| JP | 2008027029 A | 2/2008 |

OTHER PUBLICATIONS

Zhibo Yang et al, "Towards Robust Color Recovery for High-Capacity Color QR Codes", IEEE International Conference on Image Processing, Aug. 19, 2016, total 5 pages.

Fuwang Yi et al, "A Robust Circular Two-Dimensional Barcode and Decoding Method", Picture Coding Symposium, PCS, Sep. 16, 2019, total 5 pages.

* cited by examiner

| Base10 ||||||
|---|---|---|---|---|---|
| Decimal notation | Character | Decimal notation | Character | Decimal notation | Character |
| 0 | 0 | 4 | 4 | 8 | 8 |
| 1 | 1 | 5 | 5 | 9 | 9 |
| 2 | 2 | 6 | 6 | | |
| 3 | 3 | 7 | 7 | | |

| Base32_L | | | | | | |
|---|---|---|---|---|---|---|
| Decimal notation | Character | Decimal notation | Character | Decimal notation | Character | Character |
| 0 | a | 8 | i | 16 | q | y |
| 1 | b | 9 | j | 17 | r | z |
| 2 | c | 10 | k | 18 | s | SP |
| 3 | d | 11 | l | 19 | t | Base32_U jumping |
| 4 | e | 12 | m | 20 | u | Base10 jumping |
| 5 | f | 13 | n | 21 | v | Base45 jumping |
| 6 | g | 14 | o | 22 | w | Base90 jumping |
| 7 | h | 15 | p | 23 | x | Base108 jumping |

FIG. 17

| Decimal notation | Character | Decimal notation | Character | Decimal notation | Character | Decimal notation | Character |
|---|---|---|---|---|---|---|---|
| | | | | Base32_U | | | |
| 0 | A | 8 | I | 16 | Q | 24 | Y |
| 1 | B | 9 | J | 17 | R | 25 | Z |
| 2 | C | 10 | K | 18 | S | 26 | SP |
| 3 | D | 11 | L | 19 | T | 27 | Base32_L_jumping |
| 4 | E | 12 | M | 20 | U | 28 | Base10 jumping |
| 5 | F | 13 | N | 21 | V | 29 | Base45 jumping |
| 6 | G | 14 | O | 22 | W | 30 | Base90 jumping |
| 7 | H | 15 | P | 23 | X | 31 | Base108 jumping |

FIG. 18

| Base45 | | | | | | | | |
|---|---|---|---|---|---|---|---|---|
| Decimal notation | Character | Decimal notation | Character | Decimal notation | Character | Decimal notation | Character |
| 0 | 0 | 9 | 9 | 18 | I | 27 | R | 36 | SP |
| 1 | 1 | 10 | A | 19 | J | 28 | S | 37 | $ |
| 2 | 2 | 11 | B | 20 | K | 29 | T | 38 | % |
| 3 | 3 | 12 | C | 21 | L | 30 | U | 39 | * |
| 4 | 4 | 13 | D | 22 | M | 31 | V | 40 | + |
| 5 | 5 | 14 | E | 23 | N | 32 | W | 41 | - |
| 6 | 6 | 15 | F | 24 | O | 33 | X | 42 | . |
| 7 | 7 | 16 | G | 25 | P | 34 | Y | 43 | / |
| 8 | 8 | 17 | H | 26 | Q | 35 | Z | 44 | : |

FIG. 19

| Decimal notation | Character | Decimal notation | Character | Decimal notation | Character | Decimal notation | Character | Decimal notation | Character |
|---|---|---|---|---|---|---|---|---|---|
| | | | | Base90 | | | | | |
| 0 | 0 | 18 | I | 36 | a | 54 | s | 72 | * |
| 1 | 1 | 19 | J | 37 | b | 55 | t | 73 | + |
| 2 | 2 | 20 | K | 38 | c | 56 | u | 74 | , |
| 3 | 3 | 21 | L | 39 | d | 57 | v | 75 | - |
| 4 | 4 | 22 | M | 40 | e | 58 | w | 76 | . |
| 5 | 5 | 23 | N | 41 | f | 59 | x | 77 | / |
| 6 | 6 | 24 | O | 42 | g | 60 | y | 78 | : |
| 7 | 7 | 25 | P | 43 | h | 61 | z | 79 | ; |
| 8 | 8 | 26 | Q | 44 | i | 62 | SP | 80 | = |
| 9 | 9 | 27 | R | 45 | j | 63 | ! | 81 | ? |
| 10 | A | 28 | S | 46 | k | 64 | " | 82 | @ |
| 11 | B | 29 | T | 47 | l | 65 | # | 83 | ¦ |
| 12 | C | 30 | U | 48 | m | 66 | $ | 84 | ~ |
| 13 | D | 31 | V | 49 | n | 67 | % | 85 | Base10 jumping |
| 14 | E | 32 | W | 50 | o | 68 | & | 86 | Base32_L jumping |
| 15 | F | 33 | X | 51 | p | 69 | ' | 87 | Base32_U jumping |
| 16 | G | 34 | Y | 52 | q | 70 | ( | 88 | Base45 jumping |
| 17 | H | 35 | Z | 53 | r | 71 | ) | 89 | Base108 jumping |

FIG. 20

| | | Base108 | | | | | |
|---|---|---|---|---|---|---|---|
| Decimal notation | Character | Decimal notation | Character | Decimal notation | Character | Decimal notation | Character |
| 0 | \0 | 41 | ) | 63 | ? | 85 | U | 107 | k |
| 7 | \a | 42 | * | 64 | @ | 86 | V | 108 | l |
| 8 | \b | 43 | + | 65 | A | 87 | W | 109 | m |
| 9 | \t | 44 | , | 66 | B | 88 | X | 110 | n |
| 10 | \n | 45 | - | 67 | C | 89 | Y | 111 | o |
| 11 | \v | 46 | . | 68 | D | 90 | Z | 112 | p |
| 12 | \f | 47 | / | 69 | E | 91 | [ | 113 | q |
| 13 | \r | 48 | 0 | 70 | F | 92 | \ | 114 | r |
| 27 | Base10 jumping | 49 | 1 | 71 | G | 93 | ] | 115 | s |
| 28 | Base32_L jumping | 50 | 2 | 72 | H | 94 | ^ | 116 | t |
| 29 | Base32_U jumping | 51 | 3 | 73 | I | 95 | _ | 117 | u |
| 30 | Base45 jumping | 52 | 4 | 74 | J | 96 | ` | 118 | v |
| 31 | Base90 jumping | 53 | 5 | 75 | K | 97 | a | 119 | w |
| 32 | SP | 54 | 6 | 76 | L | 98 | b | 120 | x |
| 33 | ! | 55 | 7 | 77 | M | 99 | c | 121 | y |
| 34 | " | 56 | 8 | 78 | N | 100 | d | 122 | z |
| 35 | # | 57 | 9 | 79 | O | 101 | e | 123 | { |
| 36 | $ | 58 | : | 80 | P | 102 | f | 124 | | |
| 37 | % | 59 | ; | 81 | Q | 103 | g | 125 | } |
| 38 | & | 60 | < | 82 | R | 104 | h | 126 | ~ |
| 39 | ' | 61 | = | 83 | S | 105 | i | | |
| 40 | ( | 62 | > | 84 | T | 106 | j | | |

FIG. 21

TWO-DIMENSIONAL CODE GENERATION METHOD AND RELATED DEVICE

CROSS-REFERENCE TO RELATED APPLICATIONS

This application is a continuation of International Application No. PCT/CN2021/140891, filed on Dec. 23, 2021, which claims priority to Chinese Patent Application No. 202011607876.4, filed on Dec. 29, 2020. The disclosures of the aforementioned applications are hereby incorporated by reference in their entireties.

TECHNICAL FIELD

This application relates to the field of image recognition, and in particular, to a two-dimensional code generation method and a related device.

BACKGROUND

A two-dimensional code, also referred to as a two-dimensional bar code, is a specific monochrome geometry that records data symbol information and that is distributed on a plane (in a two-dimensional direction) according to a specified rule. A common two-dimensional code is a QR code, which is a popular encoding mode on mobile devices in recent years. Compared with a conventional bar code, the QR code can store more information and represent more data types.

With popularization of smartphones and development of the mobile Internet, two-dimensional codes have been widely applied to various fields as a convenient and fast graphical information transmission mode. However, most of existing two-dimensional codes are similar monochrome squares with a single style and lacks personality, which are not visually attractive to users. In addition, the encoding mode is public, and is not private or secure. Some applications design their exclusive customized two-dimensional codes to increase brand recognition, and use self-defined private encoding modes.

However, each element of these two-dimensional codes is represented by black and white, and can represent only one bit, namely, 0 or 1, resulting in a small capacity. In order to improve a capacity of a two-dimensional code, a chromatic two-dimensional code may be designed. However, a color of an element in the chromatic two-dimensional code is determined based on a preset codebook, and users cannot customize colors during generation of the chromatic two-dimensional code.

SUMMARY

This application discloses a two-dimensional code generation method. Even if all colors in a two-dimensional code are customized and specified by a user, a code scanning side can restore, based on a magnitude relationship between characteristic values of colors of elements in the scanned two-dimensional code, a correspondence that is between colors and element information and that is used for generating the two-dimensional code, to accurately identify content in the two-dimensional code.

An embodiment of this application provides a two-dimensional code generation method, and the method includes:
obtaining M colors and a characteristic value of each color in a target color path, where the M colors include at least one chromatic color, and M is an integer greater than 1;
determining a target mapping relationship based on a magnitude relationship between characteristic values of the M colors in the target color path, where the target mapping relationship includes element information corresponding to each of the M colors;
obtaining a target link, and generating a bitstream corresponding to the target link, where the bitstream includes a plurality of pieces of element information; and
determining, based on the target mapping relationship, a color corresponding to each piece of element information in the bitstream, and generating a target two-dimensional code based on the color corresponding to each piece of element information in the bitstream.

In an embodiment, the obtaining M colors includes:
obtaining a target object; and
obtaining, based on the target object, M colors included in the target object.

In an embodiment, the obtaining M colors included in the target object includes:
obtaining M colors with a larger pixel proportion in the target object.

In an embodiment, the obtaining M colors included in the target object includes:
obtaining N colors with a larger pixel proportion in the target object, where N is a positive integer greater than M; and
obtaining M colors meeting a first preset condition from the N colors, where the first preset condition includes at least one of the following: a difference between characteristic values of any two of the M colors in a chrominance path is greater than a first preset value, and a characteristic value of each of the M colors in a saturation path is greater than a second preset value.

In an embodiment, the obtaining, based on the target object, M colors included in the target object includes:
obtaining N colors included in the target object, where N is a positive integer greater than M;
displaying a target interface, where the target interface includes N color options, and each color option indicates one of the N colors;
receiving a selection operation performed by a user on M of the N color options; and
obtaining, in response to the selection operation, M colors indicated by the M color options.

In an embodiment, the obtaining M colors includes:
obtaining a target object;
obtaining, based on the target object, M to-be-processed colors included in the target object; and
adjusting characteristic values of the M to-be-processed colors in a luminance path, so that a difference between characteristic values of any two of the M to-be-processed colors in the luminance path is greater than a preset value, to obtain the M colors.

In an embodiment, the obtaining a target object includes:
displaying a first interface, where the first interface includes a first control, and the first control is used to indicate the user to input an image; and
receiving the target object that is input by the user based on the first control.

In an embodiment, the obtaining M colors includes:
receiving M colors that are input by a user.

In an embodiment, the receiving M colors that are input by a user includes:

displaying a second interface, where the second interface includes a first input box, and the first input box is used to indicate the user to input color information used for indicating a color;

receiving M pieces of color information that are input by the user in the first input box; and obtaining the M colors based on the M pieces of color information.

In an embodiment, the target color path includes at least one of the following: a red path, a green path, a blue path, a chrominance path, a luminance path, and a saturation path.

In an embodiment, the target link includes a first character and a second character, and the generating a bitstream corresponding to the target link includes:

encoding the first character according to a first encoding rule to obtain a first sub-bitstream; and encoding the second character according to a second encoding rule to obtain a second sub-bitstream, where the first encoding rule is different from the second encoding rule.

In an embodiment, a size of the first character is the same as a size of the second character, and a quantity of bits of the first sub-bitstream is different from a quantity of bits of the second sub-bitstream.

In an embodiment, the first character and the second character are adjacent characters in the target link, and after the encoding the first character according to a first encoding rule to obtain a first sub-bitstream and before the encoding the second character according to a second encoding rule, the method further includes:

obtaining a jump indicator, where the jump indicator indicates to perform character encoding according to the second encoding rule; and encoding the jump indicator according to the first encoding rule to obtain a third sub-bitstream; and correspondingly, the encoding the second character according to a second encoding rule includes:

encoding the second character based on the jump indicator according to the second encoding rule.

According to a second aspect, this application provides a two-dimensional code identification method, and the method includes:

obtaining a target image, where the target image includes a target two-dimensional code, and the target two-dimensional code includes a plurality of elements;

obtaining M colors included in the plurality of elements and a characteristic value of each color in a target color path;

determining a target mapping relationship based on a magnitude relationship between characteristic values of the M colors in the target color path, where the target mapping relationship includes element information corresponding to each of the M colors;

determining, based on the target mapping relationship, element information corresponding to a color of each of the plurality of elements; and decoding the target two-dimensional code based on the element information corresponding to the color of each of the plurality of elements.

In an embodiment, the method further includes:

obtaining decoding content obtained after the decoding, where the decoding content includes a character string, and the decoding content is used to trigger a corresponding function, where the function includes at least one of the following:

jumping to a corresponding web page;

enabling a target function in a corresponding application;

displaying a corresponding character string;

displaying a corresponding video; or playing corresponding audio.

In an embodiment, the target color path includes at least one of the following: a red path, a green path, a blue path, a chrominance path, a luminance path, and a saturation path.

In an embodiment, the target image is a grayscale image, and the target color path is a luminance path.

In an embodiment, the obtaining M colors included in the plurality of elements includes:

obtaining the color of each of the plurality of elements, and obtaining, based on a clustering algorithm, the M colors included in the plurality of elements, where each of the M colors is a cluster center obtained by using the clustering algorithm; and correspondingly, the determining, based on the target mapping relationship, element information corresponding to a color of each of the plurality of elements includes:

obtaining a color that is of each element and that is most similar to a color in the M colors; and determining, based on the target mapping relationship, element information corresponding to the color that is of each element and that is most similar to the color in the M colors.

In an embodiment, the element information corresponding to the color of each of the plurality of elements is used to constitute a bitstream, and the bitstream includes a first sub-bitstream and a second sub-bitstream; and the decoding the target two-dimensional code based on the element information corresponding to the color of each of the plurality of elements includes:

decoding the first sub-bitstream according to a first decoding rule to obtain a first character; and decoding the second sub-bitstream according to a second decoding rule to obtain a second character, where the first decoding rule is different from the second decoding rule.

In an embodiment, a size of the first character is the same as a size of the second character, and a quantity of bits of the first sub-bitstream is different from a quantity of bits of the second sub-bitstream.

In an embodiment, the bitstream further includes a third sub-bitstream, the first sub-bitstream is adjacent to the third sub-bitstream, the third sub-bitstream is adjacent to the second sub-bitstream, and after the decoding the first sub-bitstream according to a first decoding rule and before the decoding the second sub-bitstream according to a second decoding rule, the method further includes:

decoding the third sub-bitstream according to the first decoding rule to obtain a jump indicator, where the jump indicator indicates to perform character decoding according to the second decoding rule; and correspondingly, the decoding the second sub-bitstream according to a second decoding rule includes:

decoding the second sub-bitstream based on the jump indicator according to the second decoding rule.

According to a third aspect, this application provides a two-dimensional code generation apparatus, and the apparatus includes:

an obtaining module, configured to obtain M colors and a characteristic value of each color in a target color path, where the M colors include at least one chromatic color, and M is an integer greater than 1;

a mapping relationship determining module, configured to determine a target mapping relationship based on a magnitude relationship between characteristic values of the M colors in the target color path, where the target mapping relationship includes element information corresponding to each of the M colors, where the obtaining module is configured to: obtain a target link, and generate a bitstream corresponding to the target link, where the bitstream includes a plurality of pieces of element information; and a two-dimensional code generation module, configured to: determine, based on the target mapping relationship, a color corresponding to each piece of element information in the bitstream, and generate a target two-dimensional code based on the color corresponding to each piece of element information in the bitstream.

In an embodiment, the obtaining module is configured to: obtain a target object; and obtain, based on the target object, M colors included in the target object.

In an embodiment, the obtaining module is configured to: obtain M colors with a larger pixel proportion in the target object.

In an embodiment, the obtaining module is configured to: obtain N colors with a larger pixel proportion in the target object, where N is a positive integer greater than M; and obtain M colors meeting a first preset condition from the N colors, where the first preset condition includes at least one of the following: a difference between characteristic values of any two of the M colors in a chrominance path is greater than a first preset value, and a characteristic value of each of the M colors in a saturation path is greater than a second preset value.

In an embodiment, the obtaining module is configured to: obtain N colors included in the target object, where N is a positive integer greater than M;

display a target interface, where the target interface includes N color options, and each color option indicates one of the N colors;

receive a selection operation performed by a user on M of the N color options; and obtain, in response to the selection operation, M colors indicated by the M color options.

In an embodiment, the obtaining module is configured to: obtain a target object;

obtain, based on the target object, M to-be-processed colors included in the target object; and adjust characteristic values of the M to-be-processed colors in a luminance path, so that a difference between characteristic values of any two of the M to-be-processed colors in the luminance path is greater than a preset value, to obtain the M colors.

In an embodiment, the obtaining module is configured to: display a first interface, where the first interface includes a first control, and the first control is used to indicate the user to input an image; and receive the target object that is input by the user based on the first control.

In an embodiment, the obtaining module is configured to: receive M colors that are input by a user.

In an embodiment, the obtaining module is configured to: display a second interface, where the second interface includes a first input box, and the first input box is used to indicate the user to input color information used for indicating a color;

receive M pieces of color information that are input by the user in the first input box; and obtain the M colors based on the M pieces of color information.

In an embodiment, the target color path includes at least one of the following: a red path, a green path, a blue path, a chrominance path, a luminance path, and a saturation path.

In an embodiment, the target link includes a first character and a second character, and the obtaining module is configured to:

encode the first character according to a first encoding rule to obtain a first sub-bitstream; and encode the second character according to a second encoding rule to obtain a second sub-bitstream, where the first encoding rule is different from the second encoding rule.

In an embodiment, a size of the first character is the same as a size of the second character, and a quantity of bits of the first sub-bitstream is different from a quantity of bits of the second sub-bitstream.

In an embodiment, the first character and the second character are adjacent characters in the target link, and the obtaining module is configured to:

obtain a jump indicator, where the jump indicator indicates to perform character encoding according to the second encoding rule;

encode the jump indicator according to the first encoding rule to obtain a third sub-bitstream; and encode the second character based on the jump indicator according to the second encoding rule.

According to a fourth aspect, this application provides a two-dimensional code identification apparatus, and the apparatus includes:

an obtaining module, configured to: obtain a target image, where the target image includes a target two-dimensional code, and the target two-dimensional code includes a plurality of elements; and obtain M colors included in the plurality of elements and a characteristic value of each color in a target color path;

a mapping relationship determining module, configured to: determine a target mapping relationship based on a magnitude relationship between characteristic values of the M colors in the target color path, where the target mapping relationship includes element information corresponding to each of the M colors; and determine, based on the target mapping relationship, element information corresponding to a color of each of the plurality of elements; and a decoding module, configured to decode the target two-dimensional code based on the element information corresponding to the color of each of the plurality of elements.

In an embodiment, the obtaining module is configured to: obtain decoding content obtained after the decoding, where the decoding content includes a character string, and the decoding content is used to trigger a corresponding function, where the function includes at least one of the following:

jumping to a corresponding web page;

enabling a target function in a corresponding application;

displaying a corresponding character string;

displaying a corresponding video; or playing corresponding audio.

In an embodiment, the target color path includes at least one of the following: a red path, a green path, a blue path, a chrominance path, a luminance path, and a saturation path.

In an embodiment, the target image is a grayscale image, and the target color path is a luminance path.

In an embodiment, the obtaining module is configured to:
obtain the color of each of the plurality of elements, and obtain, based on a clustering algorithm, the M colors included in the plurality of elements, where each of the M colors is a cluster center obtained by using the clustering algorithm; and correspondingly, the mapping relationship determining module is configured to: obtain a color that is of each element and that is most similar to a color in the M colors; and determine, based on the target mapping relationship, element information corresponding to the color that is of each element and that is most similar to the color in the M colors.

In an embodiment, the element information corresponding to the color of each of the plurality of elements is used to constitute a bitstream, and the bitstream includes a first sub-bitstream and a second sub-bitstream; and the decoding module is configured to: decode the first sub-bitstream according to a first decoding rule to obtain a first character; and decode the second sub-bitstream according to a second decoding rule to obtain a second character, where the first decoding rule is different from the second decoding rule.

In an embodiment, a size of the first character is the same as a size of the second character, and a quantity of bits of the first sub-bitstream is different from a quantity of bits of the second sub-bitstream.

In an embodiment, the bitstream further includes a third sub-bitstream, the first sub-bitstream is adjacent to the third sub-bitstream, the third sub-bitstream is adjacent to the second sub-bitstream, and the decoding module is configured to:
decode the third sub-bitstream according to the first decoding rule to obtain a jump indicator, where the jump indicator indicates to perform character decoding according to the second decoding rule; and correspondingly, the decoding the second sub-bitstream according to a second decoding rule includes:
decoding the second sub-bitstream based on the jump indicator according to the second decoding rule.

According to a fifth aspect, this application provides a two-dimensional code generation method, and the method includes:
obtaining a target object and a target link; and
obtaining, based on the target object, M colors included in the target object, where the M colors include at least one chromatic color, and M is an integer greater than 1.

A terminal device may automatically obtain, based on the target object, the M colors included in the target object. For example, the terminal device may obtain the target object, and obtain M colors with a larger pixel proportion in the target object; or the terminal device may obtain N colors with a larger pixel proportion in the target object, and obtain M colors meeting a first preset condition from the N colors. In an optional implementation, the terminal device may obtain the target object, and obtain the M colors with a larger pixel proportion in the target object. Algorithms for extracting colors from the target object may include but are not limited to methods such as color quantization (color quantization), clustering (clustering), and color modeling. For example, a clustering algorithm is used during implementation. A K-means clustering algorithm may be used to extract main colors from an input target picture, and sort the main colors in descending order of quantities of pixels in the target object, to obtain M colors with a larger pixel proportion in the target object.

The method further includes: generating a target two-dimensional code based on the M colors and the target link, where a color style of the target two-dimensional code is consistent with a color style of the target object, the target two-dimensional code includes a plurality of elements, colors of the plurality of elements include the M colors, a color of each element corresponds to one piece of element information, and a plurality of pieces of element information corresponding to the colors of the plurality of elements are used to represent the target link.

Consistency between color styles may mean that colors included in the target two-dimensional code are consistent with main colors in the target object (for example, the main colors may be described as the M colors with a larger pixel proportion in the target object), and the target two-dimensional code and the target object have same color style recognition. For example, if the target object is a logo of an enterprise A, and the logo of the enterprise A is red and blue, the target two-dimensional code may include red and blue. In this case, the target two-dimensional code has color style recognition of the enterprise A.

For example, the target object may be a logo of an enterprise, and the M colors with a larger pixel proportion in the target object may represent main colors of the logo of the enterprise.

For example, the target object may be an image of a target commodity, and the M colors with a larger pixel proportion in the target object may represent main colors of the target commodity.

That a plurality of pieces of element information corresponding to the colors of the plurality of elements are used to represent the target link may be understood as that: the plurality of pieces of element information corresponding to the colors of the plurality of elements carry information about the target link, and the plurality of pieces of element information corresponding to the colors of the plurality of elements are parsed to obtain the target link. Specifically, the plurality of pieces of element information corresponding to the colors of the plurality of elements may form one bitstream, and the bitstream is consistent with a bitstream obtained after the target link is encoded.

An embodiment of this application provides a two-dimensional code generation method, including: obtaining a target object and a target link; obtaining, based on the target object, M colors included in the target object, where the M colors include at least one chromatic color, and M is an integer greater than 1; and generating a target two-dimensional code based on the M colors and the target link, where a color style of the target two-dimensional code is consistent with a color style of the target object, the target two-dimensional code includes a plurality of elements, colors of the plurality of elements include the M colors, a color of each element corresponds to one piece of element information, and a plurality of pieces of element information corresponding to the colors of the plurality of elements are used to represent the target link. In this application, the target two-dimensional code whose color style is consistent with that of the target object is generated based on the M colors included in the target object, thereby implementing color customization of a two-dimensional code.

In an embodiment, the target object is an identifier that indicates a target enterprise or a target commodity, the target two-dimensional code includes an image region in the middle and an encoding region surrounding the image region, the encoding region includes the plurality of elements, and the image region includes the target object.

In an embodiment, the obtaining, based on the target object, M colors included in the target object includes:
obtaining M colors with a larger pixel proportion in the target object.

In an embodiment, the obtaining, based on the target object, M colors included in the target object includes:
obtaining N colors included in the target object, where N is a positive integer greater than M;
displaying a target interface, where the target interface includes N color options, and each color option indicates one of the N colors;
receiving a selection operation performed by a user on M of the N color options; and
obtaining, in response to the selection operation, M colors indicated by the M color options.

In an embodiment, the obtaining a target object includes:
displaying a first interface, where the first interface includes a first control, and the first control is used to indicate the user to input an image; and
receiving the target object that is input by the user based on the first control.

In an embodiment, the method further includes:
obtaining a characteristic value of each of the M colors in a target color path, where the M colors include at least one chromatic color, and M is an integer greater than 1;
determining a target mapping relationship based on a magnitude relationship between characteristic values of the M colors in the target color path, where the target mapping relationship includes element information corresponding to each of the M colors; and
generating a bitstream corresponding to the target link, where the bitstream includes a plurality of pieces of element information; and
correspondingly, the generating a target two-dimensional code based on the M colors and the target link includes:
determining, based on the target mapping relationship, a color corresponding to each piece of element information in the bitstream, and generating the target two-dimensional code based on the color corresponding to each piece of element information in the bitstream.

In an embodiment, the obtaining, based on the target object, M colors included in the target object includes:
obtaining N colors with a larger pixel proportion in the target image, where N is a positive integer greater than M; and
obtaining M colors meeting a first preset condition from the N colors, where the first preset condition includes at least one of the following: a difference between characteristic values of any two of the M colors in a chrominance path is greater than a first preset value, and a characteristic value of each of the M colors in a saturation path is greater than a second preset value.

In an embodiment, the target link is used to trigger a corresponding function, where
the function includes at least one of the following:
jumping to a corresponding web page;
enabling a target function in a corresponding application;
displaying a corresponding character string;
displaying a corresponding video; or
playing corresponding audio.

According to a sixth aspect, this application provides a two-dimensional code generation method, and the method includes:

receiving M colors that are input by a user and obtaining a target link, where the M colors include at least one chromatic color, and M is an integer greater than 1; and
generating a target two-dimensional code based on the M colors and the target link, where the target two-dimensional code includes a plurality of elements, colors of the plurality of elements include the M colors, a color of each element corresponds to one piece of element information, and a plurality of pieces of element information corresponding to the colors of the plurality of elements are used to represent the target link.

An embodiment of this application provides a two-dimensional code generation method, including: receiving M colors that are input by a user and obtaining a target link, where the M colors include at least one chromatic color, and M is an integer greater than 1; and generating a target two-dimensional code based on the M colors and the target link, where the target two-dimensional code includes a plurality of elements, colors of the plurality of elements include the M colors, a color of each element corresponds to one piece of element information, and a plurality of pieces of element information corresponding to the colors of the plurality of elements are used to represent the target link. In this application, the target two-dimensional code including the M colors is generated based on the M colors that are input by the user, thereby implementing color customization of a two-dimensional code.

In an embodiment, the receiving M colors that are input by a user includes:
displaying a second interface, where the second interface includes a first input box, and the first input box is used to indicate the user to input color information used for indicating a color;
receiving M pieces of color information that are input by the user in the first input box; and
obtaining the M colors based on the M pieces of color information.

In an embodiment, the method further includes:
obtaining a characteristic value of each of the M colors in a target color path, where the M colors include at least one chromatic color, and M is an integer greater than 1;
determining a target mapping relationship based on a magnitude relationship between characteristic values of the M colors in the target color path, where the target mapping relationship includes element information corresponding to each of the M colors; and
generating a bitstream corresponding to the target link, where the bitstream includes a plurality of pieces of element information; and
correspondingly, the generating a target two-dimensional code based on the M colors and the target link includes:
determining, based on the target mapping relationship, a color corresponding to each piece of element information in the bitstream, and generating the target two-dimensional code based on the color corresponding to each piece of element information in the bitstream.

In an embodiment, the target link is used to trigger a corresponding function, where
the function includes at least one of the following:
jumping to a corresponding web page;
enabling a target function in a corresponding application;
displaying a corresponding character string;
displaying a corresponding video; or
playing corresponding audio.

According to a seventh aspect, this application provides a two-dimensional code generation apparatus, and the apparatus includes:

an obtaining module, configured to obtain a target object and a target link; and obtain, based on the target object, M colors included in the target object, where the M colors include at least one chromatic color, and M is an integer greater than 1; and a two-dimensional code generation module, configured to generate a target two-dimensional code based on the M colors and the target link, where a color style of the target two-dimensional code is consistent with a color style of the target object, the target two-dimensional code includes a plurality of elements, colors of the plurality of elements include the M colors, a color of each element corresponds to one piece of element information, and a plurality of pieces of element information corresponding to the colors of the plurality of elements are used to represent the target link.

In an embodiment, the target object is an identifier that indicates a target enterprise or a target commodity, the target two-dimensional code includes an image region in the middle and an encoding region surrounding the image region, the encoding region includes the plurality of elements, and the image region includes the target object.

In an embodiment, the obtaining module is configured to obtain M colors with a larger pixel proportion in the target object.

In an embodiment, the obtaining module is configured to: obtain N colors included in the target object, where N is a positive integer greater than M;
  display a target interface, where the target interface includes N color options, and each color option indicates one of the N colors;
  receive a selection operation performed by a user on M of the N color options; and
  obtain, in response to the selection operation, M colors indicated by the M color options.

In an embodiment, the obtaining module is configured to: display a first interface, where the first interface includes a first control, and the first control is used to indicate the user to input an image; and
  receive the target object that is input by the user based on the first control.

In an embodiment, the obtaining module is configured to: obtain a characteristic value of each of the M colors in a target color path, where the M colors include at least one chromatic color, and M is an integer greater than 1;
  determine a target mapping relationship based on a magnitude relationship between characteristic values of the M colors in the target color path, where the target mapping relationship includes element information corresponding to each of the M colors; and
  generate a bitstream corresponding to the target link, where the bitstream includes a plurality of pieces of element information; and
  correspondingly, the two-dimensional code generation module is configured to: determine, based on the target mapping relationship, a color corresponding to each piece of element information in the bitstream, and generate the target two-dimensional code based on the color corresponding to each piece of element information in the bitstream.

In an embodiment, the obtaining module is configured to: obtain N colors with a larger pixel proportion in the target object, where N is a positive integer greater than M; and
  obtain M colors meeting a first preset condition from the N colors, where the first preset condition includes at least one of the following: a difference between characteristic values of any two of the M colors in a chrominance path is greater than a first preset value, and a characteristic value of each of the M colors in a saturation path is greater than a second preset value.

In an embodiment, the target link is used to trigger a corresponding function, where
  the function includes at least one of the following:
  jumping to a corresponding web page;
  enabling a target function in a corresponding application;
  displaying a corresponding character string;
  displaying a corresponding video; or
  playing corresponding audio.

According to an eighth aspect, this application provides a two-dimensional code generation apparatus, and the apparatus includes:
  an obtaining module, configured to receive M colors that are input by a user and obtain a target link, where the M colors include at least one chromatic color, and M is an integer greater than 1; and
  a two-dimensional code generation module, configured to generate a target two-dimensional code based on the M colors and the target link, where the target two-dimensional code includes a plurality of elements, colors of the plurality of elements include the M colors, a color of each element corresponds to one piece of element information, and a plurality of pieces of element information corresponding to the colors of the plurality of elements are used to represent the target link.

In an embodiment, the obtaining module is configured to: display a second interface, where the second interface includes a first input box, and the first input box is used to indicate the user to input color information used for indicating a color;
  receive M pieces of color information that are input by the user in the first input box; and
  obtain the M colors based on the M pieces of color information.

In an embodiment, the obtaining module is configured to: obtain a characteristic value of each of the M colors in a target color path, where the M colors include at least one chromatic color, and M is an integer greater than 1;
  determine a target mapping relationship based on a magnitude relationship between characteristic values of the M colors in the target color path, where the target mapping relationship includes element information corresponding to each of the M colors; and
  generate a bitstream corresponding to the target link, where the bitstream includes a plurality of pieces of element information; and
  correspondingly, the two-dimensional code generation module is configured to:
  determine, based on the target mapping relationship, a color corresponding to each piece of element information in the bitstream, and generate the target two-dimensional code based on the color corresponding to each piece of element information in the bitstream.

In an embodiment, the target link is used to trigger a corresponding function, where
  the function includes at least one of the following:
  jumping to a corresponding web page;
  enabling a target function in a corresponding application;
  displaying a corresponding character string;
  displaying a corresponding video; or
  playing corresponding audio.

According to a ninth aspect, this application provides a terminal device, including one or more processors, one or more memories, a plurality of applications, and one or more programs, where the one or more programs are stored in the memory, and when the one or more programs are executed by the processor, the terminal device is enabled to perform the operations in any one of the first aspect to the second aspect, the fifth aspect to the sixth aspect, and the possible implementations of any one of the foregoing aspects.

According to a tenth aspect, this application provides an apparatus. The apparatus is included in a terminal device, and the apparatus has a function of implementing behavior of the terminal device in any one of the first aspect to the second aspect, the fifth aspect to the sixth aspect, and the possible implementations of any one of the foregoing aspects. The function may be implemented by hardware, or may be implemented by hardware executing corresponding software. The hardware or the software includes one or more modules or units corresponding to the foregoing function.

According to an eleventh aspect, this application provides a terminal device, including a display screen, a camera, one or more processors, a memory, a plurality of applications, and one or more computer programs. The one or more computer programs are stored in the memory, and the one or more computer programs include instructions. When the instructions are executed by an electronic device, the electronic device is enabled to perform the operations in any one of the first aspect to the second aspect, the fifth aspect to the sixth aspect and the possible implementations of any one of the foregoing aspects.

According to a twelfth aspect, this application provides a computer storage medium, including computer instructions. When the computer instructions are run on an electronic device or a server, the electronic device is enabled to perform the method in any possible implementation of any one of the foregoing aspects.

According to a thirteenth aspect, this application provides a computer program product, including code. When the code is run on an electronic device or a server, the electronic device is enabled to perform the method in any possible implementation of any one of the foregoing aspects.

An embodiment of this application provides a two-dimensional code generation method, including: obtaining M colors and a characteristic value of each color in a target color path, where the M colors include at least one chromatic color, and M is an integer greater than 1; determining a target mapping relationship based on a magnitude relationship between characteristic values of the M colors in the target color path, where the target mapping relationship includes element information corresponding to each of the M colors; obtaining a target link, and generating a bitstream corresponding to the target link, where the bitstream includes a plurality of pieces of element information; and determining, based on the target mapping relationship, a color corresponding to each piece of element information in the bitstream, and generating a target two-dimensional code based on the color corresponding to each piece of element information in the bitstream. In the foregoing manner, the target mapping relationship is determined based on the magnitude relationship between the characteristic values of the M colors in the target color path. In other words, when a two-dimensional code is being generated, a correspondence between colors and element information is generated based on a relative magnitude relationship between characteristic values of the colors in the target color path instead of associating each color with fixed element information. For example, the M colors include a color 1 and a color 2. In an existing implementation, the color 1 definitely corresponds to element information 1, and the color 2 definitely corresponds to element information 2. In this embodiment of this application, a color with a larger characteristic value in the target color path corresponds to the element information 1, and a color with a smaller characteristic value corresponds to the element information 2. If a characteristic value of the color 1 in the target color path is greater than a characteristic value of the color 2 in the target color path, the color 1 corresponds to the element information 1, and the color 2 corresponds to the element information 2. If the characteristic value of the color 1 in the target color path is less than the characteristic value of the color 2 in the target color path, the color 1 corresponds to the element information 2, and the color 2 corresponds to the element information 1. In this way, a correspondence between colors and element information is determined based on a magnitude relationship of characteristic values of the colors. Even if all colors in a two-dimensional code are customized and specified by a user, a code scanning side can restore, based on a magnitude relationship between characteristic values of colors of elements in the scanned two-dimensional code, a correspondence that is between colors and element information and that is used for generating the two-dimensional code, so as to accurately identify content in the two-dimensional code.

BRIEF DESCRIPTION OF DRAWINGS

FIG. 12 to FIG. 15 are schematic diagrams of interfaces of a terminal according to an embodiment of this application;

FIG. 16 to FIG. 21 are schematic diagrams of encoding rules according to an embodiment of this application;

DESCRIPTION OF EMBODIMENTS

The following describes embodiments of the present invention with reference to the accompanying drawings in embodiments of the present invention. Terms used in embodiments of the present invention are merely intended to explain specific embodiments of the present invention, and are not intended to limit the present invention.

In the specification, claims, and accompanying drawings of this application, the terms "first", "second", and the like are intended to distinguish between similar objects but do not necessarily indicate a specific order or sequence. It should be understood that the terms used in such a way are interchangeable in proper circumstances, and this is merely a discrimination manner for describing objects having a same attribute in embodiments of this application. In addition, the terms "include", "contain" and any other variants mean to cover a non-exclusive inclusion, so that a process, method, system, product, or device that includes a list of units is not necessarily limited to those units, but may include other units that are not clearly listed or that are inherent to these processes, methods, products, or devices.

Figure 1:
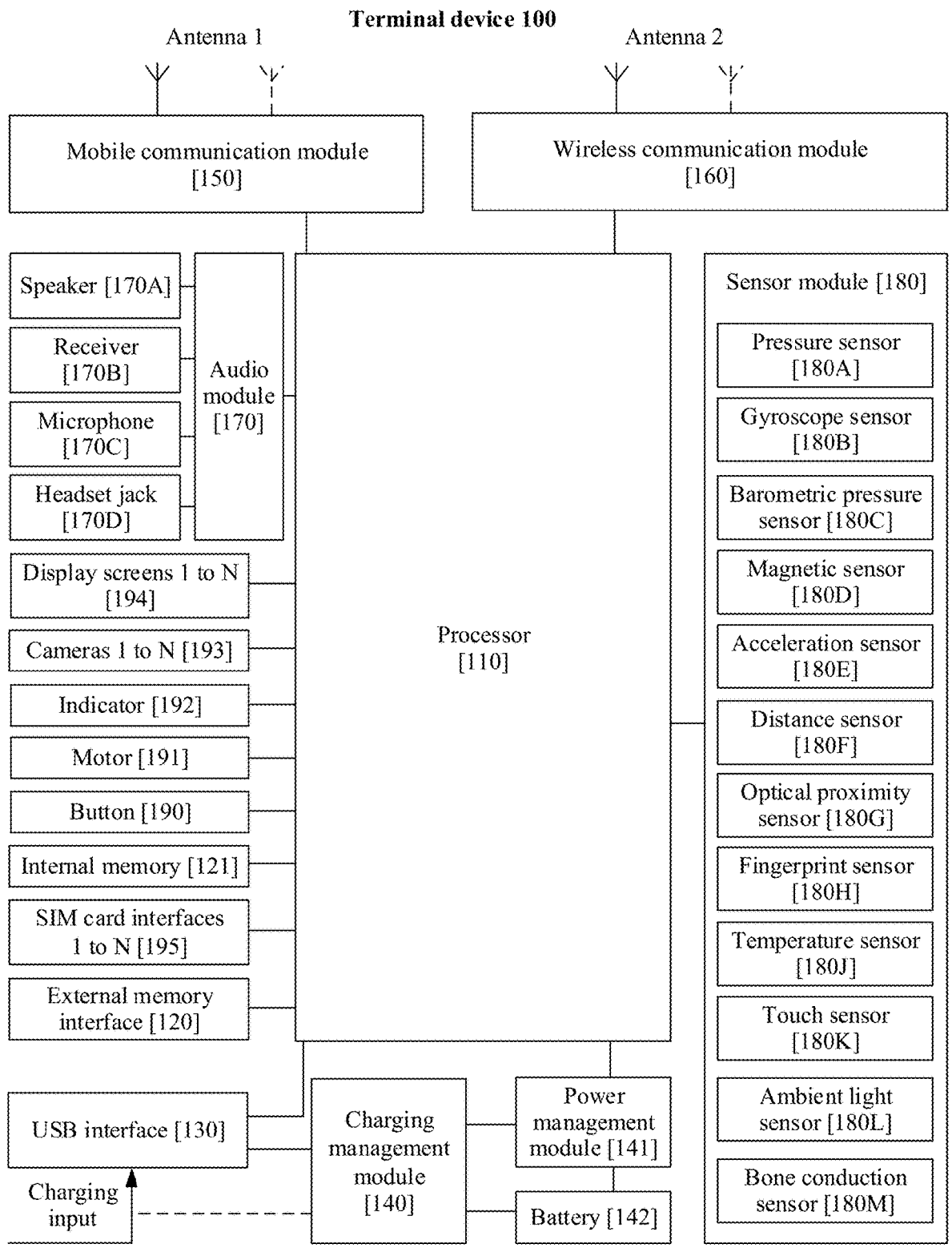
FIG. 1 is a schematic diagram of a structure of a terminal device according to an embodiment of this application.

For ease of understanding, the following describes, by using an example, a structure of a terminal device 100 provided in an embodiment of this application. FIG. 1 is a schematic diagram of a structure of a terminal device according to an embodiment of this application.

As shown in FIG. 1, the terminal device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display screen 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that, a structure illustrated in this embodiment of this application does not constitute a specific limitation on the terminal device 100. In some other embodiments of this application, the terminal device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the terminal device 100. The controller may generate an operation control signal based on an instruction operation code and a time sequence signal, to control instruction reading and instruction execution.

The memory may be further disposed in the processor 110, and is configured to store instructions and data. In some embodiments, the memory in the processor 110 is a cache memory. The memory may store instructions or data that has been used or is cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (IIC) interface, an inter-integrated circuit sound (IIS) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

It can be understood that an interface connection relationship between the modules illustrated in this embodiment of this application is merely an example for description, and does not constitute a limitation on the structure of the terminal device 100. In some other embodiments of this application, the terminal device 100 may alternatively use different interface connection manners in the foregoing embodiments or a combination of a plurality of interface connection manners.

The charging management module 140 is configured to receive a charging input from a charger. The charger may be a wireless charger or a wired charger. In some embodiments in which wired charging is used, the charging management module 140 may receive a charging input from the wired charger through the USB interface 130.

The power management module 141 is configured to connect to the battery 142, the charging management module 140, and the processor 110. The power management module 141 receives an input from the battery 142 and/or the charging management module 140, to supply power to the processor 110, the internal memory 121, the external memory interface 120, the display screen 194, the camera 193, the wireless communication module 160, and the like.

A wireless communication function of the terminal device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the terminal device 100 may be configured to cover one or more communication frequency bands. Different antennas may be further multiplexed, to increase antenna utilization. For example, the antenna 1 may be multiplexed as a diversity antenna of a wireless local area network. In some other embodiments, the antennas may be used in combination with a tuning switch.

The mobile communication module 150 may provide a wireless communication solution that includes 1G/3G/4G/5G and the like and that is used for the terminal device 100. The mobile communication module 150 may include at least one filter, a switch, a power amplifier, a low noise amplifier (LNA), and the like. The mobile communication module 150 may receive an electromagnetic wave by using the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave through the antenna 2 for radiation. In some embodiments, at least some function modules in the mobile communication module 150 may be disposed in the processor 110. In some embodiments, at least some function modules in the mobile communication module 150 may be disposed in a same component as at least some modules in the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal by using an audio device (which is not limited to the speaker 170A, the receiver 170B, or the like), or displays an image or a video by using the display screen 194. In some embodiments, the modem processor may be an independent component. In some other embodiments, the modem processor may be independent of the processor 110, and is disposed in a same component as the mobile communication module 150 or another function module.

The wireless communication module 160 may provide a wireless communication solution that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, and the like and that is used for the terminal device 100. The wireless communication module 160 may be one or more components integrating at least one communication processing module. The wireless communication module 160 receives an electromagnetic wave through the antenna 1, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave through the antenna 2 for radiation.

In some embodiments, the antenna 1 of the terminal device 100 is coupled to the mobile communication module 150, and the antenna 2 is coupled to the wireless communication module 160, so that the terminal device 100 can communicate with a network and another device by using a wireless communication technology. The wireless communication technology may include a global system for mobile communication (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The terminal device 100 implements a display function by using the GPU, the display screen 194, the application processor, and the like. The GPU is a microprocessor for image processing, and is connected to the display screen 194 and the application processor. The GPU is configured to: perform mathematical and geometric computation, and render an image. The processor 110 may include one or more GPUs that execute program instructions to generate or change display information.

The display screen 194 is configured to display an image, a video, and the like. The display screen 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the terminal device 100 may include one or N display screens 194, where N is a positive integer greater than 1.

In some feasible implementations, the display screen 194 may be configured to display interfaces for output by a system of the terminal device 100. For the interfaces for output by the terminal device 100, refer to related descriptions of the following embodiments.

The terminal device 100 may implement a shooting function by using the ISP, the camera 193, the video codec, the GPU, the display screen 194, the application processor, and the like.

The ISP may be configured to process data fed back by the camera 193. For example, during shooting, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the terminal device 100 may include one or N cameras 193, where N is a positive integer greater than 1.

The digital signal processor is configured to process a digital signal, and may process another digital signal in addition to the digital image signal.

The video codec is configured to compress or decompress a digital video. The terminal device 100 may support one or more types of video codecs. In this way, the terminal device 100 may play or record videos in a plurality of encoding formats, for example, moving picture experts group (MPEG)-1, MPEG-2, MPEG-3, and MPEG-4.

The NPU is a neural-network (NN) computing processor, quickly processes input information by referring to a structure of a biological neural network, for example, by referring to a mode of transmission between human brain neurons, and may further continuously perform self-learning. The NPU can implement application such as intelligent cognition of the terminal device 100, for example, image recognition, facial recognition, speech recognition, and text understanding.

The external memory interface 120 may be configured to connect to an external memory card, for example, a micro SD card, to extend a storage capability of the terminal device 100. The external memory card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121, to perform various function application and data processing of the terminal device 100. The internal memory 121 may include a program storage region and a data storage region. The program storage region may store an operating system, an application required by at least one function (for example, a voice play function and an image play function), and the like. The data storage region may store data (for example, audio data or a phone book) created in a process of using the terminal device 100. In addition, the internal memory 121 may include a high-speed random access memory, and may further include a non-volatile memory, for example, at least one magnetic disk storage device, a flash storage device, a universal flash storage (UFS), and the like.

The terminal device 100 may implement an audio function such as music playing or recording through the audio module 170, the speaker 170A, the receiver 170B, the microphone 170C, the headset jack 170D, the application processor, and the like. In some feasible implementations, the audio module 170 may be configured to play a sound corresponding to a video. For example, when the display screen 194 displays a video play picture, the audio module 170 outputs a video play sound.

The audio module 170 is configured to convert digital audio information into an analog audio signal for output, and is also configured to convert an analog audio input into a digital audio signal.

The speaker 170A, also referred to as a "loudspeaker", is configured to convert an audio electrical signal into a sound signal.

The receiver 170B, also referred to as an "earpiece", is configured to convert an audio electrical signal into a sound signal.

The microphone 170C, also referred to as a "mike" or a "mic", is configured to convert a sound signal into an electrical signal.

The headset jack 170D is configured to connect to a wired headset. The headset jack 170D may be the USB interface 130, or may be a 3.5 mm open mobile terminal platform (OMTP) standard interface or a cellular telecommunication industry association of the USA (CTIA) standard interface.

The pressure sensor 180A is configured to sense a pressure signal, and may convert the pressure signal into an electrical signal. In some embodiments, the pressure sensor 180A may be disposed on the display screen 194. The gyroscope sensor 180B may be configured to determine a motion posture of the terminal device 100. The barometric pressure sensor 180C is configured to measure barometric pressure.

The acceleration sensor 180E may detect accelerations in various directions (usually on three axes) of the terminal device 100. A magnitude and a direction of gravity may be detected when the terminal device 100 is stationary. The acceleration sensor 180E may be further configured to identify a posture of the terminal device, and is applied to switching between a landscape mode and a portrait mode, a pedometer, or the like.

The distance sensor 180F is configured to measure a distance.

The ambient light sensor 180L is configured to sense ambient light brightness.

The fingerprint sensor 180H is configured to collect a fingerprint.

The temperature sensor 180J is configured to detect a temperature.

The touch sensor 180K is also referred to as a "touch panel". The touch sensor 180K may be disposed on the display screen 194, and the touch sensor 180K and the display screen 194 constitute a touchscreen, which is also referred to as a "touch screen". The touch sensor 180K is configured to detect a touch operation performed on or near the touch sensor 180K. The touch sensor may transfer the detected touch operation to the application processor to determine a type of a touch event. A visual output related to the touch operation may be provided on the display screen 194. In some other embodiments, the touch sensor 180K may alternatively be disposed on a surface of the terminal device 100 at a location different from a location of the display screen 194.

The button 190 includes a power button, a volume button, and the like. The button 190 may be a mechanical button, or may be a touch button. The terminal device 100 may receive a button input, and generate a button signal input related to a user setting and function control of the terminal device 100.

The motor 191 may generate a vibration prompt.

The indicator 192 may be an indicator light, and may be configured to indicate a charging status and a power change, or may be configured to indicate a message, a missed call, a notification, and the like.

The SIM card interface 195 is configured to connect to a SIM card.

The foregoing describes a structure of the terminal device 100. The following describes a software structure of the terminal device. A software system of the terminal device 100 may use a layered architecture, an event-driven architecture, a microkernel architecture, a microservice architecture, or a cloud architecture. In embodiments of this application, an Android system with a layered architecture is used as an example to describe the software structure of the terminal device 100.

Figure 2:
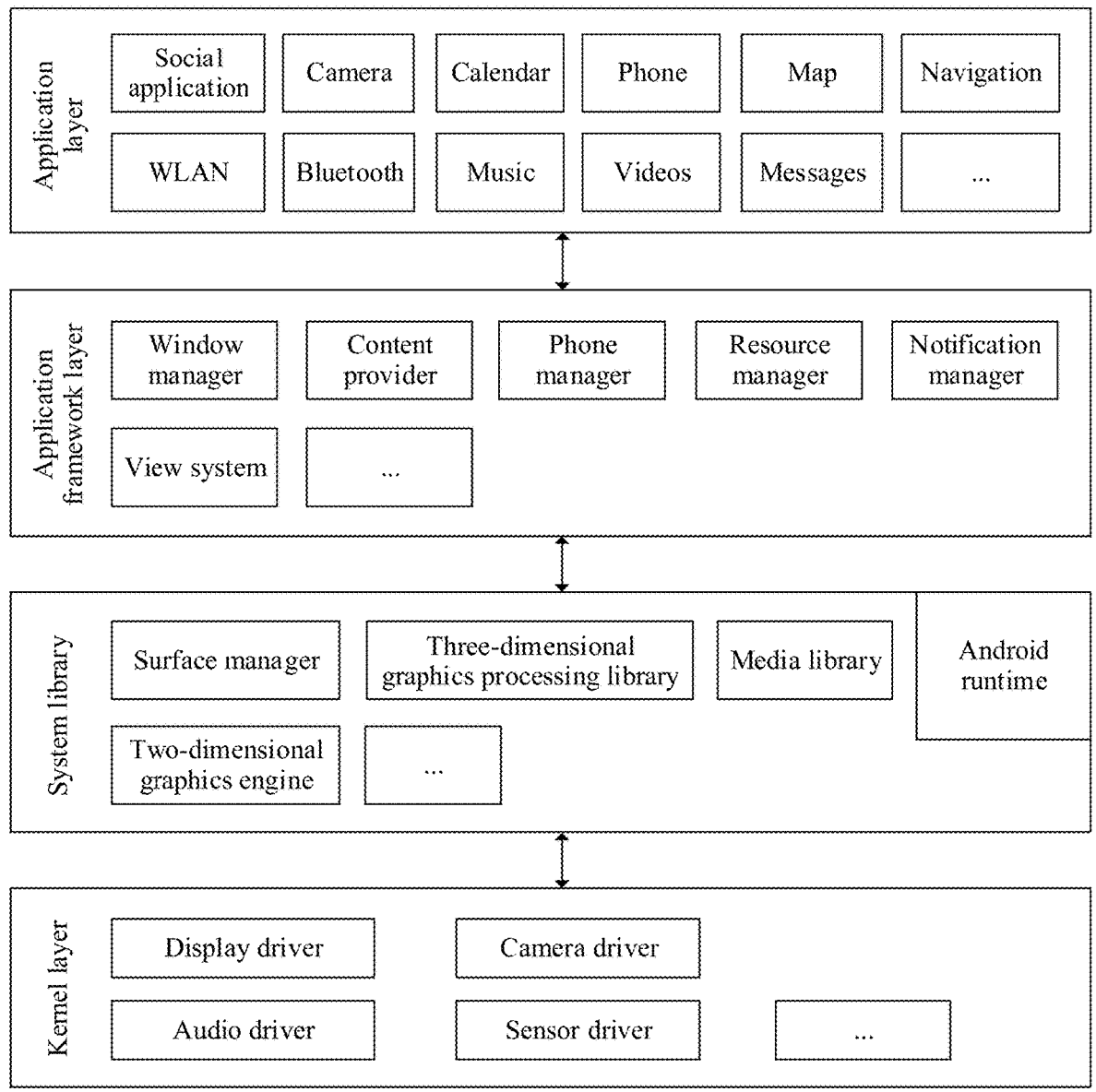
FIG. 2 is a block diagram of a software structure of a terminal device according to an embodiment of this application.

FIG. 2 is a block diagram of a software structure of a terminal device according to an embodiment of this application.

As shown in FIG. 2, software is divided into several layers by using a layered architecture, and each layer has a clear role and task. The layers communicate with each other through a software interface. In some embodiments, the Android system is divided into four layers: an application layer, an application framework layer, an Android runtime and system library, and a kernel layer from top to bottom. The application layer may include a series of application packages.

As shown in FIG. 2, the application packages may include applications such as Camera, Gallery, Calendar, Phone, Map, Navigation, WLAN, Bluetooth, Music, Videos, and Messages.

The application framework layer provides an application programming interface (API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display screen, determine whether there is a status bar, perform screen locking, take a screenshot, and the like.

The content provider is configured to: store and obtain data, and enable the data to be accessed by an application. The data may include a video, an image, audio, calls that are made and answered, a browsing history and bookmarks, an address book, and the like.

The view system includes visual controls such as a control for displaying a text and a control for displaying a picture. The view system may be configured to construct an application. Interface content may include one or more views. For example, a display interface including a notification icon of Messages may include a text display view and a picture display view.

The phone manager is configured to provide a communication function of the terminal device, for example, management of a call status (including answering, declining, or the like).

The resource manager provides various resources such as a localized character string, an icon, a picture, a layout file, and a video file for an application.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on a screen in a form of a dialog window. For example, text information is displayed in the status bar, a prompt tone is given, the terminal device vibrates, or an indicator light blinks.

The Android runtime includes a kernel library and a virtual machine. The Android runtime is responsible for scheduling and management of the Android system.

The kernel library includes two parts: a function that needs to be called in Java language and a kernel library of Android.

The application layer and the application framework layer run on the virtual machine. The virtual machine executes Java files of the application layer and the application framework layer as binary files. The virtual machine is configured to implement functions such as object lifecycle management, stack management, thread management, security and abnormality management, and garbage collection.

The system library may include a plurality of function modules, for example, a surface manager, a media library, a three-dimensional graphics processing library (for example, OpenGL ES), and a 2D graphics engine (for example, SGL).

The surface manager is configured to manage a display subsystem, and provide fusion of 2D and 3D layers for a plurality of applications.

The media library supports playback and recording in a plurality of commonly used audio and video formats, and static image files. The media library may support a plurality of audio and video encoding formats, for example, MPEG-4, H.264, MP3, AAC, AMR, JPG, and PNG.

The three-dimensional graphics processing library is configured to implement three-dimensional graphics drawing, image rendering, compositing, layer processing, and the like.

The 2D graphics engine is a drawing engine for 2D drawing.

The kernel layer is a layer between hardware and software. The kernel layer includes at least a display driver, a camera driver, an audio driver, and a sensor driver.

For ease of understanding, in the following embodiments of this application, a two-dimensional code generation method and a two-dimensional code identification method provided in embodiments of this application are described in detail with reference to the accompanying drawings and application scenarios by using a terminal device having the structure shown in FIG. 1 and FIG. 2 as an example.

Figure 3:
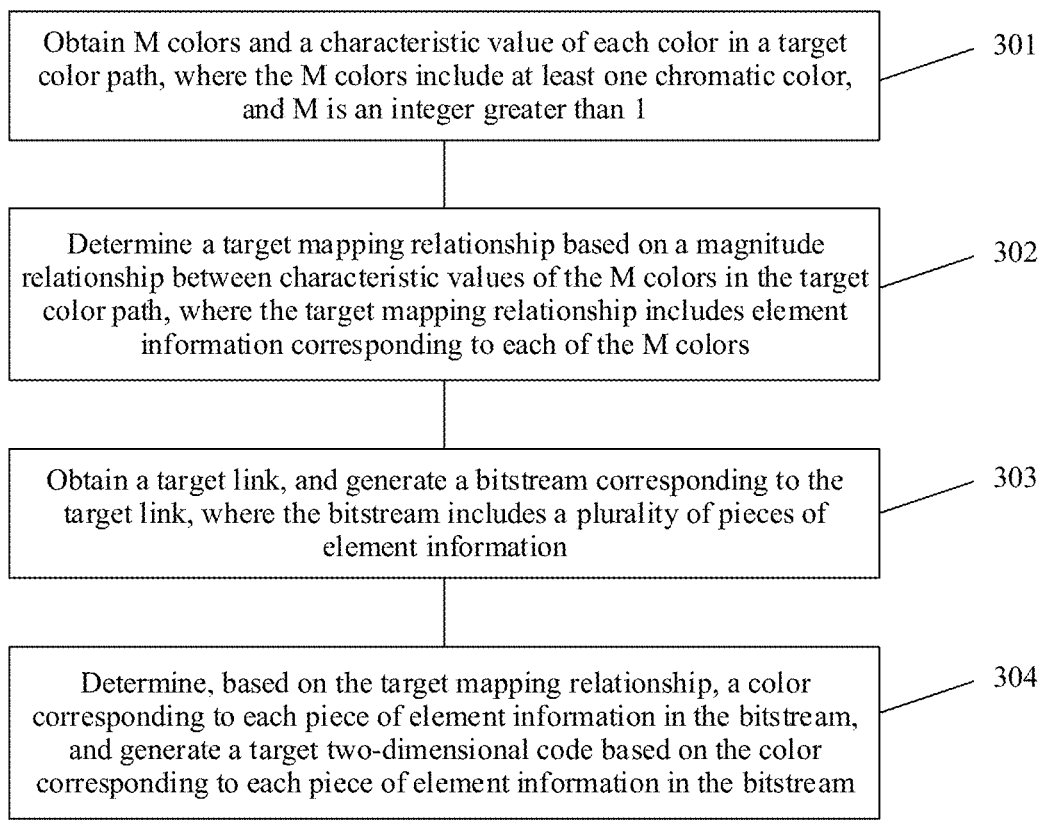
FIG. 3 is a schematic flowchart of a two-dimensional code generation method according to an embodiment of this application.

FIG. 3 is a schematic diagram of an embodiment of a two-dimensional code generation method according to an embodiment of this application. As shown in FIG. 3, the two-dimensional code generation method provided in this application may include the following operations.

Operation 301: Obtain M colors and a characteristic value of each color in a target color path, where the M colors include at least one chromatic color, and M is an integer greater than 1.

It should be understood that operation 301 may be performed by a terminal device or a server on a cloud side.

In this embodiment of this application, a type of a two-dimensional code may include but is not limited to PDF417, Aztec, a PDF 417 two-dimensional bar code, a Datamatrix two-dimensional bar code, a Maxicode two-dimensional bar code, Code 49, Code 16K, and Code one.

In some scenarios, in order to make a two-dimensional code visually distinctive, for example, have specified style recognition, a two-dimensional code that is distinctive in terms of color may be generated. For example, a logo of an enterprise A is red and blue. If a two-dimensional code including red and blue may be generated, the two-dimensional code has style recognition of the enterprise A.

The following provides several schematic scenarios in which a two-dimensional code needs to include a chromatic color.

1. Two-Dimensional Code of a URL/Link

For example, some enterprises have created a high-quality article, produced a very interesting video, or developed a very interesting website. A two-dimensional code may be generated provided that a corresponding URL is available, and it is especially suitable for posting the two-dimensional cod on Moments, an official website, a WeChat official account, and the like for display. If a video file is to be produced or shared, a video may be first uploaded to a video website or a server on an official website, and then based on a play URL of the video, a two-dimensional code is generated for others to watch. To reflect a characteristic of the enterprise, the two-dimensional code may have a color style similar to that of a logo of the enterprise.

2. Two-Dimensional Code of WeChat/Weibo/an Applet

In various scenarios such as releasing a poster and holding an activity, an enterprise may directly attach activity-related two-dimensional codes of a WeChat official account, Sina Weibo, and a WeChat applet, so that users directly scan the two-dimensional codes to follow, thereby effectively increasing traffic. To reflect a characteristic of the enterprise, the two-dimensional code may have a color style similar to that of a logo of the enterprise.

3. Two-Dimensional Code of a Business Card/a Phone Number/an SMS/an Email of an Employee In addition to personal use, an enterprise may also customize an exclusive two-dimensional code of a business card, a phone number, an SMS, and an email for employees, especially important employees. This facilitates employees to carry and users to view and save. To reflect a characteristic of the enterprise, the two-dimensional code of the business card/phone number/SMS/email of the enterprise may have a color style similar to that of a logo of the enterprise.

4. Two-Dimensional Code of an Enterprise Product

On occasions such as releasing a product, participating in new product demonstration, holding a collective conference or an all-employee event, basic parameters such as a name, a production date, an origin, a price, a picture, and usage of a product may be uploaded to produce and generate a two-dimensional code, and some necessary information about an activity or a conference is uploaded to produce and generate a two-dimensional code, so that users can directly scan the two-dimensional code to learn about the information conveniently. The two-dimensional code of the enterprise product may have a color style similar to that of a logo of the enterprise.

5. Two-Dimensional Code of Wireless Fidelity (Wi-Fi)

In public places such as an office and a conference room of an enterprise, a free Wi-Fi account and a password are uploaded to generate a corresponding two-dimensional code, and the two-dimensional code is placed on a desk or a wall for visitors to access through code scanning. This is very covert and creative, and has a branding effect. The two-dimensional code of the enterprise Wi-Fi may have a color style similar to that of a logo of the enterprise.

In some other scenarios, when using the terminal device, a user sometimes needs to show, on the terminal device, a two-dimensional code generated in real time.

For example, in a scenario in which the terminal device needs to be used for payment, the user may open two-dimensional code payment interfaces on some applications with a payment function, for example, two-dimensional code payment and collection interfaces of a WeChat application and an Alipay application, and for another example, a two-dimensional code payment interface of a Huawei Wallet application. The two-dimensional code payment interface includes a generated payment two-dimensional code. Another device may scan the payment two-dimensional code in the two-dimensional code payment interface, to implement a transaction. The another device may be a desktop or mobile code scanner device, or may be an electronic device such as a smartphone or a tablet computer.

For another example, in a scenario in which a user takes a bus, the user may open, on some applications with a bus ride function, a two-dimensional code interface used to record a pick-up location and a drop-off location, and place a two-dimensional code in the two-dimensional code interface in a scanning region of a two-dimensional code scanning device on the bus, to record the pick-up location or the drop-off location. The two-dimensional code scanning device on the bus may be a desktop or mobile code scanner device, or may be an electronic device such as a smartphone or a tablet computer.

For another example, some applications may generate a two-dimensional code including user identity information, and another device may scan the two-dimensional code to obtain the user identity information. For example, a two-dimensional code may include information about a user's account, and after scanning the two-dimensional code, another device may perform operations such as adding a friend to the account and inviting the account of the two-dimensional code to join a chat group. For another example, a two-dimensional code may include a link of a store or a link of an enterprise home page, and after scanning the two-dimensional code, another device may open the corresponding store or enterprise home page.

In this embodiment of this application, in order to generate a two-dimensional code including a chromatic color, M colors may be first obtained, and the M colors may be used as color selection for elements in a finally generated two-dimensional code.

It should be understood that colors may be classified into achromatic colors and chromatic colors. The achromatic colors may be white, black, and various shades of gray. White, gray, and black objects are not selective for reflection of each wavelength in a spectrum, and are neutral colors. The chromatic colors are all colors except white and black series. The chromatic colors are selective for reflection of each wavelength in a spectrum, and therefore can appear under irradiation of white light. Colors have three characteristics: luminance, a hue, and saturation. The achromatic colors have only a difference in the luminance, but not the hue and the saturation. The luminance indicates brightness of color light, and is related to energy included in the color light. For a chromatic color, luminance of the chromatic color is proportional to its luminous flux (optical power). The hue indicates a color category, and common red, green, and blue are hues. The saturation indicates a level of intensity of a hue. Saturation of monochromatic light is the highest. If more white light is added to the monochromatic light, the saturation is lower. Saturation of white light is zero.

The following describes how to trigger obtaining of M colors.

In an embodiment, the obtaining of M colors may be triggered based on an application with a function of generating a two-dimensional code on the terminal device or an option on some web pages with a function of generating a two-dimensional code.

Figure 4:
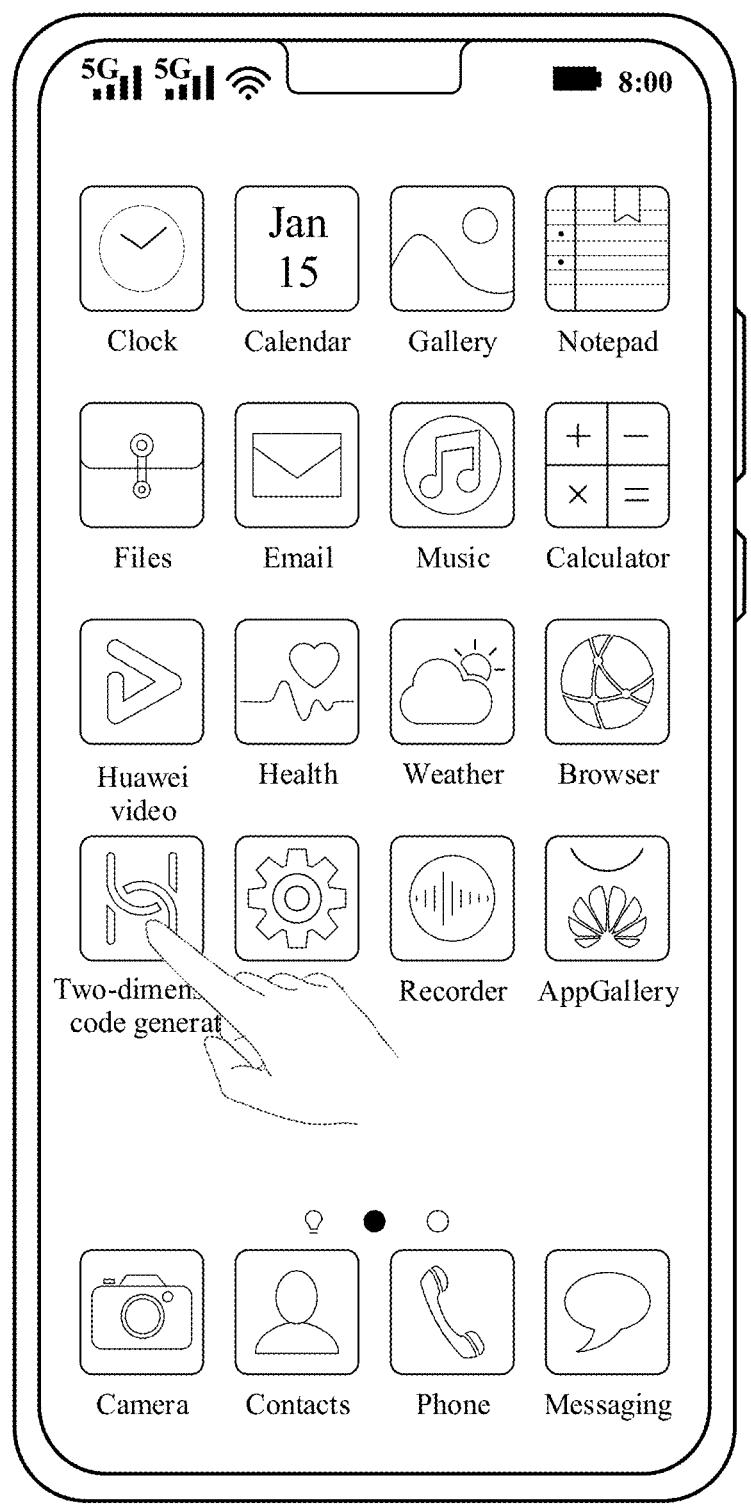
FIG. 4 to FIG. 10 are schematic diagrams of interfaces of a terminal according to an embodiment of this application.

An application with a function of generating a two-dimensional code on the terminal device is used as an example. FIG. 4 is a schematic diagram of an operation interface of a terminal device. As shown in FIG. 4, the terminal device may include an application for generating a two-dimensional code (for example, a two-dimensional code generator shown in FIG. 4). A user may tap the two-dimensional code generator, and in response to the tap operation of the user, the terminal device may display an application interface shown in FIG. 5. The application interface of the two-dimensional code generator may include a character string input box, a color customization control, a logo addition control, and a two-dimensional code generation control. The user may input, in the character string input box, content that needs to be carried in a two-dimensional code, for example, a web page link or an audio or video link. This is not limited herein. The color customization control may indicate a page on which the user specifies a color of an element in a two-dimensional code. The user may tap the color customization control, and in response to the tap operation of the user, the terminal device may display a page for obtaining a color (for example, an interface shown in FIG. 11. How to obtain M colors based on the interface is described in the following embodiment, and is not described herein). Correspondingly, the terminal device may change a color of the two-dimensional code based on a color input by the user.

Figure 5:
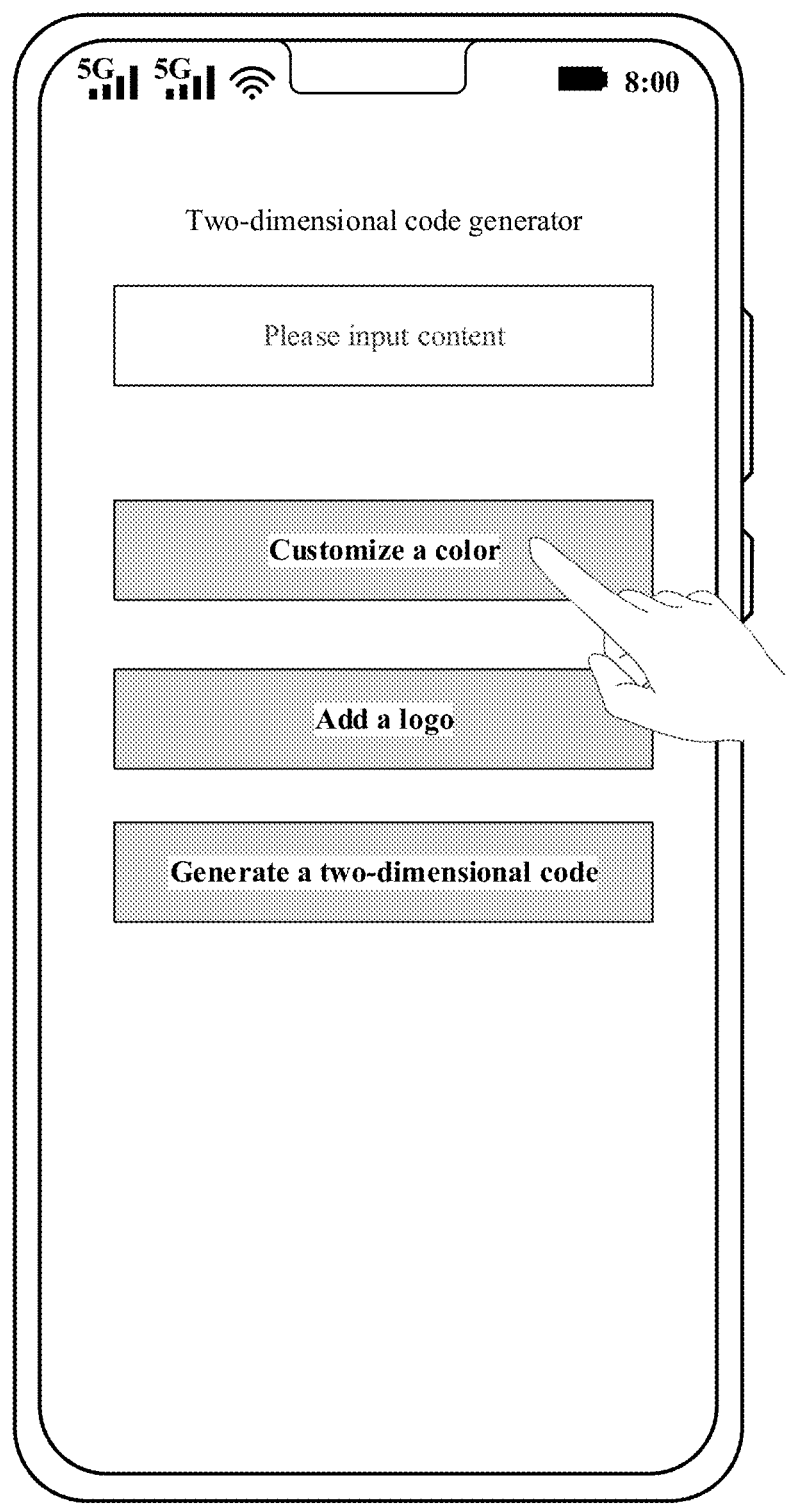

It should be understood that the application interfaces shown in FIG. 4 and FIG. 5 are merely an example, and control arrangement and control types on the interfaces are merely an example. This is not limited in this application.

In an embodiment, some applications may generate a two-dimensional code including user identity information, and another device may scan the two-dimensional code to obtain the user identity information. For example, a two-dimensional code may include information about a user's account, and after scanning the two-dimensional code, another device may perform operations such as adding a friend to the account and inviting the account of the two-dimensional code to join a chat group. For another example, a two-dimensional code may include a link of a store or a link of an enterprise home page, and after scanning the two-dimensional code, another device may open the corresponding store or enterprise home page.

Figure 6:
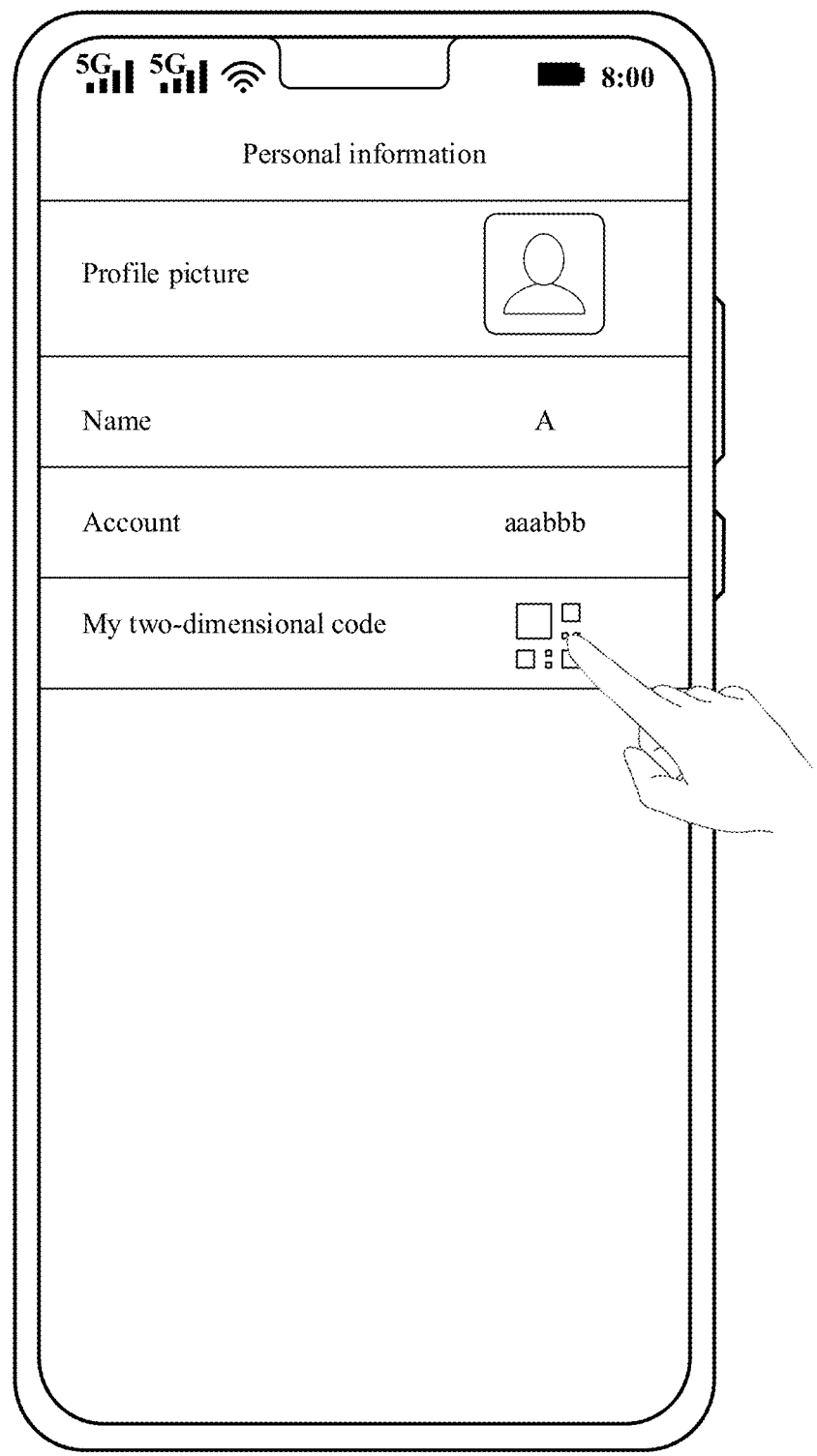
Figure 7:
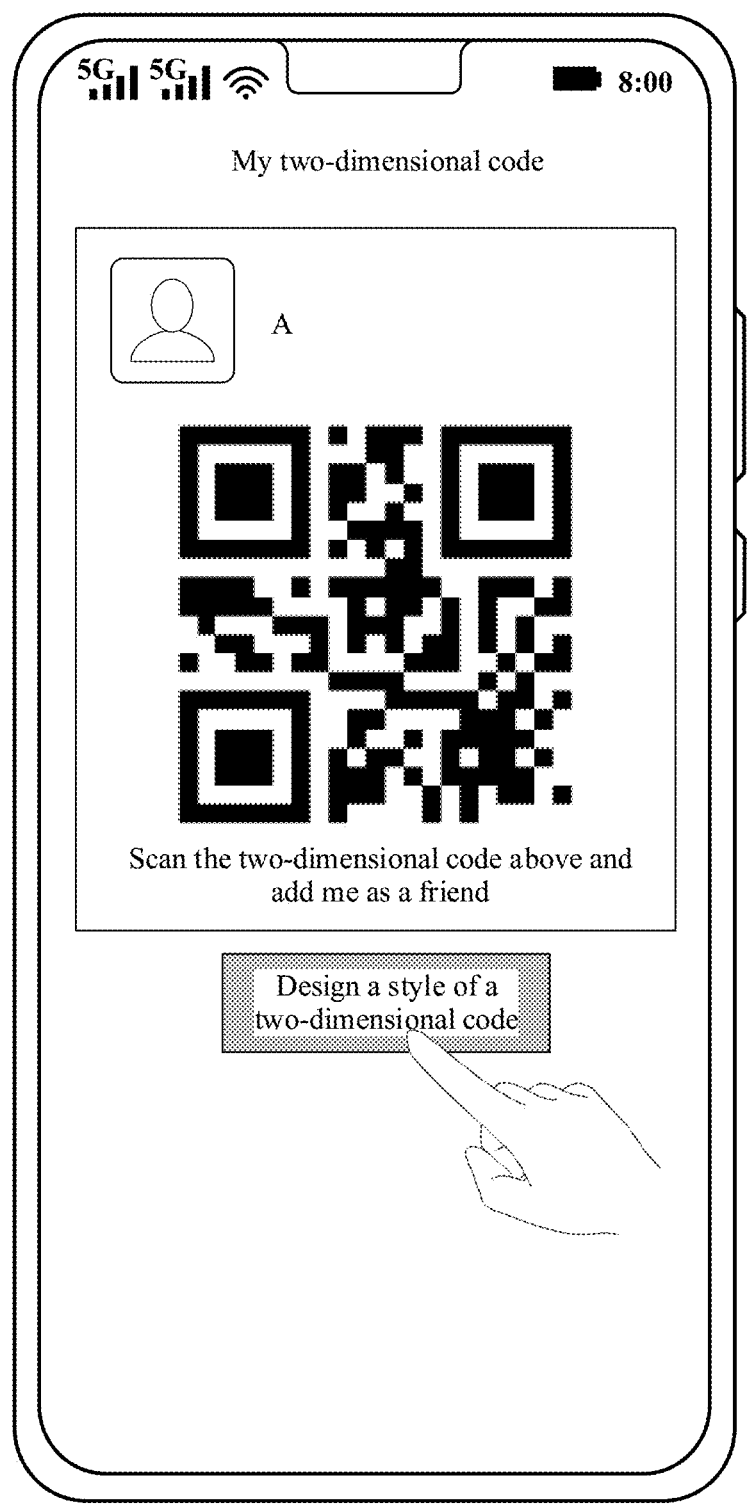
Figure 8:
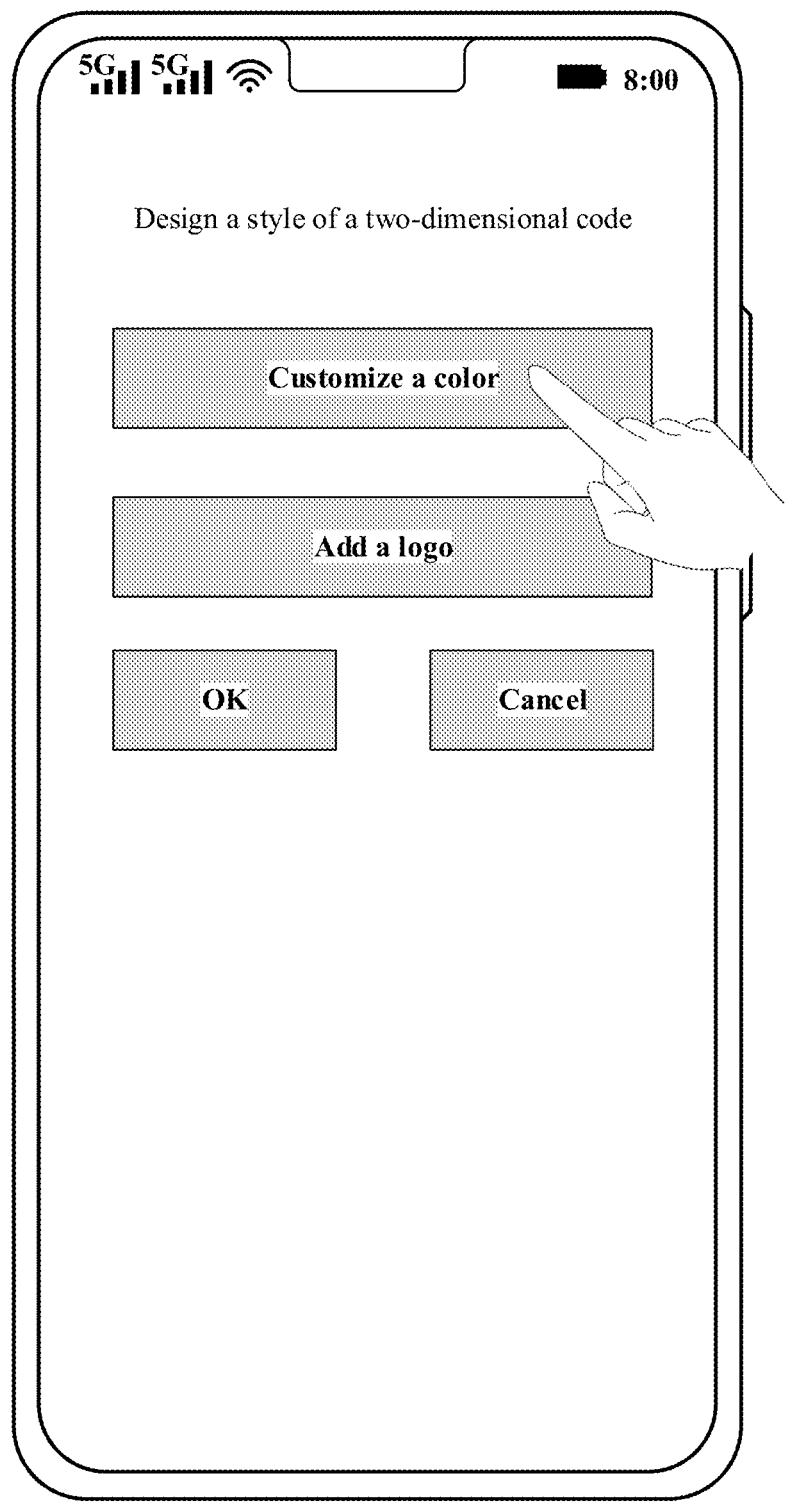

For example, FIG. 6 is a schematic diagram of an operation interface of a terminal device. As shown in FIG. 6, the terminal device may include an application for generating a two-dimensional code including user identity information. A user may tap a control for generating a two-dimensional code; and in response to the tap operation of the user, the terminal device may display an application interface shown in FIG. 7. The interface shown in FIG. 7 includes a two-dimensional code display region and a two-dimensional code style change control. The user may tap the two-dimensional code style change control; and in response to the tap operation of the user, the terminal device may display a display interface shown in FIG. 8. The display interface may include a color customization control, a logo addition control, and the like; and the color customization control may indicate a page on which the user specifies a color of an element in a two-dimensional code. The user may tap the color customization control; and in response to the tap operation of the user, the terminal device may display a page for obtaining a color (for example, an interface shown in FIG. 11. How to obtain M colors based on the interface is described in the following embodiment, and is not described herein). Correspondingly, the terminal device may change a color of the two-dimensional code based on a color input by the user.

In some other scenarios, in a scenario in which the terminal device needs to be used for payment, the user may open two-dimensional code payment interfaces on some applications with a payment function, for example, two-dimensional code payment and collection interfaces of a WeChat application and an Alipay application, and for another example, a two-dimensional code payment interface of a Huawei Wallet application. The two-dimensional code payment interface includes a generated payment two-dimensional code. Another device may scan the payment two-dimensional code in the two-dimensional code payment interface, to implement a transaction.

Figure 9:
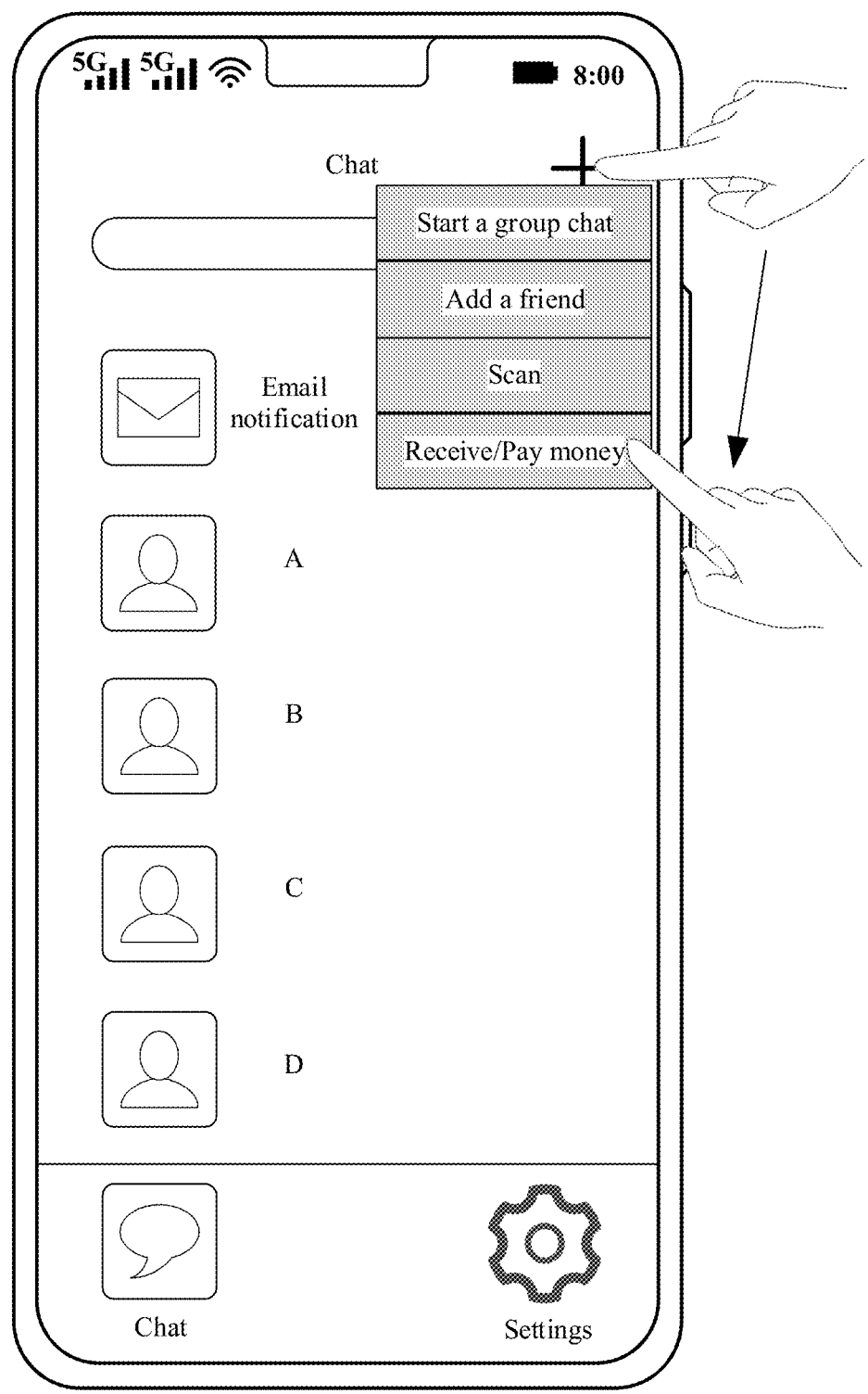
Figure 10:

For example, FIG. 9 is a schematic diagram of an operation interface of a terminal device. As shown in FIG. 9, the terminal device may include an application for generating a payment and collection two-dimensional code. A user may tap a control for generating a payment and collection two-dimensional code; and in response to the tap operation of the user, the terminal device may display an application interface shown in FIG. 10. The interface shown in FIG. 10 includes a two-dimensional code display region and a two-dimensional code style change control. The user may tap the two-dimensional code style change control; and in response to the tap operation of the user, the terminal device may display a display interface shown in FIG. 8. The display interface may include a color customization control, a logo addition control, and the like; and the color customization control may indicate a page on which the user specifies a color of an element in a two-dimensional code. The user may tap the color customization control; and in response to the tap operation of the user, the terminal device may display a page for obtaining a color (for example, an interface shown in FIG. 11. How to obtain M colors based on the interface is described in the following embodiment, and is not described herein). Correspondingly, the terminal device may change a color of the two-dimensional code based on a color input by the user.

It should be understood that, the application interfaces shown in FIG. 6 to FIG. 11 are merely examples, and control arrangement and the control types on the interfaces are merely examples. This is not limited in this application.

The following describes how to obtain M colors.

In this embodiment of this application, to generate a two-dimensional code including several colors specified by the user, or generate a two-dimensional code of a color style specified by the user, a color input by the user may be obtained, or a color may be extracted from a target object provided by the user. The descriptions are given separately below:

1. Obtain M Colors from a Target Object.

For example, operation 301 is performed by the terminal device. Specifically, in an embodiment, the user may input the target object. Correspondingly, the terminal device may obtain the target object, and the terminal device may obtain, based on the target object, M colors included in the target object.

The terminal device may automatically obtain, based on the target object, the M colors included in the target object. For example, the terminal device may obtain the target object, and obtain M colors with a larger pixel proportion in the target object; or the terminal device may obtain N colors with a larger pixel proportion in the target object, and obtain M colors meeting a first preset condition from the N colors. The following separately describes the two implementations.

In an optional implementation, the terminal device may obtain the target object, and obtain the M colors with a larger pixel proportion in the target object. Algorithms for extracting colors from the target object may include but are not limited to methods such as color quantization, clustering, and color modeling. For example, a clustering algorithm is used during implementation. A K-means clustering algorithm may be used to extract main colors from an input target picture, and sort the main colors in descending order of quantities of pixels in the target object, to obtain M colors with a larger pixel proportion in the target object.

In this embodiment of this application, the target object may be an image including a logo of an enterprise, and the M colors with a larger pixel proportion in the target object may represent main colors of the logo of the enterprise.

In this embodiment of this application, the target object may be an image including a commodity, and the M colors with a larger pixel proportion in the target object may represent main colors of the commodity.

In an optional implementation, the N colors with a larger pixel proportion in the target object may be obtained, where N is a positive integer greater than M; and the M colors meeting the first preset condition are obtained from the N colors, where the first preset condition includes at least one of the following: a difference between characteristic values of any two of the M colors in a chrominance path is greater than a first preset value, and a characteristic value of each of the M colors in a saturation path is greater than a second preset value.

In this embodiment of this application, the N colors may be first obtained from the target object, and M better colors are selected from the N colors. The "better" means that a two-dimensional code including the M selected colors is more aesthetic. Specifically, if at least two of the M colors are similar, or at least one of the M colors is a color with relatively low purity, a two-dimensional code generated based on the M colors has relatively poor aesthetics.

Therefore, the N colors may be obtained from the target object, and the M better colors may be selected from the N colors. Specifically, the M colors meeting the first preset condition may be obtained from the N colors, where the first preset condition includes at least one of the following: the difference between the characteristic values of the any two of the M colors in the chrominance path is greater than the first preset value, and the characteristic value of each of the M colors in the saturation path is greater than the second preset value.

It should be understood that, the first preset value may be set based on an actual case, provided that the first preset value can indicate that two colors are well differentiated visually. A specific value of the first preset value is not limited in this application.

It should be understood that the second preset value may be set based on an actual case, provided that the second preset value can indicate that a color visually has better color purity. A specific value of the second preset value is not limited in this application.

In an embodiment, the N colors may be obtained from the target object, and M colors in which a difference between characteristic values of any two colors in the chrominance path is greater than the first preset value are selected from the N colors.

In an embodiment, the N colors may be obtained from the target object, and M colors in which a characteristic value of each color in the saturation path is greater than the second preset value are selected from the N colors.

In an embodiment, the N colors may be obtained from the target object, and M colors in which a difference between characteristic values of any two colors in the chrominance path is greater than the first preset value and a characteristic value of each color in the saturation path is greater than the second preset value are selected from the N colors.

In an optional implementation, only less than M colors can be selected from the N colors. In other words, less than M colors in the N colors meet the first preset condition. In order to obtain M colors, at least one color may be selected from preset colors and added to the selected less than M colors, to obtain the M colors.

In an embodiment, the M colors that include the preset color and the selected less than M colors meet the first preset condition in the foregoing embodiment.

For example, M is 4. First, a color whose saturation is less than the second preset value in the N colors with a larger pixel proportion in the target object is excluded, and a first color that meets the requirement is determined as a first selected color. Then, sequential comparison is performed. If a difference between a characteristic value of a color in the chrominance path and a characteristic value of the selected color in the chrominance path is greater than the first preset value, this color is reserved and used as a selected color. If a quantity of selected colors is less than 4, a color may be selected from preset default colors for addition. For example, if only one color is selected, black and white are added, and a color whose saturation is greater than the second preset value and for which a difference between a characteristic value of the color in the chrominance path and a characteristic value of the selected color in the chrominance path is greater than the first preset value is added; if only two colors are selected, black and white are added; and if only three colors are selected, black is added.

In addition, the terminal device may alternatively determine the M colors from the N colors based on selection of the user.

In an embodiment, the terminal device may obtain N colors included in the target object, where N is a positive integer greater than M; display the N colors, and receive a first instruction of the user, where the first instruction is used to instruct to select the M colors from the N colors; and in response to the first instruction, obtain M colors included in the target object. In other words, the terminal device may obtain N candidate colors from the target object for selection by the user. The user may select M colors from the N candidate colors, and correspondingly, the terminal device may obtain the M colors selected by the user.

In an embodiment, a characteristic value of a color obtained based on the target object in a luminance path may be further adjusted, so that a difference between characteristic values of any two of M to-be-processed colors in the luminance path is greater than a preset value. Specifically, the terminal device may obtain a target object, obtain, based on the target object, M to-be-processed colors included in the target object, and adjust characteristic values of the M to-be-processed colors in the luminance path, so that the difference between the characteristic values of the any two of the M to-be-processed colors in the luminance path is greater than the preset value, so as to obtain the M colors.

In a scenario, a code scanning device may be incompatible with scanning of a chromatic two-dimensional code. Specifically, some scanning devices can obtain only a grayscale image. To enable such a code scanning device to scan a chromatic two-dimensional code, grayscales (characteristic values in the luminance path) of colors included in the two-dimensional code need to be distinguished. More specifically, a color A and a color B are chromatic colors. Although the color A and the color B are different, the code scanning device that is incompatible with scanning of a chromatic two-dimensional code can obtain only characteristic values of the color A and the color B in the luminance path after scanning the color A and the color B. In this embodiment, a characteristic value of a color obtained based on the target object in the luminance path may be adjusted, so that the difference between the characteristic values of the any two of the M to-be-processed colors in the luminance path is greater than the preset value. In this way, after scanning the color A and the color B, the code scanning device that is incompatible with scanning of a chromatic two-dimensional code can determine that the color A and the color B are different colors, and determine a magnitude relationship between the characteristic values of the color A and the color B in the luminance path.

It should be understood that a magnitude of the preset value may be set based on an actual case, provided that the code scanning device can accurately distinguish a magnitude relationship between characteristic values of colors in the luminance path. A specific magnitude of the preset value is not limited in this embodiment of this application.

Figure 11:
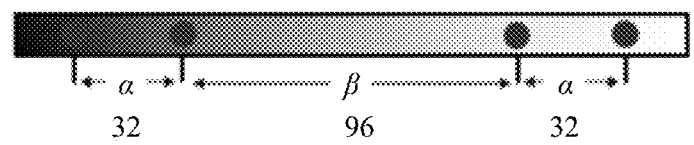
FIG. 11 is a schematic diagram of grayscale distribution according to an embodiment of this application.

For example, with reference to FIG. 11, in an example in which M is 4, FIG. 11 shows a relationship between characteristic values of four colors in the luminance path. A grayscale value difference between a color with a largest characteristic value in the luminance path and a color with a second largest characteristic value in the luminance path is 32, a grayscale value difference between the color with the second largest characteristic value in the luminance path and a color with a third largest characteristic value in the luminance path is 96, and a grayscale difference between the color with the third largest characteristic value in the luminance path and a color with a smallest characteristic value in the luminance path is 32.

In this embodiment of this application, the M colors meeting the first preset condition may be obtained from the N colors, and the characteristic values of the M to-be-processed colors in the luminance path are adjusted, so that the difference between the characteristic values of the any two of the M to-be-processed colors in the luminance path is greater than the preset value.

For example, Table 1 shows that four to-be-processed colors obtained by the terminal device based on a target picture, and then adjusts characteristic values of the to-be-processed colors in the luminance path, to obtain adjusted colors shown in Table 2.

TABLE 1

| RGB value |
| --- |
| 54, 138, 248 |
| 254, 211, 50 |
| 35, 24, 21 |
| 249, 245, 236 |

TABLE 2

| RGB value |
| --- |
| 4, 61, 136 |
| 254, 222, 106 |
| 35, 24, 21 |
| 249, 245, 236 |

2. Obtain M Colors that are Input by a User.

In this embodiment of this application, the terminal device may receive the M colors that are input by the user.

Specifically, the terminal device may display a second interface, where the second interface includes a first input box, and the first input box is used to indicate the user to input color information used for indicating a color; receive M pieces of color information that are input by the user in the first input box; and obtain the M colors based on the M pieces of color information. The color information may be an RGB value of a color or other information that may indicate a color. This is not limited in this embodiment.

The following describes, from a perspective of interaction between the user and the terminal device, how the terminal device obtains the M colors.

In this embodiment of this application, if the terminal device obtains the M colors based on the target object that is input by the user, a first interface may be displayed, where the first interface includes a first control, and the first control is used to indicate the user to input an image. Then, the terminal device may receive the target object that is input by the user based on the first control.

Figure 12:
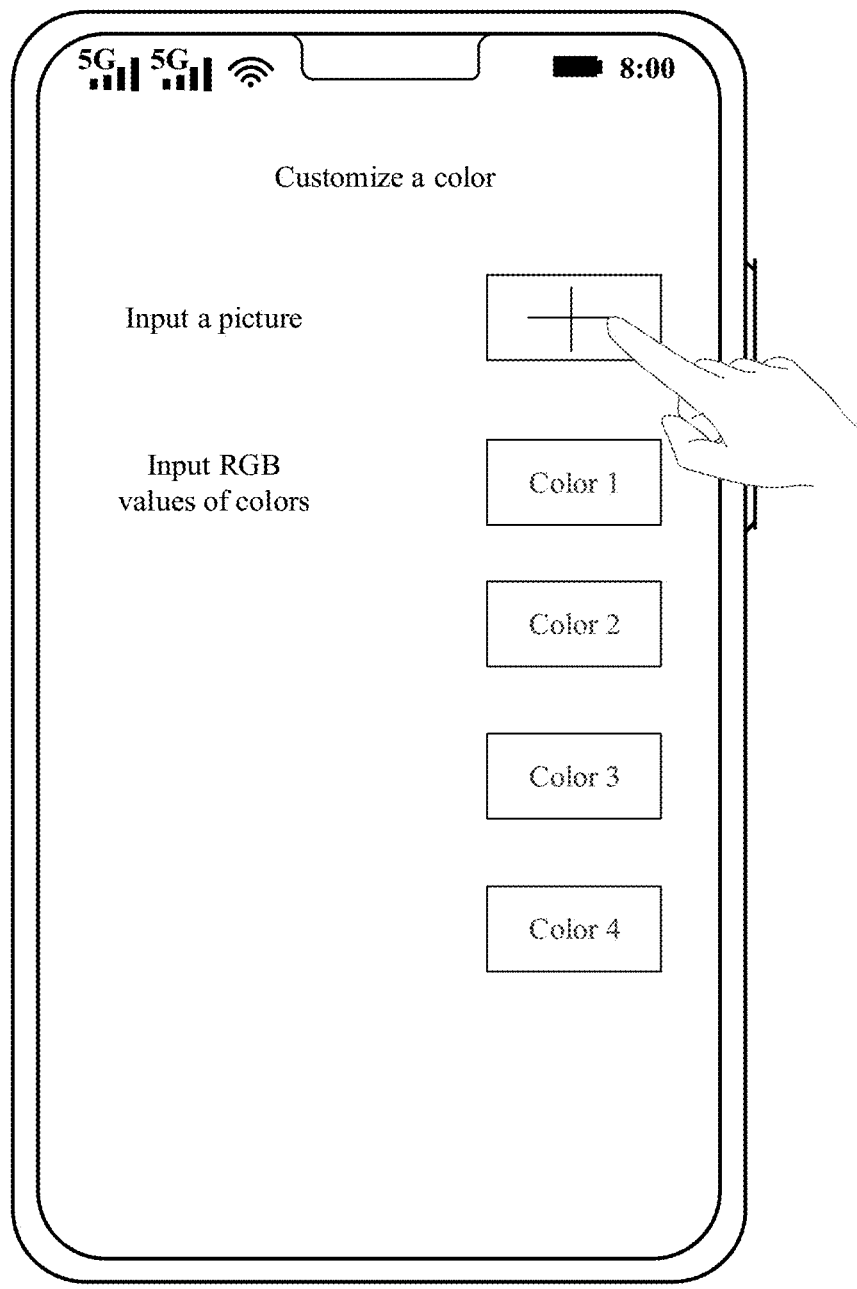

Specifically, with reference to FIG. 12, the terminal device may display an interface (the first interface in the foregoing embodiment) for setting a color of the two-dimensional code. The interface may include a control (the first control in the foregoing embodiment) for inputting a picture. The user may tap the control for inputting a picture, and input the target object. Then, the terminal device may receive the target object that is input by the user based on the first control.

Figure 13:
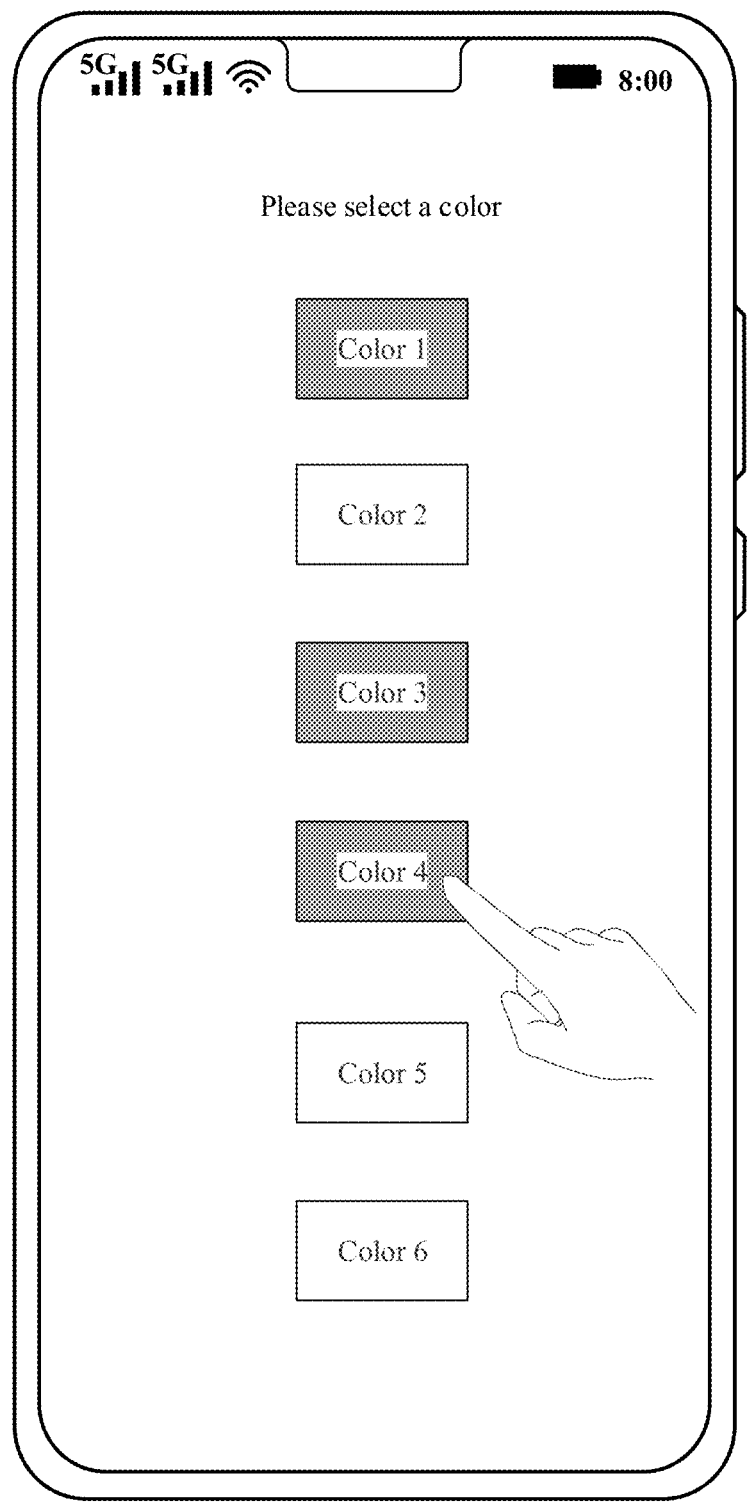
Figure 14:
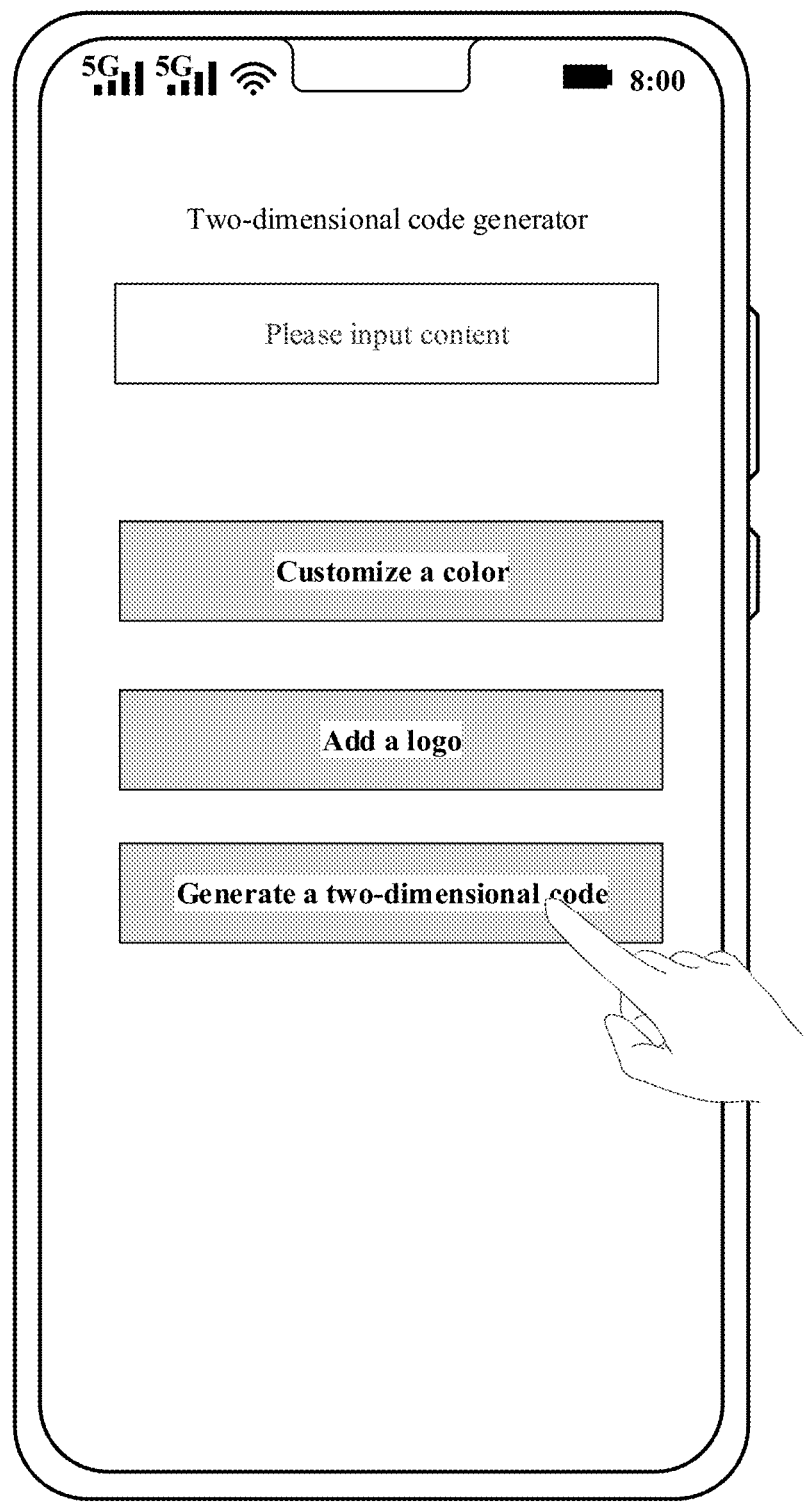

In addition, in this embodiment of this application, the terminal device may obtain N candidate colors from the target object for selection by the user. The user may select M colors from the N candidate colors, and correspondingly, the terminal device may obtain the M colors selected by the user. With reference to FIG. 13, the terminal device may display an interface for selecting a color of a two-dimensional code. The interface for selecting a color may display five candidate colors obtained from the target object. The user may select M colors from the five candidate colors, and correspondingly, the terminal device may obtain the M colors selected by the user.

In addition, in this embodiment of this application, the terminal device may alternatively obtain the M colors based on the color information that is input by the user. With reference to FIG. 12, the terminal device may display an interface for setting a color of a two-dimensional code. The interface may include a picture input control and a plurality of input boxes. The user may input information about one color in each input box. For example, in the interface shown in FIG. 12, the user may input an RGB value of one color in each input box.

It should be understood that, the foregoing descriptions are provided by using an example in which the terminal device obtains the M colors. In actual application, the M colors may be alternatively obtained by a server on a cloud side. For example, some web pages may have a function of generating a two-dimensional code. The user may input a color of a two-dimensional code on a web page, or input a target object. The server may receive the color input by the user or the target object, and obtain the M colors based on the color input by the user or the target object.

Figures 15, 16:
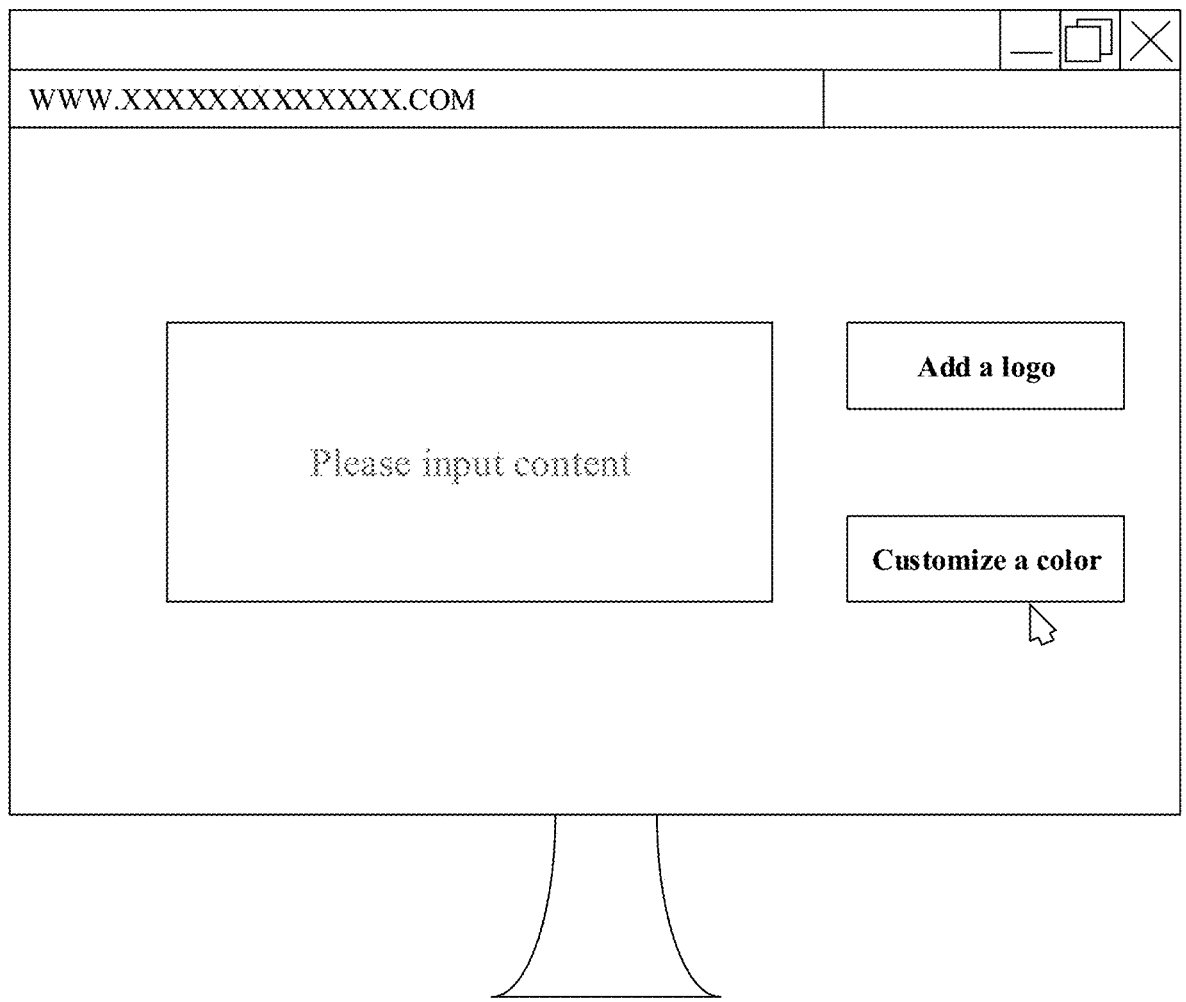

For example, FIG. 15 is a schematic diagram of a web page interface. As shown in FIG. 15, a web page with a function of generating a two-dimensional code may include a color customization option. The user may tap the color customization option to input a color of a two-dimensional code, or input a target object. For details, refer to the descriptions of the embodiments corresponding to FIG. 12 and FIG. 13 in the foregoing embodiments. Similar parts are not described again.

Operation 302: Determine a target mapping relationship based on a magnitude relationship between characteristic values of the M colors in the target color path, where the target mapping relationship includes element information corresponding to each of the M colors.

In this embodiment of this application, after the M colors are obtained, a codebook needs to be determined based on the M colors. The codebook is the target mapping relationship in this embodiment. The target mapping relationship may include the element information corresponding to each of the M colors, and the element information may be binary information. A two-dimensional code includes a plurality of elements, and each element may carry specified information. In a process of generating the two-dimensional code, a character string (information that needs to be carried in the generated two-dimensional code) needs to be converted into a binary bitstream, and the bitstream is divided into a plurality of sub-bitstreams (or referred to as element information), where each sub-bitstream corresponds to one element in the two-dimensional code. An element is a basic unit of the two-dimensional code, each element is one region in the two-dimensional code, and each element carries specified element information. After scanning the two-dimensional code, the code scanning device may parse an element included in the two-dimensional code to obtain element information corresponding to the element, and obtain, based on the obtained element information of each element, content carried in the two-dimensional code.

In an existing implementation of generating a chromatic two-dimensional code, each color corresponds to fixed element information. For example, a color 1 corresponds to element information (0, 1), and a color 2 corresponds to element information (1, 1). The correspondence is fixed. During code scanning, the code scanning device may determine that an element of the color 1 in the two-dimensional code corresponds to the element information (0, 1), and an element of the color 2 corresponds to the element information (1, 1). In this implementation, the user cannot customize a color, because a code scanning end cannot determine element information corresponding to a color of each element in a scanned two-dimensional code.

In this embodiment of this application, the target mapping relationship is determined based on the magnitude relationship between the characteristic values of the M colors in the target color path. In other words, when a two-dimensional code is being generated, a correspondence between colors and element information is generated based on a relative magnitude relationship between characteristic values of the colors in the target color path instead of associating each color with fixed element information. For example, the M colors include a color 1 and a color 2. In an existing implementation, the color 1 definitely corresponds to element information 1, and the color 2 definitely corresponds to element information 2. In this embodiment of this application, a color with a larger characteristic value in the target color path corresponds to the element information 1, and a color with a smaller characteristic value corresponds to the element information 2. If a characteristic value of the color 1 in the target color path is greater than a characteristic value of the color 2 in the target color path, the color 1 corresponds to the element information 1, and the color 2 corresponds to the element information 2. If the characteristic value of the color 1 in the target color path is less than the characteristic value of the color 2 in the target color path, the color 1 corresponds to the element information 2, and the color 2 corresponds to the element information 1.

In this way, a correspondence between colors and element information is determined based on a magnitude relationship of characteristic values of the colors. Even if all colors in a two-dimensional code are customized and specified by a user, a code scanning side can restore, based on a magnitude relationship between characteristic values of colors of elements in the scanned two-dimensional code, a correspondence that is between colors and element information and that is used for generating the two-dimensional code.

The following describes how to determine the target mapping relationship based on the magnitude relationship between the characteristic values of the M colors in the target color path.

In this embodiment of this application, the target color path may include at least one color path in color space, and the color space may be but is not limited to RGB space, YUV space, HSL space, and HSV space.

The RGB (red, green, blue) space is most commonly used in a display system. A color cathode ray tube and a color raster graphics display use R, G, and B values to drive R, G, and B electron guns to emit electrons, respectively excite phosphors of R, G, and B colors on a phosphor screen to emit light of different luminance, and generate various colors through addition and mixing. A scanner also absorbs R, G, and B components of light sent from an original through reflection or transmission, and the R, G, and B components are used to represent a color of the original. RGB color space is referred to as device-related color space because different scanners scan a same image to obtain image data of different colors.

A model of the HSV (hue, satisfaction, value) space corresponds to a conical subset in a cylindrical coordinate system. A top face of a cone corresponds to V=1, and the cone includes three faces of R=1, G=1, and B=1 in an RGB model, and represents a brighter color. A color H is determined by a rotation angle around a V axis. Red corresponds to an angle of 0°, green corresponds to an angle of 120°, and blue corresponds to an angle of 240°. In an HSV color model, a difference between each color and a complementary color thereof is 180°. Saturation S ranges from 0 to 1. Therefore, a radius of the top surface of the cone is 1. A color gamut represented by the HSV color model is a subset of a CIE chromaticity diagram. In this model, purity of a color whose saturation is 100% is generally less than 100%. At a vertex (an origin) of the cone, if V=0, and H and S are not defined, it represents black. At a center of the top surface of the cone, if S=0, V=1, and H is not defined, it represents white. From this point to the origin, it represents dimming gray, that is, gray with different grayscales. For these points, S=0, and a value of H is not defined. It can be said that the V axis in the HSV model corresponds to a principal diagonal in RGB color space. For a color on a circumference of the top surface of the cone, if V=1 and S=1, this color is a pure color.

For the YUV space, in a modern color television system, a tri-tube color camera or a color CCD (charge-coupled device) camera is usually used to perform color separation, amplification, and correction on a photographed color image signal to obtain RGB, and then obtain a luminance signal Y and two color difference signals R-Y and B-Y through a matrix conversion circuit. Finally, a transmit end encodes the luminance signal and the color difference signals separately and sends the three signals through a same channel. This is a commonly used YUV color space. An importance of the YUV color space is that the luminance signal Y is separated from chrominance signals U and V. If there is only a Y signal component but no U component or V component, an image is a black and white grayscale image. YUV space is used by a color television to solve compatibility between the color television and a monochrome television by using the luminance signal Y, so that the monochrome television can also receive a color signal.

For example, the target color path may be a chrominance path (hue) and a luminance path (value) in the HSV space. Magnitudes of characteristic values of all of the M colors in the luminance path of the HSV space may be compared, and the target mapping relationship is determined based on the magnitude relationship between the characteristic values of the M colors in the luminance path.

In this embodiment of this application, element information is fixed. For example, 2-bit element information includes (0, 0), (0, 1), (1, 0), and (1, 1). A manner of mapping each of the M colors to one piece of element information is very flexible. If the target color path is one color path, element information of a color with a smallest characteristic value in the M colors in the target color path may be set to (1, 1), and element information of a color with a largest characteristic value in the M colors in the target color path may be set to (0, 0). Alternatively, any other rule may be used provided that each color uniquely corresponds to one piece of element information and each piece of element information uniquely corresponds to one color in the target mapping relationship determined based on the magnitude relationship between the characteristic values of the M colors in the luminance path. A specific rule for comparing magnitudes of characteristic values is not limited in this application.

For example, M is 4 and element information is 2 bits. Element information of a color with a smallest characteristic value in the M colors in the luminance path of the HSV space may be set to (1, 1), element information of a color with a largest characteristic value in the M colors in the luminance path of the HSV space may be set to (0, 0), and for the other two colors, a color with a smaller characteristic value in the luminance path of the HSV space is (1, x), and a color with a larger characteristic value in the luminance path of the HSV space is (0, 1-x). If a characteristic value of the color with a smaller characteristic value in the luminance path of the HSV space is larger in the chrominance path, x is 0; otherwise, x is 1. Therefore, a codebook (or referred to as the target mapping relationship) in Table 3 may be obtained.

TABLE 3

| Color (RGB Value) | Code element information |
|---|---|
| 4, 61, 136 | (1, 0) |
| 254, 222, 106 | (0, 1) |
| 35, 24, 21 | (1, 1) |
| 249, 245, 236 | (0, 0) |

Operation 303: Obtain a target link, and generate a bitstream corresponding to the target link, where the bitstream includes a plurality of pieces of element information.

In this embodiment of this application, the target link may be obtained, and the target link is information that should be carried in a two-dimensional code. To enable a two-dimensional code to represent the target link, the target link needs to be encoded to obtain a binary bitstream. Specifically, the target link may be obtained, and the bitstream corresponding to the target link is generated.

In this embodiment of this application, each element included in a to-be-generated two-dimensional code may represent a part of information in a bitstream (each element represents one piece of element information), and therefore a plurality of elements included in the to-be-generated two-dimensional code may represent the entire bitstream.

In an embodiment, the target link includes a first character and a second character. In a process of generating a bitstream, the first character may be encoded according to a first encoding rule to obtain a first sub-bitstream; and the second character is encoded according to a second encoding rule to obtain a second sub-bitstream, where the first encoding rule is different from the second encoding rule.

In an existing implementation, for example, during QR encoding, a same encoding rule is used for each character string. For example, when a character string abcd123456abcdefghijklmn is encoded based on QR encoding, in an 8-bit byte mode, a mode indicator is 4 bits, a character count indicator is 8 bits, data is 8×24=192 bits, and 204 bits are required in total.

For example, the first encoding rule and the second encoding rule may be one of the following encoding rules:

Base10 is used to encode 10 numeric characters. For a specific encoding rule, refer to FIG. 16. FIG. 16 is a schematic diagram of an encoding rule.

Base32_L is used to encode 26 lowercase letters, spaces, and 5 jump symbols. For a specific encoding rule, refer to FIG. 17. FIG. 17 is a schematic diagram of an encoding rule.

Base32_U is used to encode 26 uppercase letters, spaces, and 5 jump symbols. For a specific encoding rule, refer to FIG. 18. FIG. 18 is a schematic diagram of an encoding rule.

Base45 is used to encode 10 numeric characters, 26 uppercase letters A to Z, and 9 symbols. For a specific encoding rule, refer to FIG. 19. FIG. 19 is a schematic diagram of an encoding rule.

Base90 is used to encode 10 numeric characters, 52 uppercase and lowercase letters, 23 special characters SP!"#$%&'( )*+,-./:;=?@_~, and 5 jump symbols. For a specific encoding rule, refer to FIG. 20. FIG. 20 is a schematic diagram of an encoding rule.

Base108 is used for ASCII encoding and can be used to print 95 characters, 8 escape characters, and 5 jump symbols. For a specific encoding rule, refer to FIG. 21. FIG. 21 is a schematic diagram of an encoding rule.

In this embodiment of this application, different encoding rules may be used for different character strings, to reduce a total quantity of required bits. In an embodiment, a size of the first character is the same as a size of the second character, and a quantity of bits of the first sub-bitstream is different from a quantity of bits of the second sub-bitstream. For example, in Base32_L, a quantity of bits required for encoding a unit character is 5, and in Base10, a quantity of bits required for encoding a unit character is 4. For example, a character string abcd123456abcdefghijklmn is encoded. Base32_L is used for the first four lowercase letters, Base10 is used for subsequent six digits, and jumping to Base32_L is performed for remaining lowercase letters. In this case, a quantity of required bits is 4+5×4+5+10+10×2+4+5×14=133 bits, which is less than 201 bits required for QR encoding.

In this embodiment of this application, to implement jump between encoding rules, a jump symbol may be added during encoding. Specifically, in an embodiment, the first character and the second character are adjacent characters in the target link, and after the first character is encoded according to the first encoding rule to obtain the first sub-bitstream and before the second character is encoded according to the second encoding rule, a jump indicator may be further obtained, where the jump indicator indicates to perform character encoding according to the second encoding rule; the jump indicator is encoded according to the first encoding rule to obtain a third sub-bitstream; and correspondingly, the second character may be encoded based on the jump indicator according to the second encoding rule.

Figure 22A:
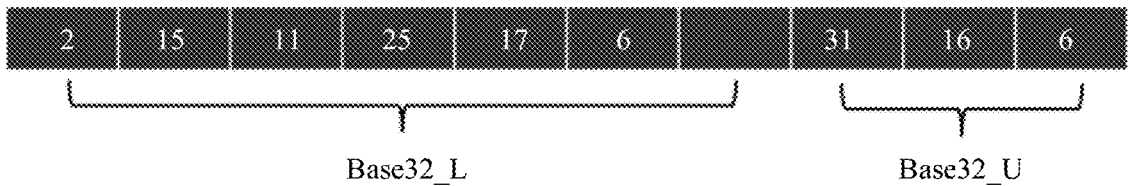
FIG. 22a is a schematic diagram of encoding according to an embodiment of this application.

FIG. 22a is used as an example. It can be learned from FIG. 17 that (2, 15, 11, 25, 17, 6) represent specific characters. When a number 27 is encountered, it can be learned from FIG. 17 that the number 27 is a jump indicator indicates to jump to Base32_U. If jumping to Base32_U is performed, it indicates that subsequent encoding needs to be performed according to the encoding rule in FIG. 18.

Operation 304: Determine, based on the target mapping relationship, a color corresponding to each piece of element information in the bitstream, and generate a target two-dimensional code based on the color corresponding to each piece of element information in the bitstream.

In this embodiment of this application, after the bitstream is obtained, the color corresponding to each piece of element information included in the bitstream may be determined based on the target mapping relationship determined in operation 302, and elements with corresponding colors are combined to generate the target two-dimensional code.

For example, a bitstream is "01010011". The bitstream "01010011" is equally divided into two parts: 0101 and 0011. Each column constitutes one piece of element information, and four pieces of element information (0,0), (1,0), (0,1), and (1,1) are obtained. Then, the color corresponding to each piece of element information may be determined in the target mapping relationship.

It should be understood that each of operation 301 to operation 304 may be performed by the terminal device or the server on the cloud side. This is not limited in this application.

An embodiment of this application provides a two-dimensional code generation method, including: obtaining M colors and a characteristic value of each color in a target color path, where the M colors include at least one chromatic color, and M is an integer greater than 1; determining a target mapping relationship based on a magnitude relationship between characteristic values of the M colors in the target color path, where the target mapping relationship includes element information corresponding to each of the M colors; obtaining a target link, and generating a bitstream corresponding to the target link, where the bitstream includes a plurality of pieces of element information; and determining, based on the target mapping relationship, a color corresponding to each piece of element information in the bitstream, and generating a target two-dimensional code based on the color corresponding to each piece of element information in the bitstream. In the foregoing manner, the target mapping relationship is determined based on the magnitude relationship between the characteristic values of the M colors in the target color path. In other words, when a two-dimensional code is being generated, a correspondence between colors and element information is generated based on a relative magnitude relationship between characteristic values of the colors in the target color path instead of associating each color with fixed element information. For example, the M colors include a color 1 and a color 2. In an existing implementation, the color 1 definitely corresponds to element information 1, and the color 2 definitely corresponds to element information 2. In this embodiment of this application, a color with a larger characteristic value in the target color path corresponds to the element information 1, and a color with a smaller characteristic value corresponds to the element information 2. If a characteristic value of the color 1 in the target color path is greater than a characteristic value of the color 2 in the target color path, the color 1 corresponds to the element information 1, and the color 2 corresponds to the element information 2. If the characteristic value of the color 1 in the target color path is less than the characteristic value of the color 2 in the target color path, the color 1 corresponds to the element information 2, and the color 2 corresponds to the element information 1. In this way, a correspondence between colors and element information is determined based on a magnitude relationship of characteristic values of the colors. Even if all colors in a two-dimensional code are customized and specified by a user, a code scanning side can restore, based on a magnitude relationship between characteristic values of colors of elements in the scanned two-dimensional code, a correspondence that is between colors and element information and that is used for generating the two-dimensional code, so as to accurately identify content in the two-dimensional code.

Figure 22B:
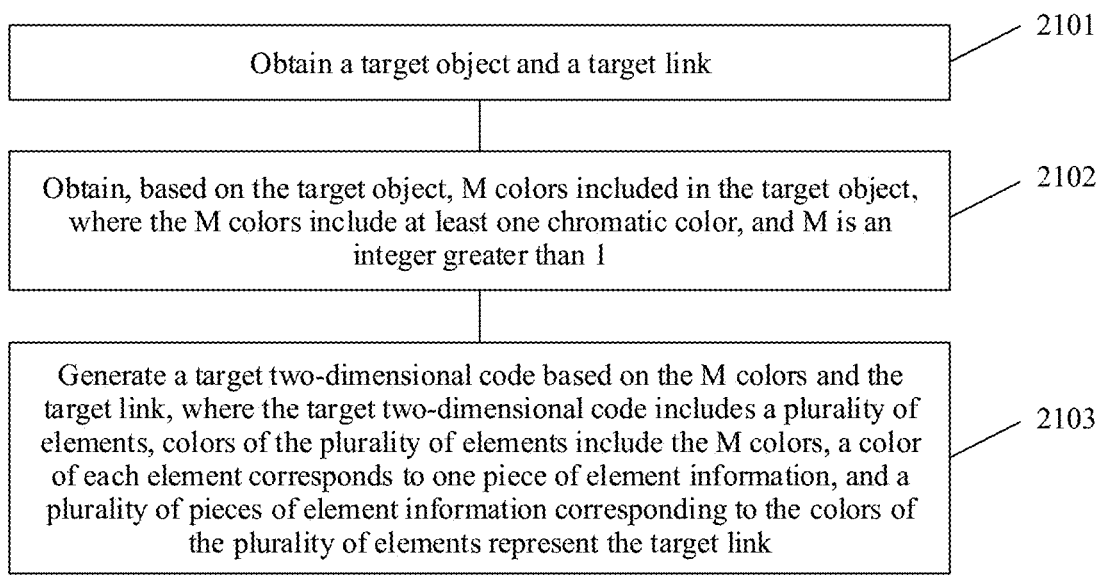
FIG. 22b is a schematic flowchart of a two-dimensional code generation method according to an embodiment of this application.

FIG. 22b is a schematic flowchart of a two-dimensional code generation method according to an embodiment of this application. The method includes the following operations.

Operation 2101: Obtain a target object and a target link.

In an embodiment, the target object is an identifier that indicates a target enterprise or a target commodity, a target two-dimensional code includes an image region in the middle and an encoding region surrounding the image region, the encoding region includes a plurality of elements, and the image region includes the target object.

For example, operation 301 is performed by a terminal device. Specifically, in an embodiment, a user may input the target object. Correspondingly, the terminal device may obtain the target object, and the terminal device may obtain, based on the target object, M colors included in the target object.

The terminal device may automatically obtain, based on the target object, the M colors included in the target object. For example, the terminal device may obtain the target object, and obtain M colors with a larger pixel proportion in the target object; or the terminal device may obtain N colors with a larger pixel proportion in the target object, and obtain M colors meeting a first preset condition from the N colors. The following separately describes the two implementations.

In an optional implementation, the terminal device may obtain the target object, and obtain the M colors with a larger pixel proportion in the target object. Algorithms for extracting colors from the target object may include but are not limited to methods such as color quantization, clustering, and color modeling. For example, a clustering algorithm is used during implementation. A K-means clustering algorithm may be used to extract main colors from an input target picture, and sort the main colors in descending order of quantities of pixels in the target object, to obtain M colors with a larger pixel proportion in the target object.

In this embodiment of this application, the target object may be an image including a logo of an enterprise, and the M colors with a larger pixel proportion in the target object may represent main colors of the logo of the enterprise.

In this embodiment of this application, the target object may be an image including a commodity, and the M colors with a larger pixel proportion in the target object may represent main colors of the commodity.

In an optional implementation, the N colors with a larger pixel proportion in the target object may be obtained, where N is a positive integer greater than M; and the M colors meeting the first preset condition are obtained from the N colors, where the first preset condition includes at least one of the following: a difference between characteristic values of any two of the M colors in a chrominance path is greater than a first preset value, and a characteristic value of each of the M colors in a saturation path is greater than a second preset value.

In this embodiment of this application, the N colors may be first obtained from the target object, and M better colors are selected from the N colors. The "better" means that a two-dimensional code including the M selected colors is more aesthetic. Specifically, if at least two of the M colors are similar, or at least one of the M colors is a color with relatively low purity, a two-dimensional code generated based on the M colors has relatively poor aesthetics.

Therefore, the N colors may be obtained from the target object, and the M better colors may be selected from the N colors. Specifically, the M colors meeting the first preset condition may be obtained from the N colors, where the first preset condition includes at least one of the following: the difference between the characteristic values of the any two of the M colors in the chrominance path is greater than the first preset value, and the characteristic value of each of the M colors in the saturation path is greater than the second preset value.

It should be understood that, the first preset value may be set based on an actual case, provided that the first preset value can indicate that two colors are well differentiated visually. A specific value of the first preset value is not limited in this application.

It should be understood that the second preset value may be set based on an actual case, provided that the second preset value can indicate that a color visually has better color purity. A specific value of the second preset value is not limited in this application.

For how to obtain the target image, refer to the related descriptions of obtaining the target object in operation 301. Details are not described herein again.

For how to obtain the target link, refer to the related descriptions of obtaining the target link in operation 303. Details are not described herein again.

Operation 2102: Obtain, based on the target object, M colors included in the target object, where the M colors include at least one chromatic color, and M is an integer greater than 1.

For how to obtain, based on the target object, the M colors included in the target object, refer to the related descriptions of obtaining the M colors included in the target object in operation 301. Details are not described herein again.

Operation 2103: Generate a target two-dimensional code based on the M colors and the target link, where a color style of the target two-dimensional code is consistent with a color style of the target object, the target two-dimensional code includes a plurality of elements, colors of the plurality of elements include the M colors, a color of each element corresponds to one piece of element information, and a plurality of pieces of element information corresponding to the colors of the plurality of elements are used to represent the target link.

Consistency between color styles may mean that colors included in the target two-dimensional code are consistent with main colors in the target object. For example, if the target object is a logo of an enterprise A, and the logo of the enterprise A is red and blue, the target two-dimensional code may include red and blue. In this case, the target two-dimensional code has color style recognition of the enterprise A.

For how to generate the target two-dimensional code based on the M colors and the target link, refer to the descriptions of operation 304. Details are not described herein again.

In an embodiment, the target object is an identifier that indicates a target enterprise, the target two-dimensional code includes an image region in the middle and an encoding region surrounding the image region, the encoding region includes the plurality of elements, and the image region includes the target object.

In an embodiment, the M colors with a larger pixel proportion in the target object may be obtained.

In an embodiment, the obtaining, based on the target object, M colors included in the target object includes:
obtaining N colors included in the target object, where N is a positive integer greater than M;

displaying a target interface, where the target interface includes N color options, and each color option indicates one of the N colors;
receiving a selection operation performed by a user on M of the N color options; and
obtaining, in response to the selection operation, M colors indicated by the M color options.

In this embodiment of this application, if the terminal device obtains the M colors based on the target object that is input by the user, a first interface may be displayed, where the first interface includes a first control, and the first control is used to indicate the user to input an image. Then, the terminal device may receive the target object that is input by the user based on the first control.

Specifically, with reference to FIG. 12, the terminal device may display an interface (the first interface in the foregoing embodiment) for setting a color of the two-dimensional code. The interface may include a control (the first control in the foregoing embodiment) for inputting a picture. The user may tap the control for inputting a picture, and input the target object. Then, the terminal device may receive the target object that is input by the user based on the first control.

In addition, in this embodiment of this application, the terminal device may obtain N candidate colors from the target object for selection by the user. The user may select M colors from the N candidate colors, and correspondingly, the terminal device may obtain the M colors selected by the user. With reference to FIG. 13, the terminal device may display an interface for selecting a color of a two-dimensional code. The interface for selecting a color may display five candidate colors obtained from the target object. The user may select M colors from the five candidate colors, and correspondingly, the terminal device may obtain the M colors selected by the user.

In an embodiment, a first interface may be displayed, where the first interface includes a first control, and the first control is used to indicate the user to input an image; and
the target object that is input by the user based on the first control is received.

In an embodiment, a characteristic value of each of the M colors in a target color path may be obtained, where the M colors include at least one chromatic color, and M is an integer greater than 1;
a target mapping relationship is determined based on a magnitude relationship between characteristic values of the M colors in the target color path, where the target mapping relationship includes element information corresponding to each of the M colors; and
a bitstream corresponding to the target link is generated, where the bitstream includes a plurality of pieces of element information.

Correspondingly, the generating a target two-dimensional code based on the M colors and the target link includes:
determining, based on the target mapping relationship, a color corresponding to each piece of element information in the bitstream, and generating the target two-dimensional code based on the color corresponding to each piece of element information in the bitstream.

In an embodiment, the obtaining, based on the target object, M colors included in the target object includes:
obtaining N colors with a larger pixel proportion in the target image, where N is a positive integer greater than M; and
obtaining M colors meeting a first preset condition from the N colors, where the first preset condition includes at least one of the following: a difference between characteristic values of any two of the M colors in a chrominance path is greater than a first preset value, and a characteristic value of each of the M colors in a saturation path is greater than a second preset value.

In an embodiment, the target link is used to trigger a corresponding function, where
the function includes at least one of the following:
jumping to a corresponding web page;
enabling a target function in a corresponding application;
displaying a corresponding character string;
displaying a corresponding video; or
playing corresponding audio.

An embodiment of this application provides a two-dimensional code generation method, including: obtaining a target object and a target link; obtaining, based on the target object, M colors included in the target object, where the M colors include at least one chromatic color, and M is an integer greater than 1; and generating a target two-dimensional code based on the M colors and the target link, where a color style of the target two-dimensional code is consistent with a color style of the target object, the target two-dimensional code includes a plurality of elements, colors of the plurality of elements include the M colors, a color of each element corresponds to one piece of element information, and a plurality of pieces of element information corresponding to the colors of the plurality of elements are used to represent the target link. In this application, the target two-dimensional code whose color style is consistent with that of the target object is generated based on the M colors included in the target object, thereby implementing color customization of a two-dimensional code.

Figure 22C:
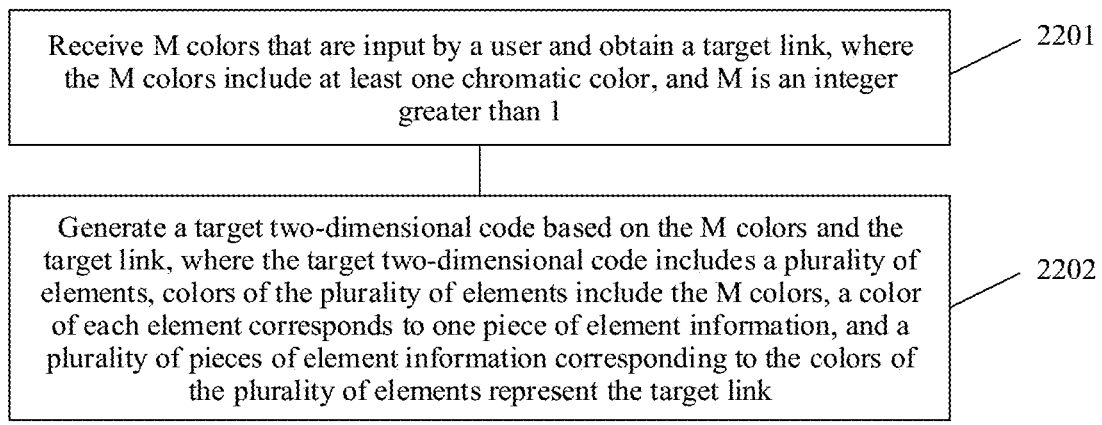
FIG. 22c is a schematic flowchart of a two-dimensional code generation method according to an embodiment of this application.

FIG. 22c is a schematic flowchart of a two-dimensional code generation method according to an embodiment of this application. The method includes the following operations.

Operation 2201: Receive M colors that are input by a user and obtain a target link, where the M colors include at least one chromatic color, and M is an integer greater than 1.

In this embodiment of this application, a terminal device may obtain the M colors based on color information that is input by the user. With reference to FIG. 12, the terminal device may display an interface for setting a color of a two-dimensional code. The interface may include a picture input control and a plurality of input boxes. The user may input information about one color in each input box. For example, in the interface shown in FIG. 12, the user may input an RGB value of one color in each input box.

For more information about how to receive the M colors that are input by the user, refer to the related descriptions of receiving the M colors that are input by the user in operation 301. Details are not described herein again.

For how to obtain the target link, refer to the related descriptions of obtaining the target link in operation 301. Details are not described herein again.

Operation 2202: Generate a target two-dimensional code based on the M colors and the target link, where the target two-dimensional code includes a plurality of elements, colors of the plurality of elements include the M colors, a color of each element corresponds to one piece of element information, and a plurality of pieces of element information corresponding to the colors of the plurality of elements are used to represent the target link.

For how to generate the target two-dimensional code based on the M colors and the target link, refer to the descriptions of operation 304. Details are not described herein again.

In an embodiment, the receiving M colors that are input by a user includes: displaying a second interface, where the second interface includes a first input box, and the first input box is used to indicate the user to input color information used for indicating a color; receiving M pieces of color information that are input by the user in the first input box; and obtaining the M colors based on the M pieces of color information.

In an embodiment, the method further includes: obtaining a characteristic value of each of the M colors in a target color path, where the M colors include at least one chromatic color, and M is an integer greater than 1; determining a target mapping relationship based on a magnitude relationship between characteristic values of the M colors in the target color path, where the target mapping relationship includes element information corresponding to each of the M colors; and generating a bitstream corresponding to the target link, where the bitstream includes a plurality of pieces of element information; and correspondingly, the generating a target two-dimensional code based on the M colors and the target link includes: determining, based on the target mapping relationship, a color corresponding to each piece of element information in the bitstream, and generating the target two-dimensional code based on the color corresponding to each piece of element information in the bitstream.

In an embodiment, the target link is used to trigger a corresponding function, where
the function includes at least one of the following:
jumping to a corresponding web page;
enabling a target function in a corresponding application;
displaying a corresponding character string;
displaying a corresponding video; or
playing corresponding audio.

A bitstream corresponding to the target link is generated, where the bitstream includes a plurality of pieces of element information.

An embodiment of this application provides a two-dimensional code generation method, including: receiving M colors that are input by a user and obtaining a target link, where the M colors include at least one chromatic color, and M is an integer greater than 1; and generating a target two-dimensional code based on the M colors and the target link, where the target two-dimensional code includes a plurality of elements, colors of the plurality of elements include the M colors, a color of each element corresponds to one piece of element information, and a plurality of pieces of element information corresponding to the colors of the plurality of elements are used to represent the target link. In this application, the target two-dimensional code including the M colors is generated based on the M colors that are input by the user, thereby implementing color customization of a two-dimensional code.

Figure 23:
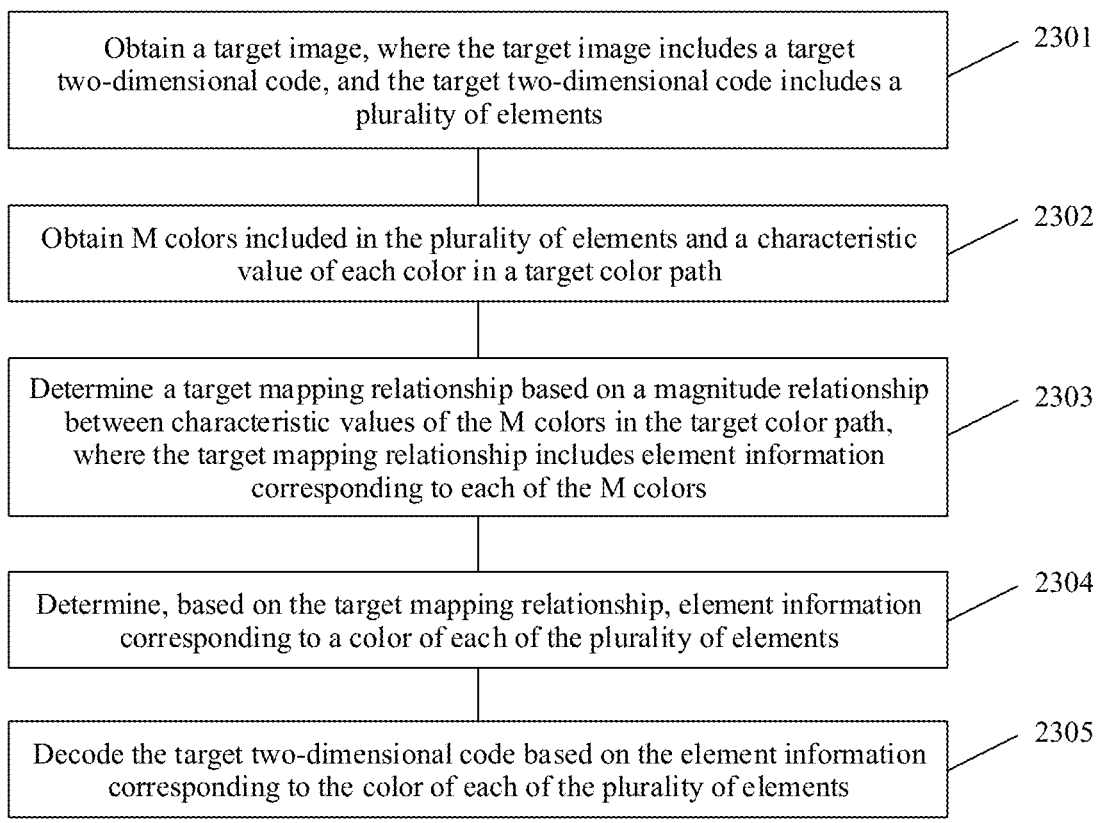
FIG. 23 is a schematic flowchart of a two-dimensional code generation method according to an embodiment of this application.

FIG. 23 is a schematic flowchart of a two-dimensional code identification method according to an embodiment of this application. As shown in FIG. 23, the two-dimensional code identification method provided in this embodiment of this application includes the following operations.

Operation 2301: Obtain a target image, where the target image includes a target two-dimensional code, and the target two-dimensional code includes a plurality of elements.

In this embodiment of this application, a terminal device may obtain the target image including the target two-dimensional code.

The following describes how the terminal device obtains the target image.

1. The terminal device may obtain a target image through shooting by using a camera of the terminal device.

In an embodiment, a user may enable a bar code identification function on some applications, and select a bar code for scanning. The function invokes the camera on the terminal device. In this way, the user may shoot a region by using the camera of the terminal device, and a target two-dimensional code is set in the region, so that the terminal device can obtain a target image including the target two-dimensional code.

Figure 24:
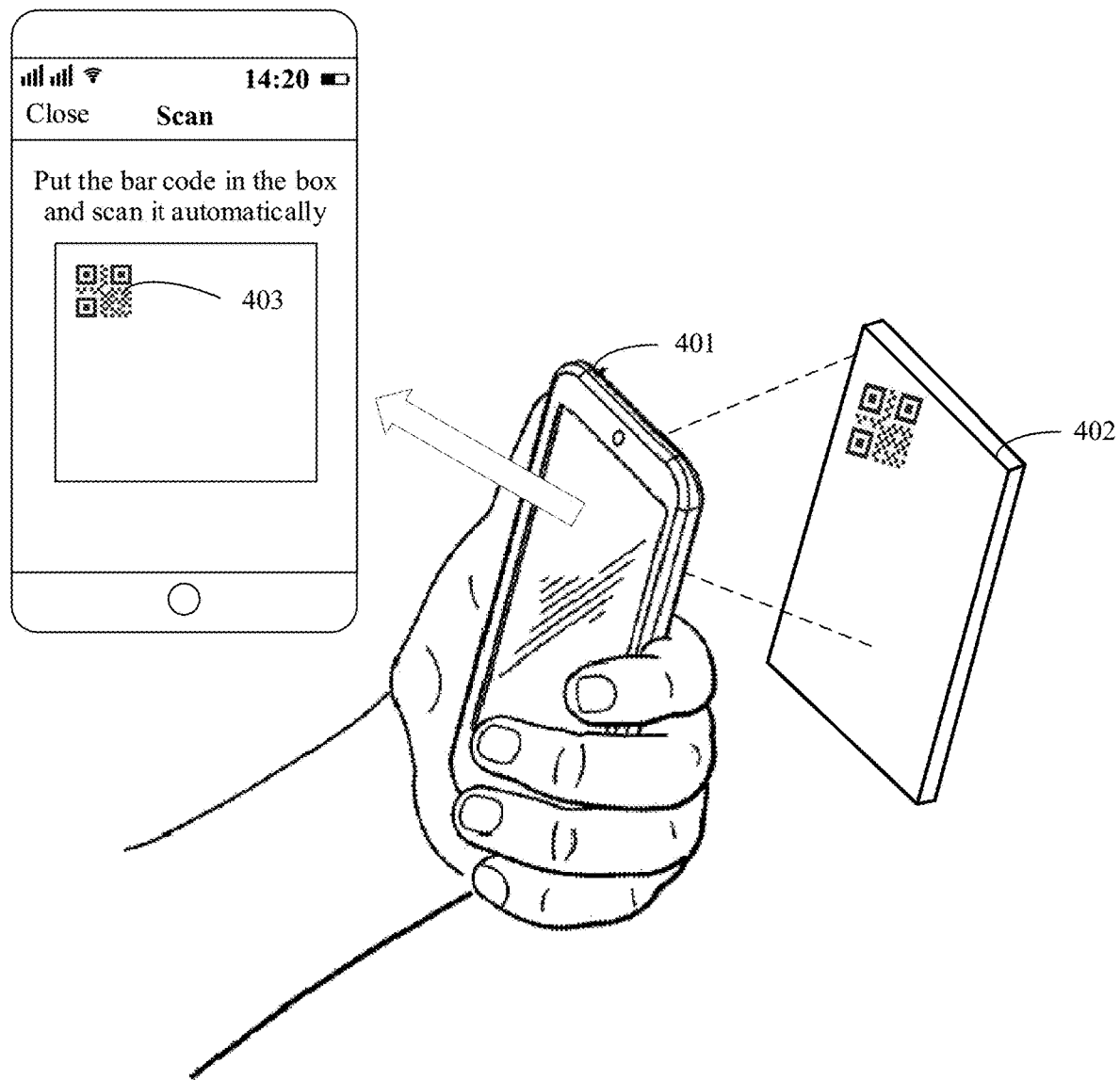
FIG. 24 is a schematic diagram of a code scanning scenario according to an embodiment of this application.

FIG. 24 is a schematic diagram of a scenario according to an embodiment of this application. As shown in FIG. 24, a user may use a camera of a terminal device 401 to shoot a region 402 in which a target two-dimensional code is set. Correspondingly, the terminal device 401 may obtain a target image including a target two-dimensional code 403.

In an embodiment, the user may enable a bar code identification function on some applications, and select a bar code for scanning. The function invokes an external camera of the terminal device, and the external camera is connected to the terminal device. In this way, the user may shoot a region by using the external camera, and a plurality of bar codes are set in the region, so that the terminal device can obtain the target image including the target two-dimensional code.

2. The terminal device may obtain, from a local album or a cloud album, a target image including a target two-dimensional code.

In an embodiment, a user may enable a bar code identification function on some applications, and select an image from the local album or the cloud album. The function enables the local album or the cloud album on the terminal device. The user may select, from the local album or the cloud album on the terminal device, a target image on which bar code identification needs to be performed. The target image may include a target two-dimensional code. In this way, the terminal device may obtain, from the local album or the cloud album, the target image including the target two-dimensional code.

In this embodiment of this application, a type of the target two-dimensional code may include but is not limited to PDF417, Aztec, a PDF 417 two-dimensional bar code, a Datamatrix two-dimensional bar code, a Maxicode two-dimensional bar code, Code 49, Code 16K, and Code one.

Operation 2302: Obtain M colors included in the plurality of elements and a characteristic value of each color in a target color path.

In this embodiment of this application, after the target image is obtained, the M colors included in the plurality of elements and the characteristic value of each color in the target color path may be obtained.

In a process of identifying the target two-dimensional code, colors included in the target two-dimensional code need to be first identified. Because a color identification error occurs in the target image obtained by a code scanning device due to polarization or other reasons, the M colors obtained by the code scanning device are colors approximately included in the target two-dimensional code. In addition, due to polarization or other reasons, the code scanning device may obtain different color identification results for elements originally having a same color. Therefore, in an embodiment, the code scanning device may obtain a color of each of the plurality of elements, and obtain, based on a clustering algorithm, the M colors included in the plurality of elements, where each of the M colors is a cluster center obtained by using the clustering algorithm. In other words, the M colors are M main colors included in the target two-dimensional code.

It should be understood that the clustering algorithm in this embodiment may be K-means clustering, mean shift clustering, a density-based clustering method (DBSCAN), expectation maximization (EM) clustering by using a Gaussian mixture model (GMM), agglomerative clustering, or the like. This is not limited in this application.

In an embodiment, the target image is a grayscale image, and the target color path is a luminance path.

In this embodiment of this application, the code scanning device may be incompatible with scanning of a chromatic two-dimensional code. Specifically, some scanning devices can obtain only a grayscale image. To enable such a code scanning device to scan a chromatic two-dimensional code, when a target two-dimensional code is being generated, grayscales (characteristic values in the luminance path) of colors included in the two-dimensional code need to be distinguished. More specifically, a color A and a color B are chromatic colors. Although the color A and the color B are different, the code scanning device that is incompatible with scanning of a chromatic two-dimensional code can obtain only characteristic values of the color A and the color B in the luminance path after scanning the color A and the color B. In this embodiment, a characteristic value of a color obtained based on the target image in the luminance path may be adjusted, so that a difference between characteristic values of any two of M to-be-processed colors in the luminance path is greater than a preset value. In this way, after scanning the color A and the color B, the code scanning device that is incompatible with scanning of a chromatic two-dimensional code can determine that the color A and the color B are different colors, determine a magnitude relationship between the characteristic values of the color A and the color B in the luminance path, and restore a codebook based on the magnitude relationship between the characteristic values of the color A and the color B in the luminance path.

Operation 2303: Determine a target mapping relationship based on a magnitude relationship between characteristic values of the M colors in the target color path, where the target mapping relationship includes element information corresponding to each of the M colors.

In this embodiment of this application, after the target image is obtained, the M colors included in the plurality of elements and the characteristic value of each color in the target color path may be obtained, and the target mapping relationship is determined based on the magnitude relationship between the characteristic values of the M colors in the target color path, where the target mapping relationship includes the element information corresponding to each of the M colors.

Different from operation 302 in the embodiment corresponding to FIG. 3, in this embodiment, the target mapping relationship is restored by scanning colors of elements in the target two-dimensional code (in operation 302, the target mapping relationship is generated based on the obtained M colors).

In this embodiment of this application, after the M colors included in the plurality of elements are obtained, a codebook needs to be restored based on the M colors. The codebook is the target mapping relationship in this embodiment. The target mapping relationship may include the element information corresponding to each of the M colors, and the element information may be binary information. A two-dimensional code includes a plurality of elements, and each element may carry specified information. In a process of generating the two-dimensional code, a character string (information that needs to be carried in the generated two-dimensional code) needs to be converted into a binary bitstream, and the bitstream is divided into a plurality of sub-bitstreams (or referred to as element information), where each sub-bitstream corresponds to one element in the two-dimensional code. An element is a basic unit of the two-dimensional code, each element is one region in the two-dimensional code, and each element carries specified element information. After scanning the two-dimensional code, the code scanning device may parse an element included in the two-dimensional code to obtain element information corresponding to the element, and obtain, based on the obtained element information of each element, content carried in the two-dimensional code.

In this embodiment of this application, the target mapping relationship is determined based on the magnitude relationship between the characteristic values of the M colors in the target color path. In other words, when a two-dimensional code is being identified, a correspondence between colors and element information is determined based on a relative magnitude relationship between characteristic values of the colors in the target color path instead of associating each color with fixed element information. For example, the M colors include a color 1 and a color 2. In an existing implementation, the color 1 definitely corresponds to element information 1, and the color 2 definitely corresponds to element information 2. In this embodiment of this application, a color with a larger characteristic value in the target color path corresponds to the element information 1, and a color with a smaller characteristic value corresponds to the element information 2. If a characteristic value of the color 1 in the target color path is greater than a characteristic value of the color 2 in the target color path, the color 1 corresponds to the element information 1, and the color 2 corresponds to the element information 2. If the characteristic value of the color 1 in the target color path is less than the characteristic value of the color 2 in the target color path, the color 1 corresponds to the element information 2, and the color 2 corresponds to the element information 1.

In this way, a correspondence between colors and element information is determined based on a magnitude relationship of characteristic values of the colors. Even if all colors in a two-dimensional code are customized and specified by a user, a code scanning side can restore, based on a magnitude relationship between characteristic values of colors of elements in the scanned two-dimensional code, a correspondence that is between colors and element information and that is used for generating the two-dimensional code.

The following describes how to determine the target mapping relationship based on the magnitude relationship between the characteristic values of the M colors in the target color path.

In this embodiment of this application, the target color path may include at least one color path in color space, and the color space may be but is not limited to RGB space, YUV space, HSL space, and HSV space.

For example, the target color path may be a chrominance path (hue) and a luminance path (value) in the HSV space. Magnitudes of characteristic values of all of the M colors in the luminance path of the HSV space may be compared, and the target mapping relationship is determined based on the magnitude relationship between the characteristic values of the M colors in the luminance path.

In this embodiment of this application, element information is fixed. For example, 2-bit element information includes (0, 0), (0, 1), (1, 0), and (1, 1). A manner of mapping each of the M colors to one piece of element information is very flexible. If the target color path is one color path, element information of a color with a smallest characteristic value in the M colors in the target color path may be set to (1, 1), and element information of a color with a largest characteristic value in the M colors in the target color path may be set to (0, 0). Alternatively, any other rule may be used provided that each color uniquely corresponds to one piece of element information and each piece of element information uniquely corresponds to one color in the target mapping relationship determined based on the magnitude relationship between the characteristic values of the M colors in the luminance path, and a method for determining the target mapping relationship by the code scanning device is consistent with a method for generating the target two-dimensional code. A specific rule for comparing magnitudes of characteristic values is not limited in this application.

For example, M is 4. A four-category k-means clustering algorithm is performed on colors of elements included in the target two-dimensional code to obtain RGB values of one group of colors. For example, the RGB values may be shown in Table 4:

TABLE 4

| RGB value |
| --- |
| X1 |
| X2 |
| X3 |
| X4 |

In this case, RGB values of X1, X2, X3, and X4 may be different from those during generation because of color deviation. Restoring of a color codebook is an inverse process of generating the color codebook. Calculation is performed based on the obtained X1, X2, X3, and X4, and a target mapping relationship is restored according to a preset mutual relationship rule based on a magnitude relationship between characteristic values of X1, X2, X3, and X4 in the target color path. For example, the target mapping relationship may be shown in Table 5:

TABLE 5

| RGB value | Information |
| --- | --- |
| X1 | (1, 0) |
| X2 | (0, 1) |
| X3 | (1, 1) |
| X4 | (0, 0) |

Operation 2304: Determine, based on the target mapping relationship, element information corresponding to a color of each of the plurality of elements.

Due to polarization or other reasons, the code scanning device may obtain different color identification results for elements originally having a same color. Therefore, element information corresponding to a color that is of each element and that is most similar to a color in the M colors may be determined based on the target mapping relationship.

For example, when the color that is of each element and that is most similar to the color in the M colors is determined, it is assumed that RGB values obtained in the color quantization operation are X1 to X4. If white and yellow are considered as one type, and blue and black are considered as one type, values of X1 to X4 are used to perform LDA solution to obtain:

$$\max_{\omega_1} \omega_1^T S_{b_1} \omega_1$$

$$\text{s.t. } \omega_1^T S_{\omega_1} \omega_1 = 1.$$

If white and blue are considered as one type, and yellow and black are considered as one type, values of X1 to X4 are used to perform LDA solution to obtain:

$$\max_{\omega_2} \omega_2^T S_{b_2} \omega_2$$

$$\text{s.t. } \omega_2^T S_{\omega_2} \omega_2 = 1.$$

Finally, the color of each of the plurality of elements may be obtained.

In this embodiment of this application, after the color of each element is obtained, the element information corresponding to the color of each of the plurality of elements may be determined based on the target mapping relationship. For specific descriptions of the element information, refer to the descriptions of the foregoing embodiment. Details are not described herein again.

Operation 2305: Decode the target two-dimensional code based on the element information corresponding to the color of each of the plurality of elements.

In an embodiment, the element information corresponding to the color of each of the plurality of elements is used to constitute a bitstream, and the bitstream includes a first sub-bitstream and a second sub-bitstream; the first sub-bitstream is decoded according to a first decoding rule to obtain a first character; and the second sub-bitstream is decoded according to a second decoding rule to obtain a second character, where the first decoding rule is different from the second decoding rule.

In an embodiment, a size of the first character is the same as a size of the second character, and a quantity of bits of the first sub-bitstream is different from a quantity of bits of the second sub-bitstream.

In an embodiment, the bitstream further includes a third sub-bitstream, the first sub-bitstream is adjacent to the third sub-bitstream, and the third sub-bitstream is adjacent to the second sub-bitstream. After the first sub-bitstream is decoded according to the first decoding rule and before the second sub-bitstream is decoded according to the second decoding rule, the third sub-bitstream may be further decoded according to the first decoding rule to obtain a jump indicator, where the jump indicator indicates to perform character decoding according to the second decoding rule; and correspondingly, the second sub-bitstream may be decoded based on the jump indicator according to the second decoding rule.

In an embodiment, decoding content obtained after the decoding may be obtained, where the decoding content includes a character string, and the decoding content is used to trigger a corresponding function, where
the function includes at least one of the following:
jumping to a corresponding web page;
enabling a target function in a corresponding application;
displaying a corresponding character string;
displaying a corresponding video; or
playing corresponding audio.

An embodiment of this application provides a two-dimensional code identification method. The method includes: obtaining a target image, where the target image includes a target two-dimensional code, and the target two-dimensional code includes a plurality of elements; obtaining M colors included in the plurality of elements and a characteristic value of each color in a target color path; determining a target mapping relationship based on a magnitude relationship between characteristic values of the M colors in the target color path, where the target mapping relationship includes element information corresponding to each of the M colors; determining, based on the target mapping relationship, element information corresponding to a color of each of the plurality of elements; and decoding the target two-dimensional code based on the element information corresponding to the color of each of the plurality of elements. In this way, a correspondence between colors and element information is determined based on a magnitude relationship of characteristic values of the colors. Even if all colors in a two-dimensional code are customized and specified by a user, a code scanning side can restore, based on a magnitude relationship between characteristic values of colors of elements in the scanned two-dimensional code, a correspondence that is between colors and element information and that is used for generating the two-dimensional code, so as to accurately identify content in the two-dimensional code.

Figure 25:
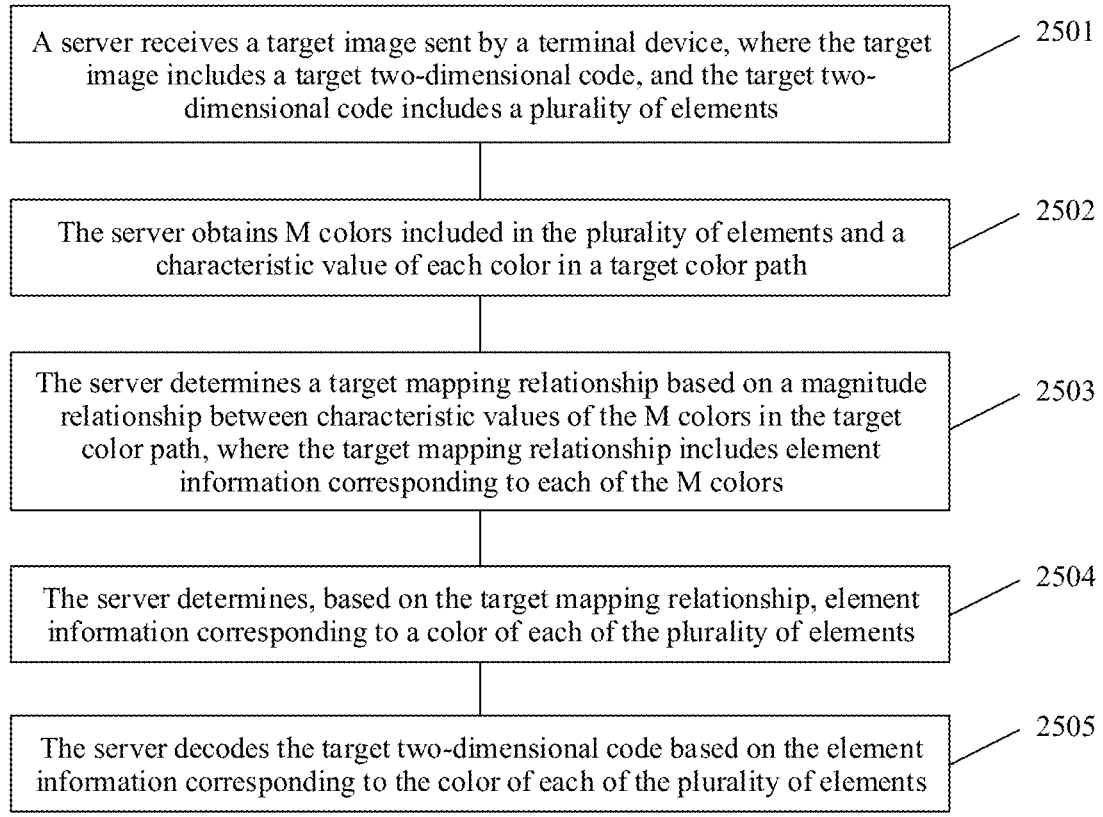
FIG. 25 is a schematic flowchart of a two-dimensional code identification method according to an embodiment of this application.

The following describes a two-dimensional code identification method in this application by using a server as an execution body. FIG. 25 is a schematic diagram of an embodiment of a two-dimensional code identification method according to an embodiment of this application. As shown in FIG. 25, the two-dimensional code identification method provided in this embodiment of this application includes the following operations.

Operation 2501: The server receives a target image sent by a terminal device, where the target image includes a target two-dimensional code, and the target two-dimensional code includes a plurality of elements.

Operation 2502: The server obtains M colors included in the plurality of elements and a characteristic value of each color in a target color path.

Operation 2503: The server determines a target mapping relationship based on a magnitude relationship between characteristic values of the M colors in the target color path, where the target mapping relationship includes element information corresponding to each of the M colors.

Operation 2504: The server determines, based on the target mapping relationship, element information corresponding to a color of each of the plurality of elements.

Operation 2505: The server decodes the target two-dimensional code based on the element information corresponding to the color of each of the plurality of elements.

In an embodiment, the method further includes:
obtaining decoding content obtained after the decoding, where the decoding content includes a character string, and the decoding content is used to trigger a corresponding function, where
the function includes at least one of the following:
jumping to a corresponding web page;
enabling a target function in a corresponding application;
displaying a corresponding character string;
displaying a corresponding video; or
playing corresponding audio.

In an embodiment, the target color path includes at least one of the following: a red path, a green path, a blue path, a chrominance path, a luminance path, and a saturation path.

In an embodiment, the target image is a grayscale image, and the target color path is a luminance path.

In an embodiment, the obtaining M colors included in the plurality of elements includes:
    obtaining the color of each of the plurality of elements, and obtaining, based on a clustering algorithm, the M colors included in the plurality of elements, where each of the M colors is a cluster center obtained by using the clustering algorithm; and
    correspondingly, the determining, based on the target mapping relationship, element information corresponding to a color of each of the plurality of elements includes:
    obtaining a color that is of each element and that is most similar to a color in the M colors; and
    determining, based on the target mapping relationship, element information corresponding to the color that is of each element and that is most similar to the color in the M colors.

In an embodiment, the element information corresponding to the color of each of the plurality of elements is used to constitute a bitstream, and the bitstream includes a first sub-bitstream and a second sub-bitstream; and the decoding the target two-dimensional code based on the element information corresponding to the color of each of the plurality of elements includes:
    decoding the first sub-bitstream according to a first decoding rule to obtain a first character; and
    decoding the second sub-bitstream according to a second decoding rule to obtain a second character, where the first decoding rule is different from the second decoding rule.

In an embodiment, a size of the first character is the same as a size of the second character, and a quantity of bits of the first sub-bitstream is different from a quantity of bits of the second sub-bitstream.

In an embodiment, the bitstream further includes a third sub-bitstream, the first sub-bitstream is adjacent to the third sub-bitstream, the third sub-bitstream is adjacent to the second sub-bitstream, and after the decoding the first sub-bitstream according to a first decoding rule and before the decoding the second sub-bitstream according to a second decoding rule, the method further includes:
    decoding the third sub-bitstream according to the first decoding rule to obtain a jump indicator, where the jump indicator indicates to perform character decoding according to the second decoding rule; and
    correspondingly, the decoding the second sub-bitstream according to a second decoding rule includes:
    decoding the second sub-bitstream based on the jump indicator according to the second decoding rule.

For descriptions of operation 2501 to operation 2505, refer to the descriptions of the foregoing embodiment. Details are not described herein again.

Figure 26:
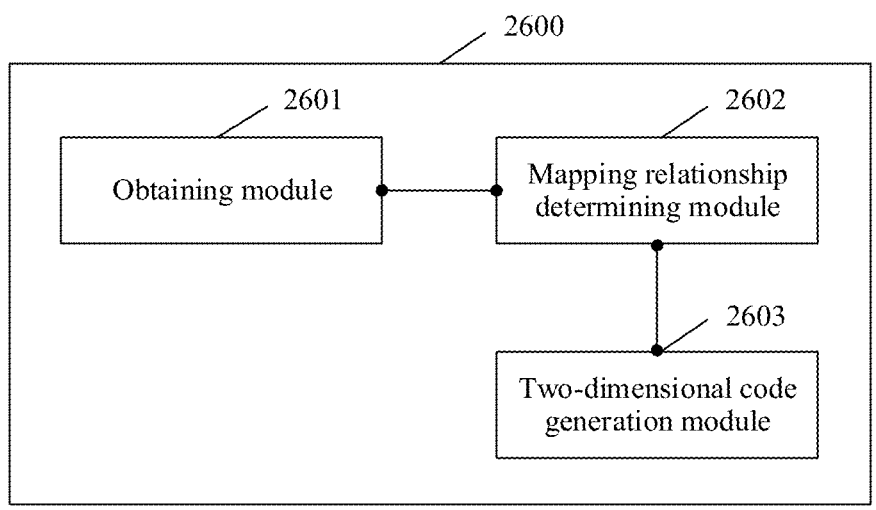
FIG. 26 is a schematic diagram of a two-dimensional code generation apparatus according to an embodiment of this application.

An embodiment of this application further provides a two-dimensional code generation apparatus. The two-dimensional code generation apparatus may be a terminal device or a server. FIG. 26 is a schematic diagram of a structure of a two-dimensional code generation apparatus according to an embodiment of this application. A two-dimensional code generation apparatus 2600 includes an obtaining module 2601, a mapping relationship determining module 2602, and a two-dimensional code generation module 2603.

The obtaining module 2601 is configured to obtain M colors and a characteristic value of each color in a target color path, where the M colors include at least one chromatic color, and M is an integer greater than 1.

For specific descriptions of the obtaining module 2601, refer to the descriptions of operation 301 and operation 303. Details are not described herein again.

The mapping relationship determining module 2602 is configured to determine a target mapping relationship based on a magnitude relationship between characteristic values of the M colors in the target color path, where the target mapping relationship includes element information corresponding to each of the M colors.

For specific descriptions of the mapping relationship determining module 2602, refer to the descriptions of operation 302. Details are not described herein again.

The obtaining module 2601 is configured to:
    obtain a target link, and generate a bitstream corresponding to the target link, where the bitstream includes a plurality of pieces of element information.

The two-dimensional code generation module 2603 is configured to: determine, based on the target mapping relationship, a color corresponding to each piece of element information in the bitstream, and generate a target two-dimensional code based on the color corresponding to each piece of element information in the bitstream.

For specific descriptions of the two-dimensional code generation module 2603, refer to the descriptions of operation 304. Details are not described herein again.

In an embodiment, the obtaining module is configured to:
    obtain a target object; and
    obtain, based on the target object, M colors included in the target object.

In an embodiment, the obtaining module is configured to:
    obtain M colors with a larger pixel proportion in the target object.

In an embodiment, the obtaining module is configured to:
    obtain N colors with a larger pixel proportion in the target object, where N is a positive integer greater than M; and
    obtain M colors meeting a first preset condition from the N colors, where the first preset condition includes at least one of the following: a difference between characteristic values of any two of the M colors in a chrominance path is greater than a first preset value, and a characteristic value of each of the M colors in a saturation path is greater than a second preset value.

In an embodiment, the obtaining module is configured to:
    obtain N colors included in the target object, where N is a positive integer greater than M;
    display a target interface, where the target interface includes N color options, and each color option indicates one of the N colors;
    receive a selection operation performed by a user on M of the N color options; and
    obtain, in response to the selection operation, M colors indicated by the M color options.

In an embodiment, the obtaining module is configured to:
    obtain a target object;
    obtain, based on the target object, M to-be-processed colors included in the target object; and
    adjust characteristic values of the M to-be-processed colors in a luminance path, so that a difference between characteristic values of any two of the M to-be-processed colors in the luminance path is greater than a preset value, so as to obtain the M colors.

In an embodiment, the obtaining module is configured to:

display a first interface, where the first interface includes a first control, and the first control is used to indicate the user to input an image; and receive the target object that is input by the user based on the first control.

In an embodiment, the obtaining module is configured to: receive M colors that are input by a user.

In an embodiment, the obtaining module is configured to: display a second interface, where the second interface includes a first input box, and the first input box is used to indicate the user to input color information used for indicating a color;

receive M pieces of color information that are input by the user in the first input box; and obtain the M colors based on the M pieces of color information.

In an embodiment, the target color path includes at least one of the following: a red path, a green path, a blue path, a chrominance path, a luminance path, and a saturation path.

In an embodiment, the target link includes a first character and a second character, and the obtaining module is configured to:

encode the first character according to a first encoding rule to obtain a first sub-bitstream; and encode the second character according to a second encoding rule to obtain a second sub-bitstream, where the first encoding rule is different from the second encoding rule.

In an embodiment, a size of the first character is the same as a size of the second character, and a quantity of bits of the first sub-bitstream is different from a quantity of bits of the second sub-bitstream.

In an embodiment, the first character and the second character are adjacent characters in the target link, and the obtaining module is configured to:

obtain a jump indicator, where the jump indicator indicates to perform character encoding according to the second encoding rule;

encode the jump indicator according to the first encoding rule to obtain a third sub-bitstream; and encode the second character based on the jump indicator according to the second encoding rule.

Figure 27:
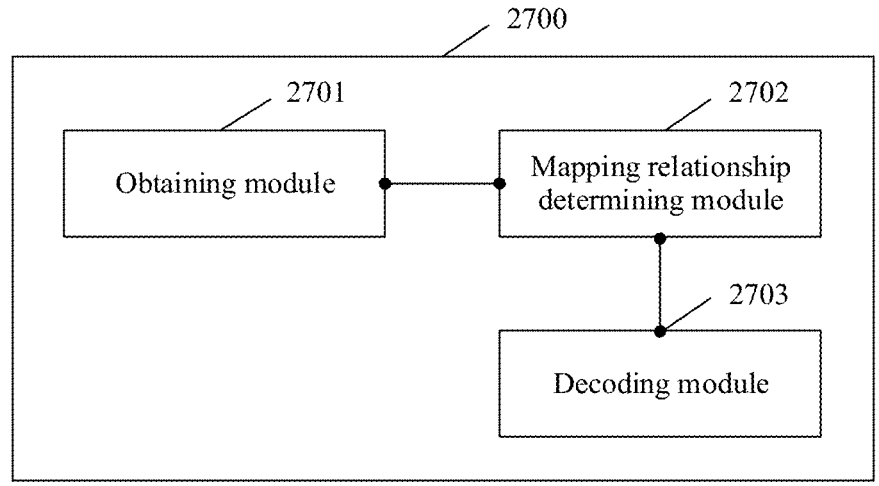
FIG. 27 is a schematic diagram of a two-dimensional code identification apparatus according to an embodiment of this application.

This application further provides a two-dimensional code identification apparatus. The two-dimensional code identification apparatus may be a terminal device or a server. FIG. 27 is a schematic diagram of a structure of a two-dimensional code identification apparatus according to an embodiment of this application. As shown in FIG. 27, a two-dimensional code identification apparatus 2700 includes an obtaining module 2701, a mapping relationship determining module 2702, and a decoding module 2703.

The obtaining module 2701 is configured to: obtain a target image, where the target image includes a target two-dimensional code, and the target two-dimensional code includes a plurality of elements; and obtain M colors included in the plurality of elements and a characteristic value of each color in a target color path.

For specific descriptions of the obtaining module 2701, refer to the descriptions of operation 2301 and operation 2302. Details are not described herein again.

The mapping relationship determining module 2702 is configured to: determine a target mapping relationship based on a magnitude relationship between characteristic values of the M colors in the target color path, where the target mapping relationship includes element information corresponding to each of the M colors; and determine, based on the target mapping relationship, element information corresponding to a color of each of the plurality of elements.

For specific descriptions of the mapping relationship determining module 2702, refer to the descriptions of operation 2303 and operation 2304. Details are not described herein again.

The decoding module 2703 is configured to decode the target two-dimensional code based on the element information corresponding to the color of each of the plurality of elements.

For specific descriptions of the decoding module 2703, refer to the descriptions of operation 2305. Details are not described herein again.

In an embodiment, the obtaining module is configured to: obtain decoding content obtained after the decoding, where the decoding content includes a character string, and the decoding content is used to trigger a corresponding function, where the function includes at least one of the following:

jumping to a corresponding web page;

enabling a target function in a corresponding application;

displaying a corresponding character string;

displaying a corresponding video; or playing corresponding audio.

In an embodiment, the target color path includes at least one of the following: a red path, a green path, a blue path, a chrominance path, a luminance path, and a saturation path.

In an embodiment, the target image is a grayscale image, and the target color path is a luminance path.

In an embodiment, the obtaining module is configured to: obtain the color of each of the plurality of elements, and obtain, based on a clustering algorithm, the M colors included in the plurality of elements, where each of the M colors is a cluster center obtained by using the clustering algorithm; and correspondingly, the mapping relationship determining module is configured to: obtain a color that is of each element and that is most similar to a color in the M colors; and determine, based on the target mapping relationship, element information corresponding to the color that is of each element and that is most similar to the color in the M colors.

In an embodiment, the element information corresponding to the color of each of the plurality of elements is used to constitute a bitstream, and the bitstream includes a first sub-bitstream and a second sub-bitstream; and the decoding module is configured to: decode the first sub-bitstream according to a first decoding rule to obtain a first character; and decode the second sub-bitstream according to a second decoding rule to obtain a second character, where the first decoding rule is different from the second decoding rule.

In an embodiment, a size of the first character is the same as a size of the second character, and a quantity of bits of the first sub-bitstream is different from a quantity of bits of the second sub-bitstream.

In an embodiment, the bitstream further includes a third sub-bitstream, the first sub-bitstream is adjacent to the third sub-bitstream, the third sub-bitstream is adjacent to the second sub-bitstream, and the decoding module is configured to:

decode the third sub-bitstream according to the first decoding rule to obtain a jump indicator, where the jump indicator indicates to perform character decoding according to the second decoding rule; and correspondingly, the decoding the second sub-bitstream according to a second decoding rule includes:

decoding the second sub-bitstream based on the jump indicator according to the second decoding rule.

In addition, an embodiment of this application further provides a two-dimensional code generation apparatus. The apparatus includes:

an obtaining module, configured to obtain a target object and a target link; and obtain, based on the target object, M colors included in the target object, where the M colors include at least one chromatic color, and M is an integer greater than 1; and a two-dimensional code generation module, configured to generate a target two-dimensional code based on the M colors and the target link, where a color style of the target two-dimensional code is consistent with a color style of the target object, the target two-dimensional code includes a plurality of elements, colors of the plurality of elements include the M colors, a color of each element corresponds to one piece of element information, and a plurality of pieces of element information corresponding to the colors of the plurality of elements are used to represent the target link.

In an embodiment, the target object is an identifier that indicates a target enterprise or a target commodity, the target two-dimensional code includes an image region in the middle and an encoding region surrounding the image region, the encoding region includes the plurality of elements, and the image region includes the target object.

In an embodiment, the obtaining module is configured to obtain M colors with a larger pixel proportion in the target object.

In an embodiment, the obtaining module is configured to: obtain N colors included in the target object, where N is a positive integer greater than M;

display a target interface, where the target interface includes N color options, and each color option is used to indicate one of the N colors;

receive a selection operation performed by a user on M of the N color options; and obtain, in response to the selection operation, M colors indicated by the M color options.

In an embodiment, the obtaining module is configured to: display a first interface, where the first interface includes a first control, and the first control is used to indicate the user to input an image; and receive the target object that is input by the user based on the first control.

In an embodiment, the obtaining module is configured to: obtain a characteristic value of each of the M colors in a target color path, where the M colors include at least one chromatic color, and M is an integer greater than 1;

determine a target mapping relationship based on a magnitude relationship between characteristic values of the M colors in the target color path, where the target mapping relationship includes element information corresponding to each of the M colors; and generate a bitstream corresponding to the target link, where the bitstream includes a plurality of pieces of element information.

Correspondingly, the two-dimensional code generation module is configured to:

determine, based on the target mapping relationship, a color corresponding to each piece of element information in the bitstream, and generate the target two-dimensional code based on the color corresponding to each piece of element information in the bitstream.

In an embodiment, the obtaining module is configured to: obtain N colors with a larger pixel proportion in the target object, where N is a positive integer greater than M; and obtain M colors meeting a first preset condition from the N colors, where the first preset condition includes at least one of the following: a difference between characteristic values of any two of the M colors in a chrominance path is greater than a first preset value, and a characteristic value of each of the M colors in a saturation path is greater than a second preset value.

In an embodiment, the target link is used to trigger a corresponding function, where the function includes at least one of the following:

jumping to a corresponding web page;

enabling a target function in a corresponding application;

displaying a corresponding character string;

displaying a corresponding video; or playing corresponding audio.

In addition, an embodiment of this application further provides a two-dimensional code generation apparatus. The apparatus includes:

an obtaining module, configured to receive M colors that are input by a user and obtain a target link, where the M colors include at least one chromatic color, and M is an integer greater than 1; and a two-dimensional code generation module, configured to generate a target two-dimensional code based on the M colors and the target link, where the target two-dimensional code includes a plurality of elements, colors of the plurality of elements include the M colors, a color of each element corresponds to one piece of element information, and a plurality of pieces of element information corresponding to the colors of the plurality of elements are used to represent the target link.

In an embodiment, the obtaining module is configured to: display a second interface, where the second interface includes a first input box, and the first input box is used to indicate the user to input color information used for indicating a color;

receive M pieces of color information that are input by the user in the first input box; and obtain the M colors based on the M pieces of color information.

In an embodiment, the obtaining module is configured to: obtain a characteristic value of each of the M colors in a target color path, where the M colors include at least one chromatic color, and M is an integer greater than 1;

determine a target mapping relationship based on a magnitude relationship between characteristic values of the M colors in the target color path, where the target mapping relationship includes element information corresponding to each of the M colors; and generate a bitstream corresponding to the target link, where the bitstream includes a plurality of pieces of element information.

Correspondingly, the two-dimensional code generation module is configured to:

determine, based on the target mapping relationship, a color corresponding to each piece of element information in the bitstream, and generate the target two-dimensional code based on the color corresponding to each piece of element information in the bitstream.

In an embodiment, the target link is used to trigger a corresponding function, where the function includes at least one of the following:
jumping to a corresponding web page;
enabling a target function in a corresponding application;
displaying a corresponding character string;
displaying a corresponding video; or
playing corresponding audio.

Figure 28:
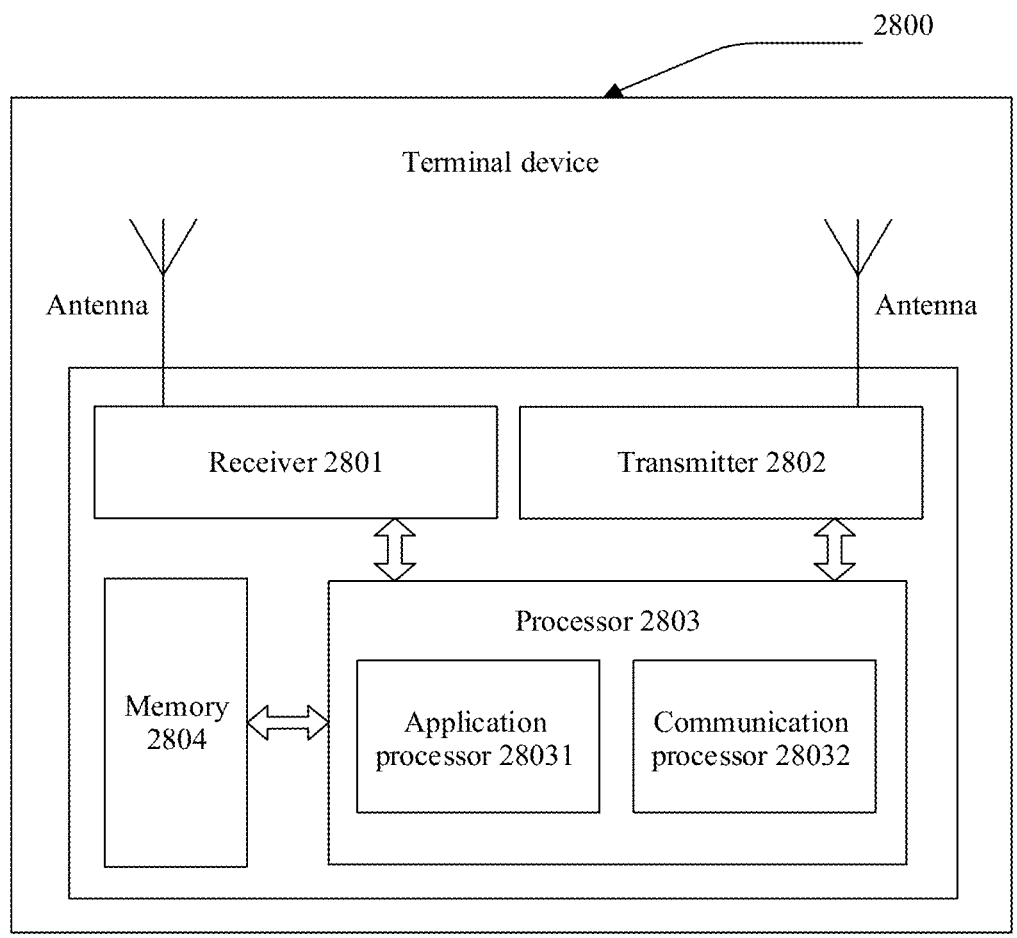
FIG. 28 is a schematic diagram of a structure of a terminal device according to an embodiment of this application.

The following describes a terminal device according to an embodiment of this application. FIG. 28 is a schematic diagram of a structure of a terminal device according to an embodiment of this application. A terminal device 2800 may be specifically a virtual reality VR device, a mobile phone, a tablet, a notebook computer, a smart wearable device, or the like. This is not limited herein. Specifically, the terminal device 2800 includes a receiver 2801, a transmitter 2802, a processor 2803, and a memory 2804 (there may be one or more processors 2803 in the terminal device 2800, and one processor is used as an example in FIG. 28). The processor 2803 may include an application processor 28031 and a communication processor 28032. In some embodiments of this application, the receiver 2801, the transmitter 2802, the processor 2803, and the memory 2804 may be connected by using a bus or in another manner.

The memory 2804 may include a read-only memory and a random access memory, and provide instructions and data for the processor 2803. A part of the memory 2804 may further include a non-volatile random access memory (NVRAM). The memory 2804 stores a processor and operation instructions, an executable module or a data structure, a subset thereof, or an expanded set thereof. The operation instructions may include various operation instructions to implement various operations.

The processor 2803 controls an operation of the terminal device. In specific application, the components of the terminal device are coupled together through a bus system. In addition to a data bus, the bus system may include a power bus, a control bus, a status signal bus, and the like. However, for clear description, various types of buses in the figure are marked as the bus system.

The methods disclosed in embodiments of this application may be used in the processor 2803, or may be implemented by the processor 2803. The processor 2803 may be an integrated circuit chip and has a signal processing capability. In an embodiment process, the operations of the foregoing methods may be implemented by using a hardware integrated logical circuit in the processor 2803, or by using instructions in a form of software. The processor 2803 may be a general-purpose processor, a digital signal processor (DSP), a microprocessor, or a microcontroller. The processor 2803 may further include an application-specific integrated circuit (ASIC), a field programmable gate array (FPGA) or another programmable logic device, a discrete gate, a transistor logic device, or a discrete hardware component. The processor 2803 may implement or perform the methods, the operations, and the logical block diagrams that are disclosed in embodiments of this application. The general-purpose processor may be a microprocessor, or the processor may be any conventional processor or the like. The operations of the methods disclosed with reference to embodiments of this application may be directly performed and completed by a hardware decoding processor, or may be performed and completed by using a combination of hardware and software modules in the decoding processor. The software module may be located in a mature storage medium in the art, for example, a random access memory, a flash memory, a read-only memory, a programmable read-only memory, an electrically erasable programmable memory, or a register. The storage medium is located in the memory 2804, and the processor 2803 reads information in the memory 2804 and completes the operations of the foregoing methods in combination with hardware of the processor 2803.

The receiver 2801 may be configured to receive input digital or character information, and generate a signal input related to a related setting and function control of the terminal device. The transmitter 2802 may be configured to output digital or character information by using a first port. The transmitter 2802 may be further configured to send instructions to a disk group by using the first port, to modify data in the disk group. The transmitter 2802 may further include a display device such as a display screen.

In this embodiment of this application, in one case, the processor 2803 is configured to perform processing-related operations of the two-dimensional code generation method and the two-dimensional code identification method in the foregoing embodiments.

Figure 29:
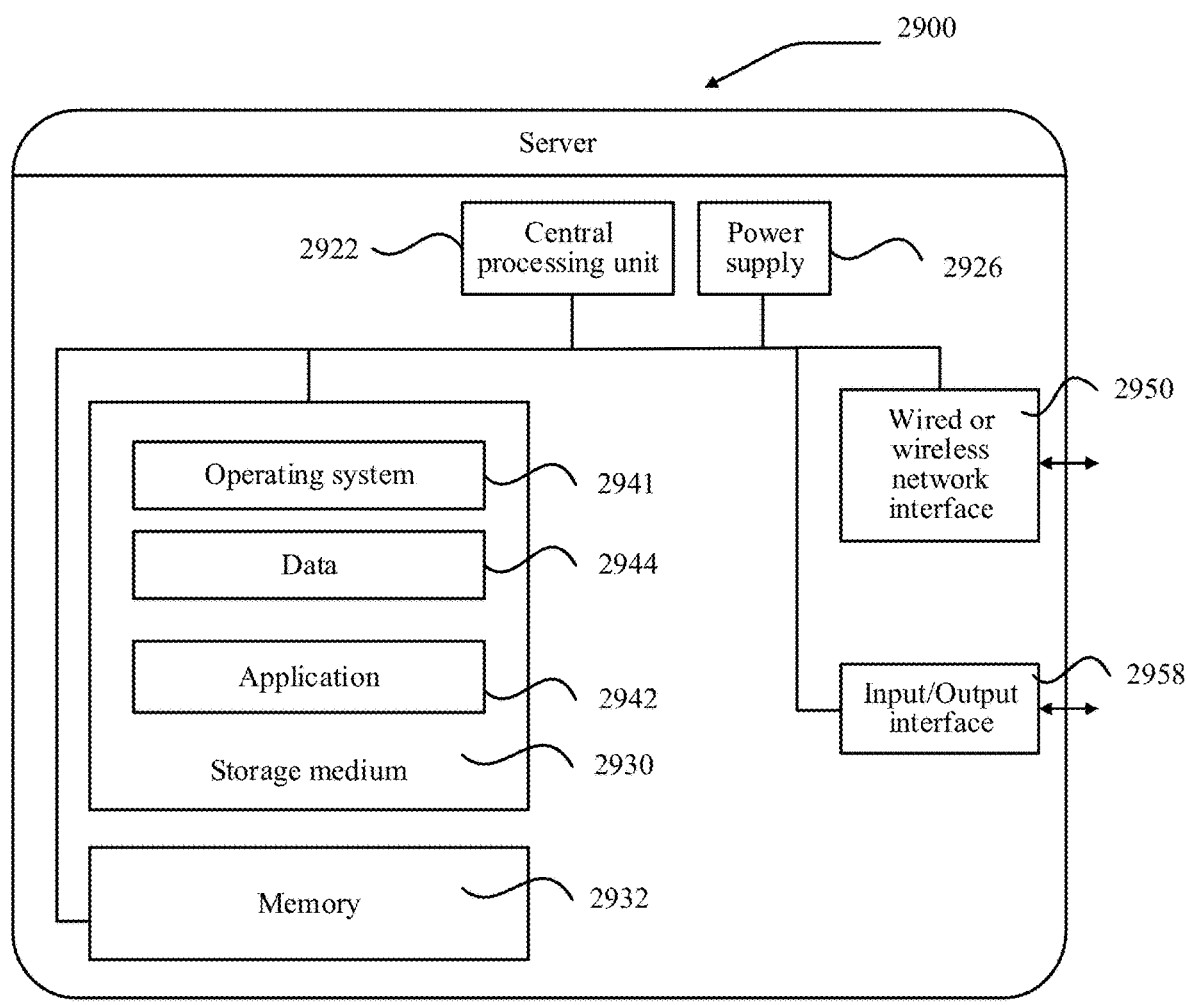
FIG. 29 is a schematic diagram of a structure of a server according to an embodiment of this application.

An embodiment of this application further provides a server. FIG. 29 is a schematic diagram of a structure of a server according to an embodiment of this application. The server may vary greatly due to different configurations or performance, and may include one or more central processing units (CPU) 2922 (for example, one or more processors) and a memory 2932, and one or more storage media 2930 (for example, one or more mass storage devices) that store an application 2942 or data 2944. The memory 2932 and the storage medium 2930 may perform transitory storage or persistent storage. The program stored in the storage medium 2930 may include one or more modules (not shown in the figure), and each module may include a series of instruction operations for a training device. Further, the central processing unit 2922 may be set to communicate with the storage medium 2930, and executes, on the server 2900, a series of instruction operations in the storage medium 2930.

The server 2900 may further include one or more power supplies 2926, one or more wired or wireless network interfaces 2950, one or more input/output interfaces 2958, and/or one or more operating systems 2941 such as Windows Server™, Mac OS X™, Unix™, Linux™, and Free-BSD™.

In this embodiment of this application, the central processing unit 2922 is configured to perform the two-dimensional code generation method and the two-dimensional code identification method in the foregoing embodiments.

An embodiment of this application further provides a computer program product. When the computer program product is run on a computer, the computer is enabled to perform the operations of the two-dimensional code generation method and the two-dimensional code identification method.

An embodiment of this application further provides a computer-readable storage medium. The computer-readable storage medium stores a program for signal processing. When the program is run on a computer, the computer is enabled to perform the operations of the two-dimensional code generation method and the two-dimensional code identification method described in the foregoing embodiments.

In the specification, claims, and accompanying drawings of this application, the terms "first", "second", and the like are intended to distinguish between similar objects but do not necessarily indicate a specific order or sequence. It should be understood that, the terms used in such a way are interchangeable in proper circumstances, so that embodiments described herein can be implemented in a sequence other than the sequence illustrated or described herein. In addition, the terms "include", "contain" and any other variants mean to cover the non-exclusive inclusion, for example, a process, method, system, product, or device that includes a list of operations or modules is not necessarily limited to those operations or modules, but may include other operations or modules not expressly listed or inherent to such a process, method, system, product, or device. Names or numbers of operations in this application do not mean that the operations in the method procedure need to be performed in a time/logical sequence indicated by the names or numbers. An execution sequence of the operations in the procedure that have been named or numbered can be changed based on a technical objective to be achieved, provided that same or similar technical effect can be achieved. Division into the modules in this application is logical division. In actual application, there may be another division manner. For example, a plurality of modules may be combined or integrated into another system, or some features may be ignored or may not be performed. In addition, the displayed or discussed mutual couplings or direct couplings or communication connections may be implemented through some interfaces. The indirect couplings or communication connections between the modules may be implemented in electrical or other similar forms. This is not limited in this application. In addition, modules described as separate components may be or may not be physically separated, or may be or may not be physical modules, or may be distributed to a plurality of circuit modules. Some or all of the modules may be selected according to an actual requirement to implement the objectives of the solutions of this application.

In addition, it should be noted that the apparatus embodiments described above are merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of embodiments. In addition, in the accompanying drawings of the apparatus embodiments provided by this application, connection relationships between modules indicate that the modules have communication connections with each other, which may be specifically implemented as one or more communication buses or signal cables.

Based on the description of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Usually, any function implemented by a computer program may be easily implemented by using corresponding hardware. In addition, specific hardware structures used to implement a same function may be various, for example, an analog circuit, a digital circuit, or a dedicated circuit. However, in this application, a software program implementation is a better implementation in most cases. Based on such an understanding, the technical solutions of this application essentially or the part contributing to the conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a training device, or a network device) to perform the methods in embodiments of this application.

All or some of the foregoing embodiments may be implemented by software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, training device, or data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a training device or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. A two-dimensional code generation method, comprising:
    obtaining M colors input by a user and a characteristic value of each color in a target color path, wherein the M colors comprise at least one chromatic color, and M is an integer greater than 1;
    determining a target mapping relationship based on a magnitude relationship between characteristic values of the M colors in the target color path, wherein the target mapping relationship comprises element information corresponding to each of the M colors;
    obtaining a target link, and generating a bitstream corresponding to the target link, wherein the bitstream comprises a plurality of pieces of element information; and
    determining, based on the target mapping relationship, a color corresponding to each piece of element information in the bitstream, and generating a target two-dimensional code based on the color corresponding to each piece of element information in the bitstream.

2. The method according to claim 1, wherein the obtaining M colors comprises:
    obtaining a target object; and
    obtaining, based on the target object, M colors comprised in the target object.

3. The method according to claim 2, wherein the obtaining M colors comprised in the target object comprises:
    obtaining M colors in the target object, wherein a pixel proportion of the M colors in the target object is larger than other colors in the target object.

4. The method according to claim 2, wherein the obtaining M colors comprised in the target object comprises:
    obtaining N colors in the target object, wherein N is a positive integer greater than M, a pixel proportion of the N colors in the target object is larger than other colors in the target object; and obtaining M colors meeting a first preset condition from the N colors, wherein the first preset condition comprises at least one of the following: a difference between characteristic values of any two of the M colors in a chrominance path is greater than a first preset value, or a characteristic value of each of the M colors in a saturation path is greater than a second preset value.

5. The method according to claim 2, wherein the obtaining, based on the target object, M colors comprised in the target object comprises:

obtaining N colors comprised in the target object, wherein N is a positive integer greater than M;

displaying a target interface, wherein the target interface comprises N color options, and each color option indicates one of the N colors;

receiving a selection operation performed by a user on M of the N color options; and obtaining, in response to the selection operation, M colors indicated by the M color options.

6. The method according to claim 1, wherein the obtaining M colors comprises:

obtaining a target object;

obtaining, based on the target object, M to-be-processed colors comprised in the target object; and adjusting characteristic values of the M to-be-processed colors in a luminance path, so that a difference between characteristic values of any two of the M to-be-processed colors in the luminance path is greater than a preset value, to obtain the M colors.

7. The method according to claim 2, wherein the obtaining a target object comprises:

displaying a first interface, wherein the first interface comprises a first control, and the first control is used to indicate the user to input an image; and receiving the target object that is input by the user based on the first control.

8. The method according to claim 1, wherein the receiving M colors that are input by a user comprises:

displaying a second interface, wherein the second interface comprises a first input box, and the first input box is used to indicate the user to input color information used for indicating a color;

receiving M pieces of color information that are input by the user in the first input box; and obtaining the M colors based on the M pieces of color information.

9. The method according to claim 1, wherein the target color path comprises at least one of the following: a red path, a green path, a blue path, a chrominance path, a luminance path, or a saturation path.

10. The method according to claim 1, wherein the target link comprises a first character and a second character, and the generating a bitstream corresponding to the target link comprises:

encoding the first character according to a first encoding rule to obtain a first sub-bitstream; and encoding the second character according to a second encoding rule to obtain a second sub-bitstream, wherein the first encoding rule is different from the second encoding rule.

11. The method according to claim 10, wherein a size of the first character is the same as a size of the second character, and a quantity of bits of the first sub-bitstream is different from a quantity of bits of the second sub-bitstream.

12. The method according to claim 10, further comprising:

after the encoding the first character according to a first encoding rule to obtain a first sub-bitstream and before the encoding the second character according to a second encoding rule, obtaining a jump indicator, wherein the jump indicator indicates to perform character encoding according to the second encoding rule, wherein the first character and the second character are adjacent characters in the target link; and encoding the jump indicator according to the first encoding rule to obtain a third sub-bitstream; and correspondingly, the encoding the second character according to a second encoding rule comprises:

encoding the second character based on the jump indicator according to the second encoding rule.

13. A two-dimensional code generation apparatus, comprising:

an obtaining module, configured to obtain M colors and a characteristic value of each color in a target color path, wherein the M colors comprise at least one chromatic color, and M is an integer greater than 1, wherein the M colors are inputted by a user;

a mapping relationship determining module, configured to determine a target mapping relationship based on a magnitude relationship between characteristic values of the M colors in the target color path, wherein the target mapping relationship comprises element information corresponding to each of the M colors, wherein the obtaining module is configured to: obtain a target link, and generate a bitstream corresponding to the target link, wherein the bitstream comprises a plurality of pieces of element information; and a two-dimensional code generation module, configured to: determine, based on the target mapping relationship, a color corresponding to each piece of element information in the bitstream, and generate a target two-dimensional code based on the color corresponding to each piece of element information in the bitstream.

14. The apparatus according to claim 13, wherein the obtaining module is configured to:

obtain a target object; and obtain, based on the target object, M colors comprised in the target object.

15. The apparatus according to claim 14, wherein the obtaining module is configured to:

obtain M colors in the target object, wherein a pixel proportion of the M colors in the target object is larger than other colors in the target object.

16. The apparatus according to claim 14, wherein the obtaining module is configured to:

obtain N colors in the target object, wherein N is a positive integer greater than M, a pixel proportion of the N colors in the target object is larger than other colors in the target object; and obtain M colors meeting a first preset condition from the N colors, wherein the first preset condition comprises at least one of the following: a difference between characteristic values of any two of the M colors in a chrominance path is greater than a first preset value, and a characteristic value of each of the M colors in a saturation path is greater than a second preset value.

17. The apparatus according to claim 14, wherein the obtaining module is configured to:

obtain N colors comprised in the target object, wherein N is a positive integer greater than M;

display a target interface, wherein the target interface comprises N color options, and each color option indicates one of the N colors;

receive a selection operation performed by a user on M of the N color options; and obtain, in response to the selection operation, M colors indicated by the M color options.

18. The apparatus according to claim 13, wherein the obtaining module is configured to:

obtain a target object;

obtain, based on the target object, M to-be-processed colors comprised in the target object; and adjust characteristic values of the M to-be-processed colors in a luminance path, so that a difference between characteristic values of any two of the M to-be-processed colors in the luminance path is greater than a preset value, to obtain the M colors.

19. A non-transitory computer-readable storage medium, comprising a program, wherein when the program is run on a computer, the computer is enabled to:

obtain M colors input by a user and a characteristic value of each color in a target color path, wherein the M colors comprise at least one chromatic color, and M is an integer greater than 1;

determine a target mapping relationship based on a magnitude relationship between characteristic values of the M colors in the target color path, wherein the target mapping relationship comprises element information corresponding to each of the M colors;

obtain a target link, and generating a bitstream corresponding to the target link, wherein the bitstream comprises a plurality of pieces of element information; and determine, based on the target mapping relationship, a color corresponding to each piece of element information in the bitstream, and generate a target two-dimensional code based on the color corresponding to each piece of element information in the bitstream.

* * * * *

UNITED STATES PATENT AND TRADEMARK OFFICE
CERTIFICATE OF CORRECTION

| | | |
|---|---|---|
| PATENT NO. | : 12,437,175 B2 | Page 1 of 1 |
| APPLICATION NO. | : 18/215378 | |
| DATED | : October 7, 2025 | |
| INVENTOR(S) | : Tingrui Han et al. | |

It is certified that error appears in the above-identified patent and that said Letters Patent is hereby corrected as shown below:

In the Claims

In Column 58, Claim 17, Line 67, delete "Nis a positive integer" and insert --N is a positive integer--.

Signed and Sealed this
Tenth Day of February, 2026

John A. Squires
*Director of the United States Patent and Trademark Office*